United States Patent [19]

Perpiglia

[11] 3,905,023

[45] Sept. 9, 1975

[54] LARGE SCALE MULTI-LEVEL INFORMATION PROCESSING SYSTEM EMPLOYING IMPROVED FAILSAFT TECHNIQUES

[75] Inventor: Frank Joseph Perpiglia, Springfield, Pa.

[73] Assignee: Burroughs Corporation, Detroit, Mich.

[22] Filed: Aug. 15, 1973

[21] Appl. No.: 388,551

[52] U.S. Cl. ........................ 340/172.5; 235/153 AK

[51] Int. Cl. ........................ G06f 11/06; G06f 15/16

[58] Field of Search ............ 340/172.5; 235/153 AK

[56] References Cited

UNITED STATES PATENTS

| | | | |
|---|---|---|---|
| 3,266,020 | 8/1966 | Cheney et al. | 340/172.5 |
| 3,319,226 | 5/1967 | Mott et al. | 340/172.5 |
| 3,416,139 | 12/1968 | Marx | 340/172.5 |
| 3,548,382 | 12/1970 | Lichty et al. | 340/172.5 |
| 3,566,357 | 2/1971 | Ling | 340/172.5 |
| 3,623,011 | 11/1971 | Baynard, Jr. et al. | 340/172.5 |
| 3,760,365 | 9/1972 | Kurtzberg et al. | 340/172.5 |
| 3,787,816 | 1/1974 | Hauck et al. | 340/172.5 |
| 3,787,818 | 1/1974 | Arnold et al. | 340/172.5 |
| 3,792,448 | 2/1974 | Bennett et al. | 340/172.5 |
| R27,703 | 7/1973 | Stafford et al. | 340/172.5 |

*Primary Examiner*—Gareth D. Shaw
*Assistant Examiner*—Mark Edward Nusbaum
*Attorney, Agent, or Firm*—Edmund M. Chung; Edward J. Feeney, Jr.; Kevin R. Peterson

[57] ABSTRACT

A multiprogrammed multiprocessing information processing system having independently operating computing, input/output, and memory modules through an exchange, and interacting with a multi-level operating system designed to automatically makes optimum use of all system resources by controlling system resources and by scheduling jobs in the multiprogramming mix of the processing system. In operation, the operating system insures that all system resources are automatically allocated to meet the needs of the programs introduced into the system as well as insuring the continuous and automatic reassignment of resources, the initiation of new jobs, and the monitoring of their performance. System reliability is achieved by the incorporation of error detection circuit throughout the system, by single-bit correction of errors in memory, by recording errors for software analysis and by modularization and redundancy of critical elements.

2 Claims, 55 Drawing Figures

LEGEND
CPM = CENTRAL PROCESSOR MODULE
IOM = INPUT/OUTPUT MODULE
MDU = MAINTENANCE DIAGNOSTIC UNIT

LEGEND
MSU = MEMORY STORAGE UNIT
MCM = MEMORY CONTROL MODULE
PC = PERIPHERAL CONTROL
PCC = PERIPHERAL CONTROL CABINET
DFO = DISK FILE OPTIMIZER
DFC = DISK FILE CONTROL
DF PCC = DISK FILE PERIPHERAL CONTROL CABINET
EU = ELECTRONICS UNIT
EX = EXCHANGE

LEGEND FOR REGISTERS:

BTP – OLDEST STACK BUFFER ENTRY

TPP – NEWEST STACK BUFFER ENTRY

S — LAST RESERVED MEMORY STACK ADDRESS

SLR – MEMORY ADDRESS OF OLDEST STACK WORD FOR WHICH THERE IS NO COPY

SAR – MEMORY ADDRESS OF OLDEST STACK ENTRY RESIDENT IN THE STACK BUFFER

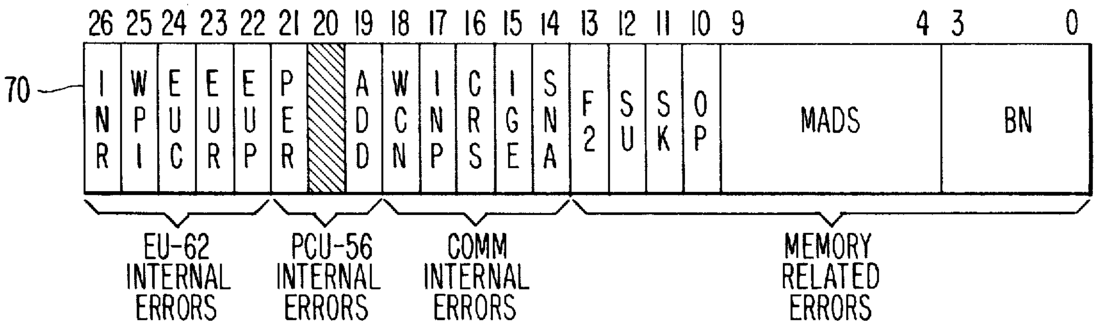

| FIELD | BITS | DESCRIPTION |
|---|---|---|
| INR | 26:1 | INHIBIT NORMAL RETURN |
| WPI | 25:1 | WRONG PIR (PIR MAY BE ONE LESS) |
| EUC | 24:1 | EU CONTINUITY ERROR |
| EUR | 23:1 | EU RESIDUE ERROR |
| EUP | 22:1 | EU PARITY ERROR |
| PER | 21:1 | PCU ERROR |
| | 20:1 | NOT USED |
| ADD | 19:1 | RESIDUE ERROR IN ADDER |
| WCN | 18:1 | WRONG CHANNEL NUMBER |
| INP | 17:1 | COMM. UNIT RECEIVED BAD PARITY FROM STACK BUFFER OR STACK DATA QUEUE |
| CRS | 16:1 | COMM. UNIT RESIDUE ERROR |
| IGE | 15:1 | ERROR OCCURRED ON OPERATION THAT WAS IGNORED |
| SNA | 14:1 | COMM. UNIT DID NOT RECEIVE A REQUESTOR OPERATION COMPLETE SIGNAL FROM MCM |
| F2 | 13:1 | SINGLE BIT ERROR |
| SU | 12:1 | 0 = NOT SU OPERATION<br>1 = SU OPERATION |
| SK | 11:1 | 0 = NOT STACK OPERATION<br>1 = STACK OPERATION |
| OP | 10:1 | 0 = FETCH<br>1 = STORE |
| MADS | 9:6 | MEMORY ADDRESS |
| BN | 3:4 | BOX NUMBER (MCH NO.) |

Fig. 10

SUBSCRIPTS
n = MLM TO MSM
x = MSM TO MLM

LARGE SCALE MULTI-LEVEL INFORMATION PROCESSING SYSTEM EMPLOYING IMPROVED FAILSOFT TECHNIQUES

TABLE OF CONTENTS

Abstract of the Disclosure
Background of the Invention
Summary of the Invention
Brief Description of the Drawing
General Description of the System
Detailed Description of the Invention
A. Central Processor
B. Communications Unit
C. Input/Output Subsystem
D. Memory Subsystem
E. Maintenance Diagnostic Unit
F. Multi-Level Operating System This invention relates to an information processing system and more particularly to a multi-level processing system and a management control subsystem for the multi-level processing system.

BACKGROUND OF THE INVENTION

In early multi-processor information processing systems, one processor and only one processor could be designated as a control or master processor. One of the functions of this master processor was the control of the servicing of the interrupts by the modules of the information processing system. In operation, each processor in a multi-processing system may be executing a different program and therefore one processor could be executing a high level priority program and another, a low level priority program. When an interrupt, such as from an input device, is requested, and assume for purposes of discussion the first processor has been designated the master or control processor, and that the request had a lower priority than the priority of the high level program being executed by the first processor, the first processor would continue executing its program until completed before the interrupting program would be executed. Obviously, it is quite possible that the interrupting program could be of a much higher level priority than a low level priority program being executed by a second processor in the system. Priority then, in these prior art systems, was determined strictly by the relationship of the interrupting request to the program being executed by the processor designated the control processor.

On the other hand, without a central control of interrupts and masking, each processor must form its own accepting or rejecting of a task assignment. Thus, in the prior art, a central interrupt directory was provided, but in order to remit a processor to control or inhibit interrupt, the processor must be contacted, at which time, the processor must determine if the priority of the interrupt is high enough to warrant an interruption. Thus, means were provided in the prior art for permitting each processor in a multi-processing system to become a control processor thereby affording more efficient servicing of communication requests having a priority greater than the program being executed. This capability was usually provided in a central system controller for masking or disabling the interruption of the processor performing a program that is of a higher level than the program requested by an interrupting module and permitting the interruption of a processor executing a program which is of a lower level than the program requested by the interrupting module. In these multi-processor systems, it was common for the several data processors to share the same memory and the same input/output devices; however, one processor was still required for processing the master control program and allocating specific operations to one or more associated "slave" processors. In such an arrangement, all executive functions were performed by the master or control processor and all of the other processors operated merely as peripheral extensions of the master or control processor. However, to provide a completely modular system in the prior art in which a number of processes may be incorporated into the system, the hardware implementation of each processor was of necessity identical. This dictated that each processor in the system had equal capability of handling all programs including the master control program which was responsible for the job of scheduling and resource allocation for the system.

Present day large scale data processing systems find many applications for multi-programming including concurrent batch processing, real time processing, and time sharing. In order to accommodate a variety of such unrelated jobs or tasks, prior art systems have been provided with operataing systems or control programs which supervise such activities as task sequencing, storage allocation, and the like. Also provided as part of the operating system are the various compilers or language translators which permit the programmer, without knowledge of the circuit characteristics of the system, to employ a variety of programming languages. In the prior art systems, each of the one or more data processors alternately executed successive portions of the plurality of user programs. In such a system, a data processor assigned to execute a particular user program continued until the program either voluntarily relinquished control of the data processor or was involuntarily interrupted. A program relinquished control when it could not continue until after the occurrence of some future event, such as the receipt of input data or when it terminated. The released processor was immediately assigned to execute another waiting and ready program, either commencing initial execution of a new program, or the execution of a program from its point of relinquishment or interruption. The processor again continued this program in execution until a new point wherein the program relinquished the processor or the program was interrupted. Meanwhile, the voluntarily relinquishing programs stand by, awaiting the occurrences of their respective required events, whereupon they can become candidates for further execution. The interrupted programs, on the other hand, usually are immediate candidates for execution, but must wait assignment of a data processor according to a predetermined rule designed to maintain maximum system efficiency.

Viewing a program as comprising a series of instructions for directing the assigned data processor to execute in sequence the individual steps necessary to perform a particular data processing operation. The data processor communicates with the working store of the system to retrieve from respective cells thereof, each instruction to be executed and data items to be processed and to store therein data items which have been processed. Most of the instructions comprise an order portion denoting the type of operation the data processor must execute and an address portion representing the location of a cell in working storage from which the data item is to be retrieved for processing or into which a processed data item is to be inserted. Moreover, the data processor supplies an address representation to denote the cell from which the next instruction is to be obtained. Because the retrieval and storage time of working storage must be very short for compatibility with the very rapid rate of instruction execution of the modern data processor, the cost of working storage capacity is relatively great. Therefore, in the prior art, economics limited the size of the fast operating working store and, accordingly, the number of programs and quantity of information it could store at a particular time. To alleviate this problem in the prior art supplemental storage was provided for holding all user programs received from input devices and awaiting scheduling for execution, user program "libraries," and data files. This supplemental storage was provided by mass quantities of relatively inexpensive and slow "auxiliary storage." Ordinarily, the auxiliary store is coupled for communication with the working store to provide programs and information to the working store as they are required for processing. Additionally, the auxiliary store relieves working storage of processed data, providing temporary storage prior to transmittal of the processed data to an output device.

To make multi-programming and multi-processing a reality, a system must be capable of dynamically controlling its own resources and the scheduling of its jobs or tasks and it must be capable of processing a number of jobs concurrently in less time than it takes to process the same jobs serially. To implement multiprogramming, a management control subsystem including a group of management control programs, program parts, and sub routines is required for exercising supervisory control over the data processing system. The group of management control programs, program parts, and subroutines is termed an "operating system." The primary purpose of the operating system is to maintain the user program in efficient concurrent execution by effective allocation of the limited system resources to the programs, these resources including the data processors, memory storage, and input and output equipment.

It should be noted that the type of task or jobs for which the system is to be used will affect the operating system which in turn affects the design of the system itself. If the system is designed to be job oriented then the supervisory program is geared to execute an incoming stream of programs and its associated input data. On the other hand, if the system is designed for realtime or time sharing operations, the supervisory program uses incoming pieces of data as being required to be routed to the number of processing programs. Moreover when the system is designed for time sharing, protection of different programs and related resources becomes important.

Although a single processor system may be multiprogram, a greater degree of flexibility is achieved from a multi-processing system where a number of separate processes may be assigned to a plurality of processors. Examples of such multi-processing systems are disclosed in the Anderson et al, U.S. Pat. No. 3,419,849 and Lynch et al, U.S. Pat. No. 3,411,139. A central processor of the type employed in the Lynch et al patent is disclosed in Barnes et al, U.S. Pat. No. 3,401,376. Each of the above-mentioned patents is assigned to the assignee of the present invention.

The above-described systems employed operating systems which were designed for multi-processing systems. A particular distinction of the instant invention is that the processor modules employ circuitry to evaluate system instructions at a faster speed than previously accomplished. Traditionally, data or central processors have had their frequency set according to the longest propagation paths which existed in the logic. Most often, this critical path was the adder mechanism or the communications system with main memory. Obviously, every other logic path in the processor was shorter than this critical path and in many cases, such as simple register movements, the operations are executed at a rate above the basic clock frequency. Since the operand adder or main memory interface accounts for a small percentage of the operation time, a central processor of the prior art, as a whole, had rather poor efficiency.

Another factor which plays an important role in processing speed is the inherent limitations of single work referencing of main memory. These limitations are a particular deterrent in an environment where memory referencing is accomplished on a "need then demand" basis. This technique, though simple to mechanize, tends to force operations toward a serial nature.

In present day data processing systems it is particularly advantageous to have system programs, such as service programs, which are recursive or reentrant in nature. Furthermore, it is advantageous that such recursiveness exist in a hierarchy of levels and not just one level. Additionally, it is advantageous and even necessary that certain of the system programs as well as the user program must be protected in memory from unwarranted entry by unrelated processes being executed elsewhere in the same system. Still another characteristic which is advantageous is that of providing functions common to various source languages which functions are implemented in circuitry where possible to provide faster execution times.

More importantly, present day large scale information processing systems must be reliable not only in terms of accuracy but also in terms of dependability. Therefore, it is desirable to have a system which is very reliable and, secondly, a system which as a whole can continue to function despite failures in individual modules of the system.

It is therefore an object of the present invention to provide an improved information processing system for such diverse applications as time sharing, scientific problem solving, and other data processing tasks.

It is a further object of the present invention to provide a data processing system having a high degree of modularity which is capable of concurrent computation at a plurality of processing levels.

It is a further object of the present invention to provide a data processing system which is reliable and includes fail-soft capability.

SUMMARY OF THE INVENTION

The foregoing objects are achieved according to the instant invention by providing an information processing system which can be tailored to the processing needs of a user by arranging central processor modules, input/output modules and memory modules on an electronic grid or exchange under the management of a multi-level operating system or master control program which maximizes system throughput through the controlled interaction of independently operating computing, input/output, and memory modules through the exchange. The multi-level operating system makes multiprocessing and multiprogramming both functional and practical by dynamically controlling system resources and by scheduling jobs in the multiprogramming mix. Improved speed and reliability of instruction execution is achieved by reducing or masking the overhead associated with reference to memory by freeing the central processor from concern with input/output operations, and by employing fail-soft measures that minimize system degradation.

The three main sections of the central processor modules are designed for independent and parallel operation thus enabling a speeding up of arithmetic computations and data maniplations and the overlapping of these computations and manipulations with memory references. Also included in the central processor module are high-speed integrated circuit local memories which permit multiword transfers between a central processor module and the system's main memory and makes possible the anticipation of the need for program and data words, thereby reducing and at times virtually eliminating the time spent waiting for the completion of transfers to and from main memory.

Greater accessability to main memory to all users by reducing memory access times for each user is achieved by the four-way interleaving of addresses in main memory and the capability for phased multiword transfers of information to and from main memory in bursts of up to four words.

In further accord with the present invention, all input/output operations are asynchronously performed by the input/output module independent of the central processor module, which is therefore freed to perform other useful work.

Confidence in the reliability of system hardware through graceful degradation or fail-soft is provided by the ability of the multi-level operating system to dynamically and automatically reconfigure the modules of the system to exclude a faulty one, and by the use of separate power supplies and redundant regulators for each module. Modular design and redundant buses are also a fail-soft feature of the instant invention. Incorporated in all major modules of the system are error detection and reporting circuits, which provide the multilevel operating system with information to perform failsoft analysis and dynamic reconfiguration of the system resources. The memory modules, however, are provided with single-bit error correction capability independent of the multi-level operating system.

The multi-level operating system of the instant invention may be viewed as comprising a base level and N successive levels. The base level, which is defined as the kernel, is the nucleus of the operating system, and provides the sole interface between system software and system hardware, as well as the operating environment for the next level, which is or are the control program(s). A control program, which operates under control of the kernel, is delegated by the kernel many tasks of program supervision, system supervision, and input/output control, and in turn provides the operating environment for user or application programs. Thus, in general, a process at each level of the operating system is responsible for the processes it creates at the next higher level and for no others. The reliability of the system is thus, in part, achieved through the isolation of control programs' environments, since the kernel acts as the interface between a control program and the system hardware. Under control of the kernel, it is thus possible to execute concurrently several control programs, each tailored to support a particular type of application, be it batch work, testing of hardware modules, or time sharing.

Other objects, features and advantages of the subject invention are presented in the following detailed description of the preferred embodiments and illustrated in the accompanying drawings, wherein:

FIG. 1 depicts the general configuration of the subject invention;

FIGS. 2A and 2B comprise a general block diagram of a system of the instant invention;

FIGS. 3A and 3B comprise a more detailed block diagram of the system shown in FIG. 2;

FIG. 10 is a representation of the format of a fail register for the central processor module of FIG. 4;

Figures 2, 2B:
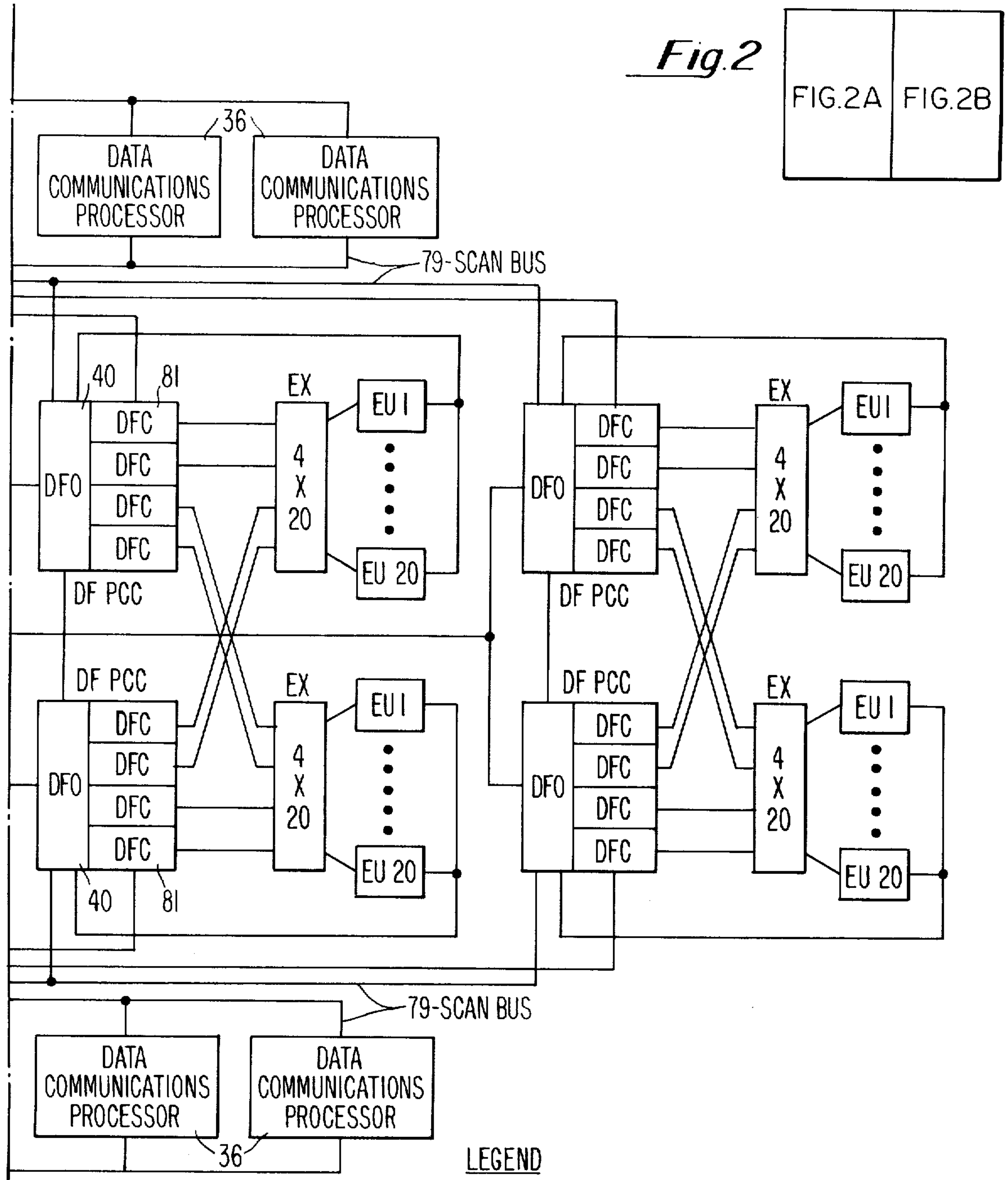
Figure 2A:
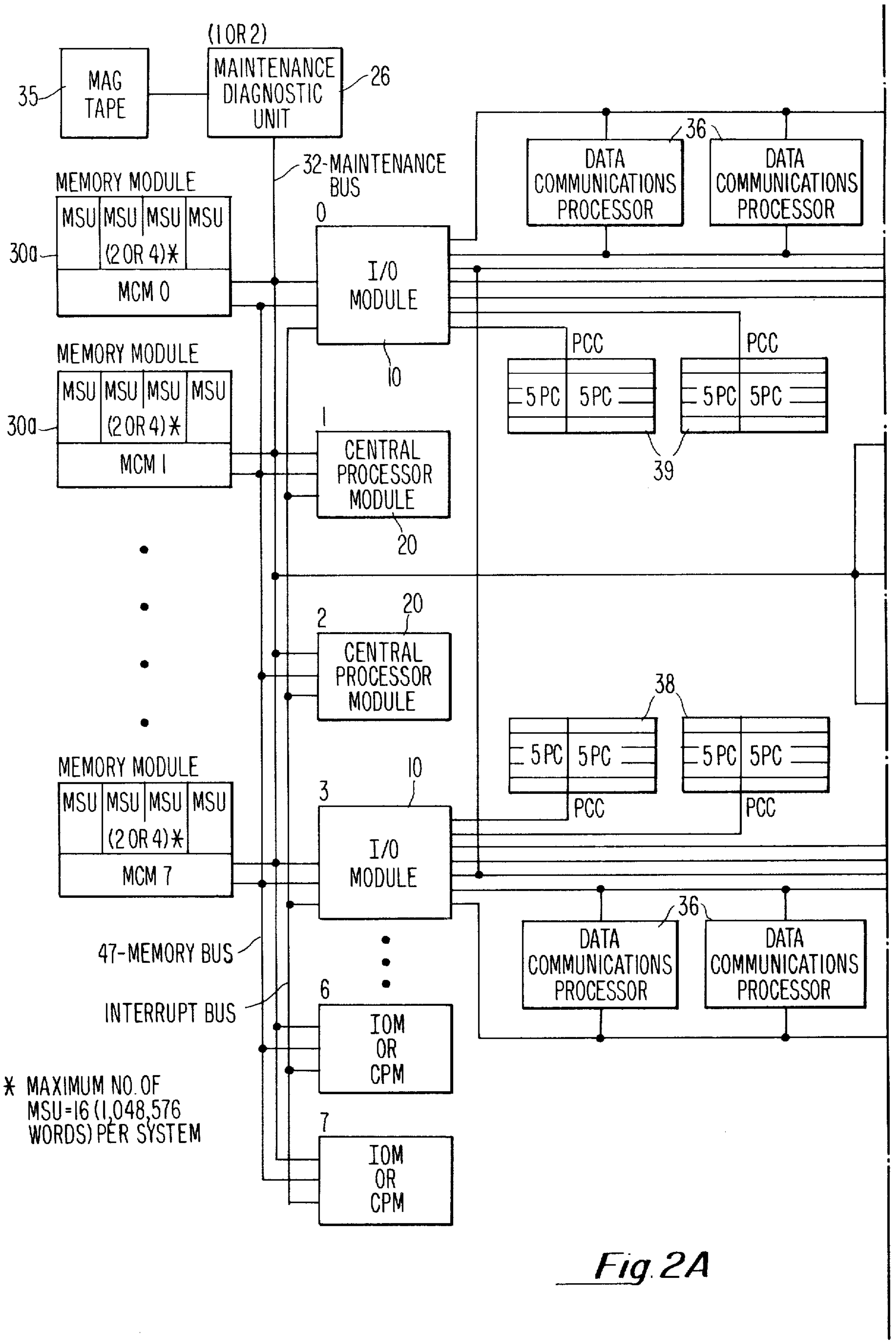
Figure 4:
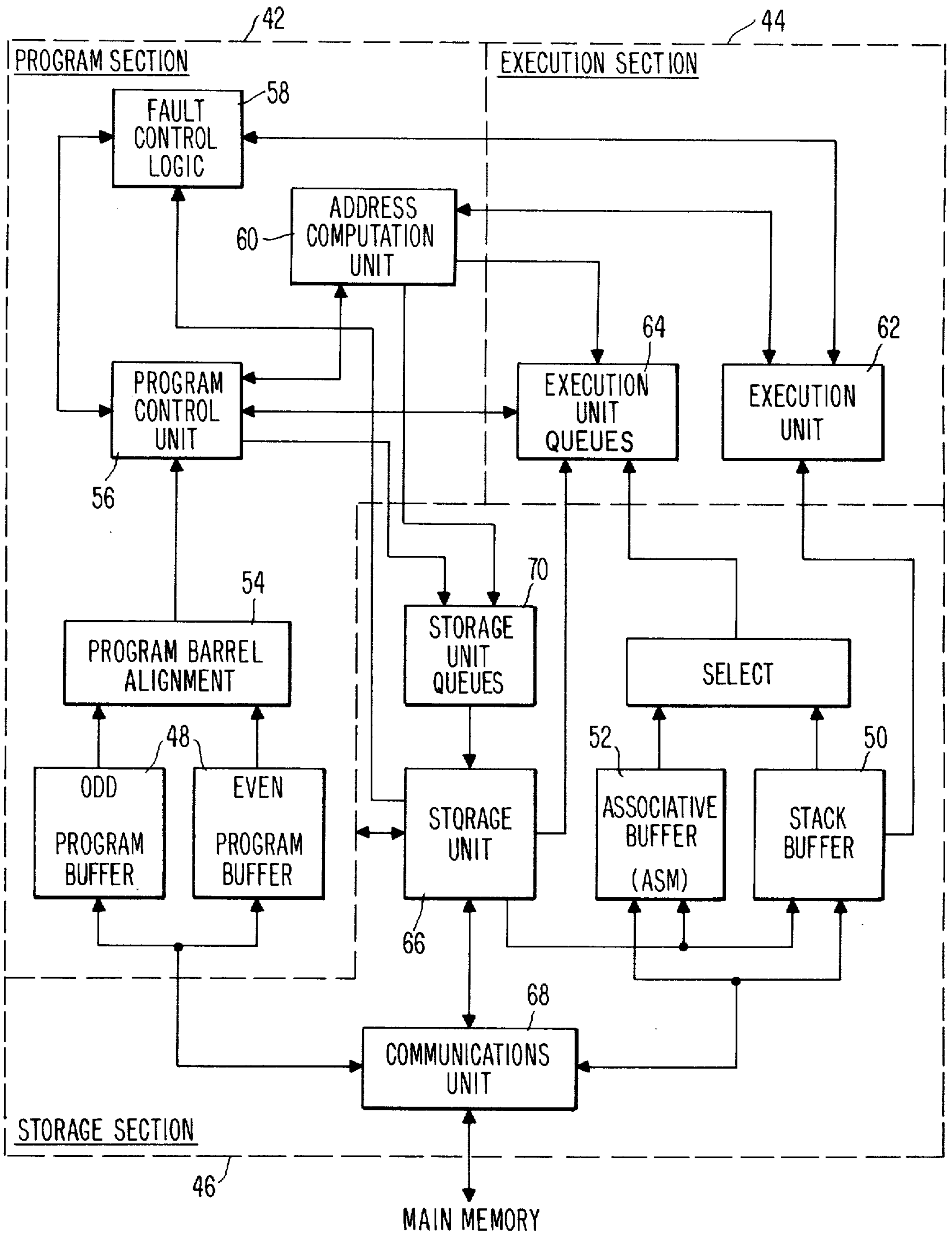
FIG. 4 is a simplified block diagram of a central processor module of the instant invention.
Figure 12:
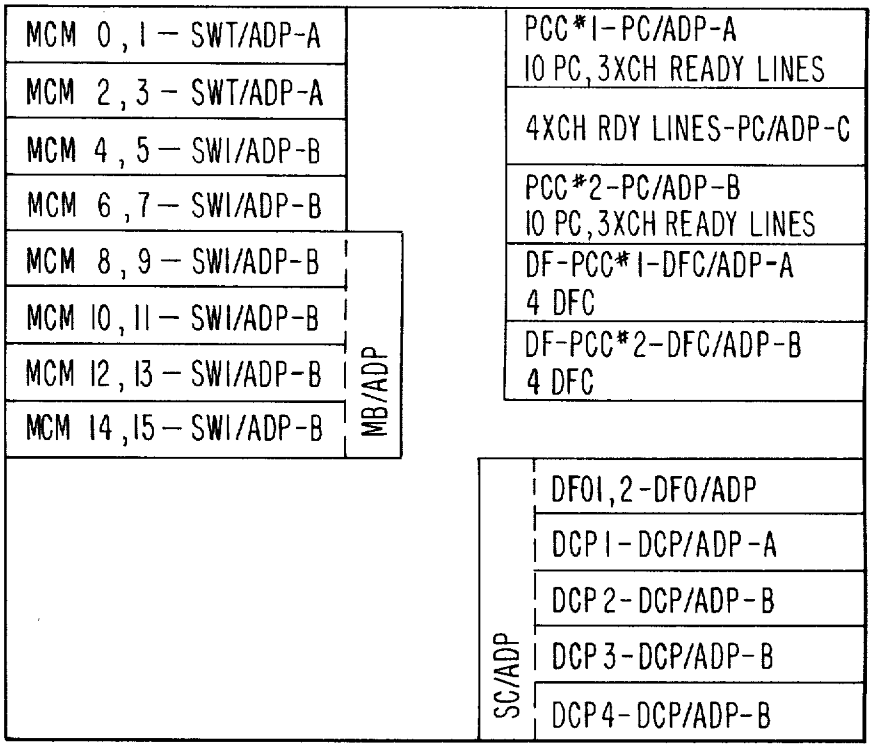
FIg. 12 is a diagram showing the modular organization of an input/output module of the instant invention.
Figure 21:
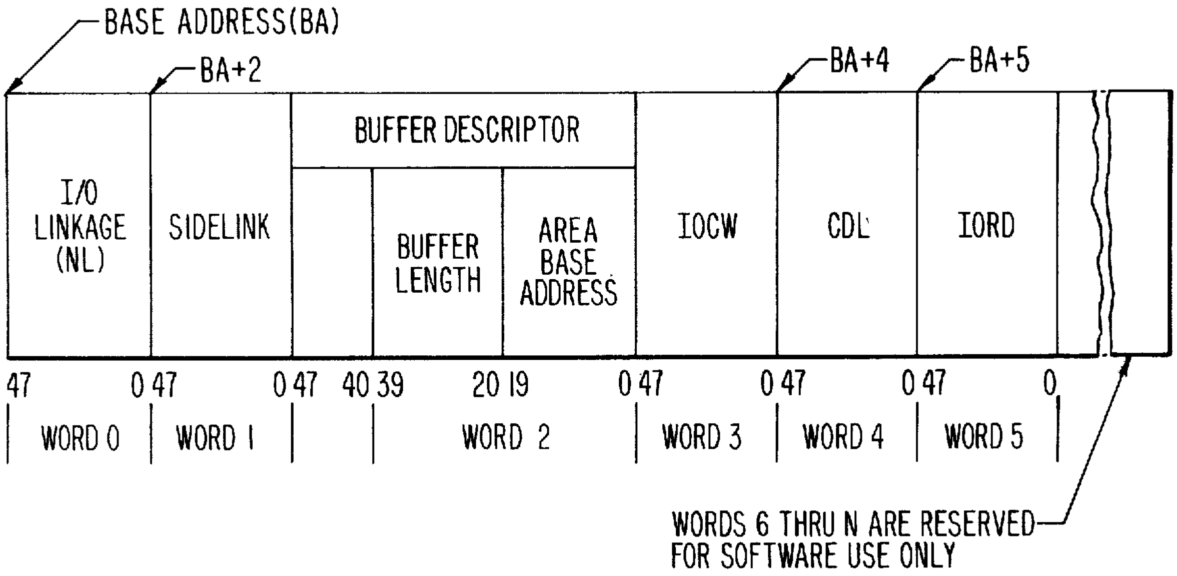
Figures 15, 15B:
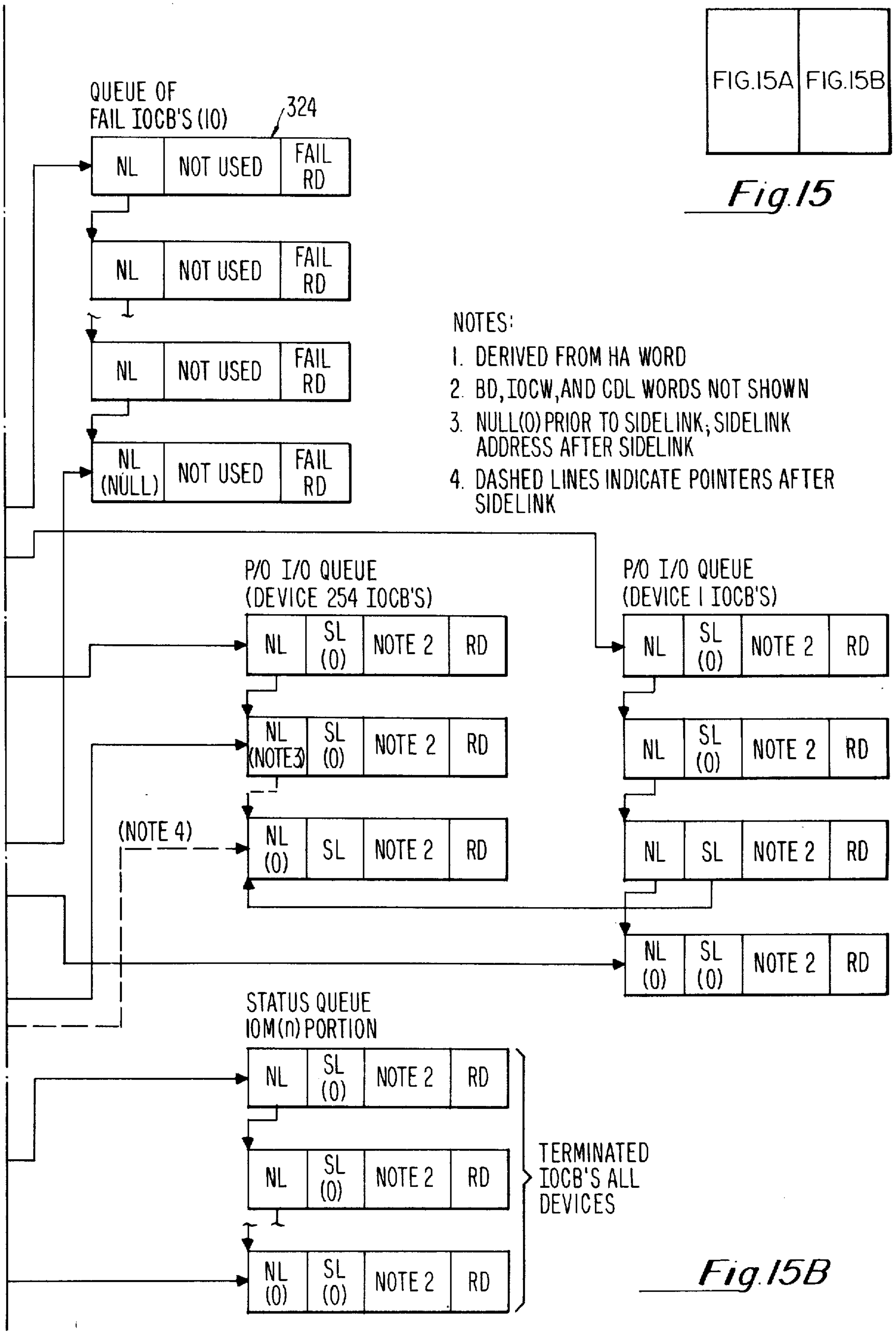
Figure 15A:
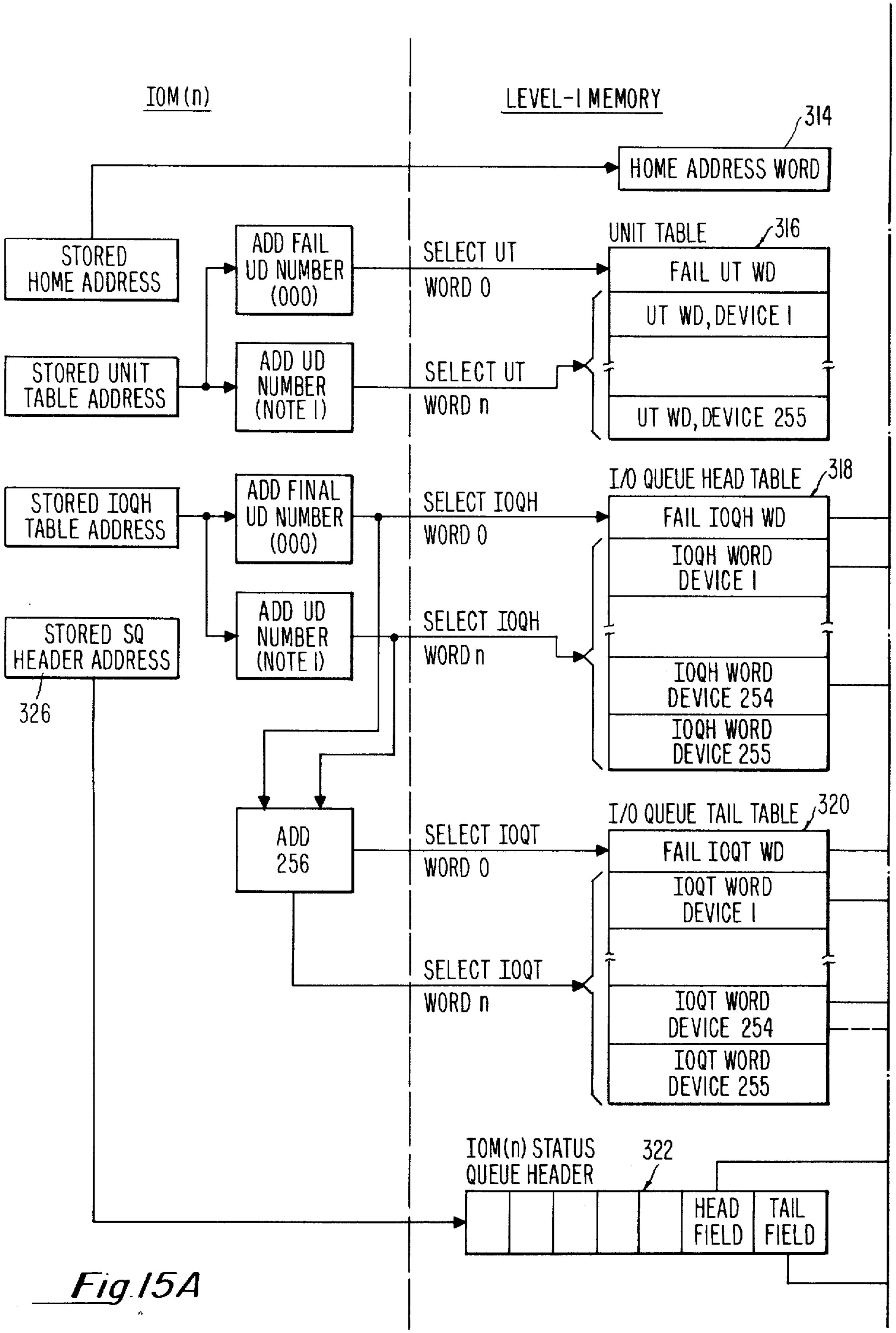
Figure 16:
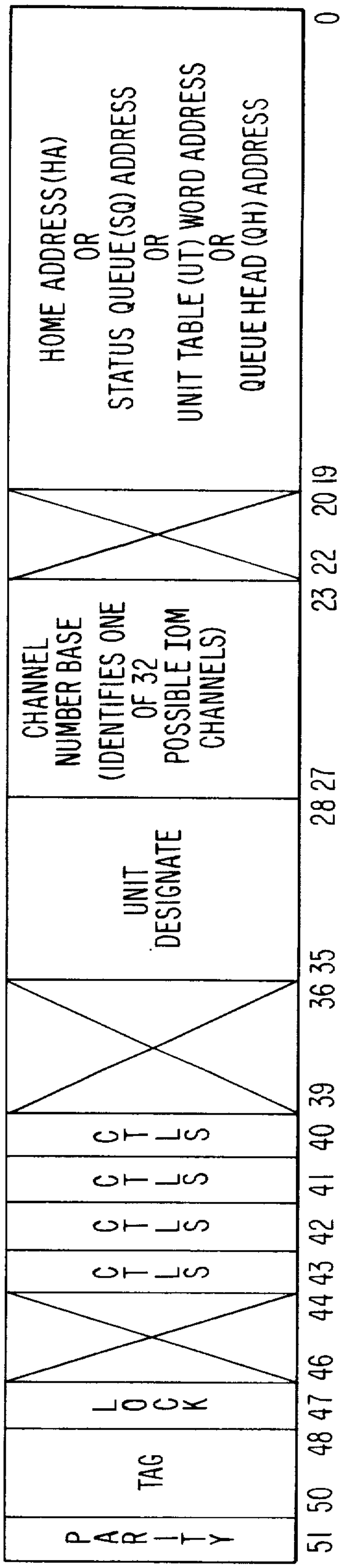
Figure 17:
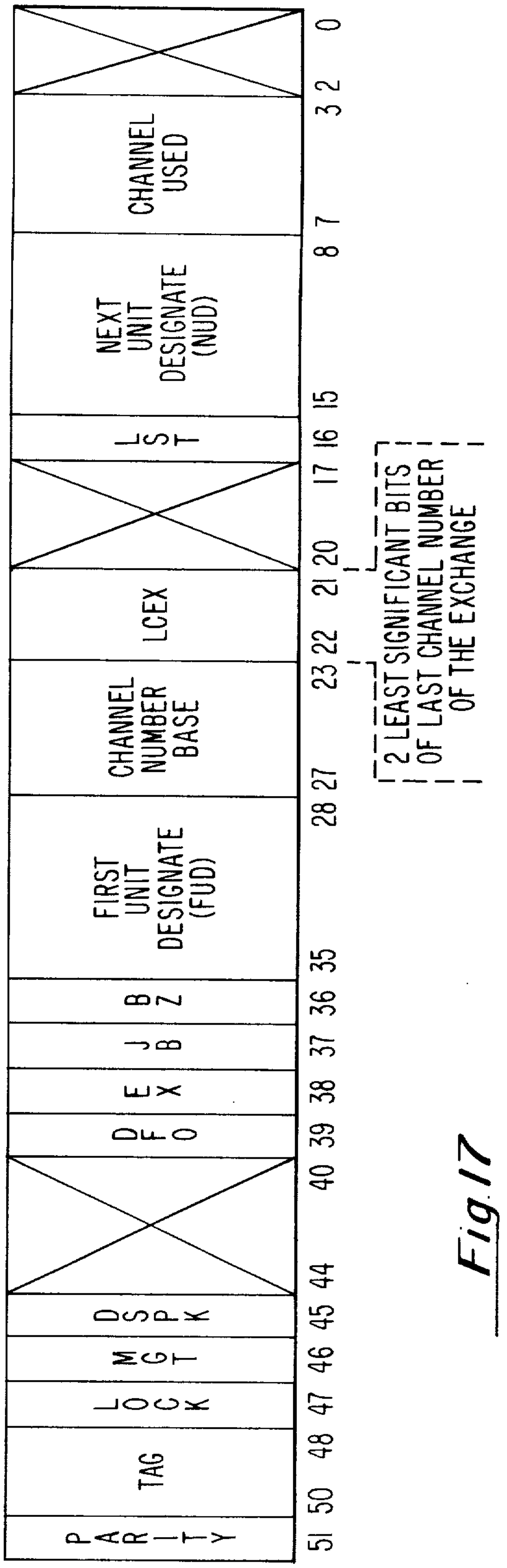
Figure 18:
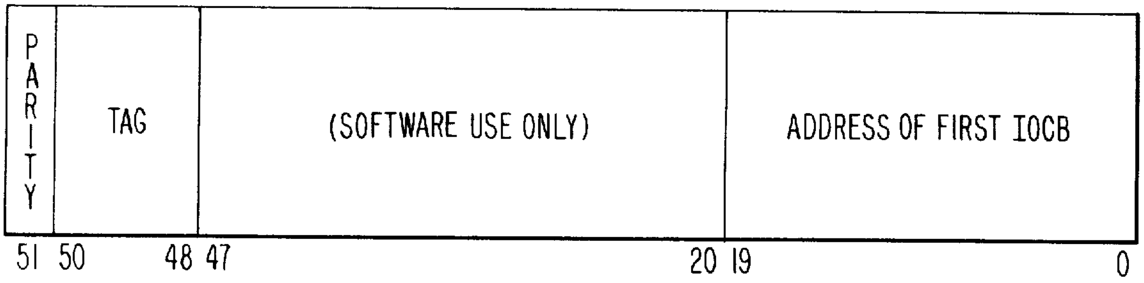
Figure 19:
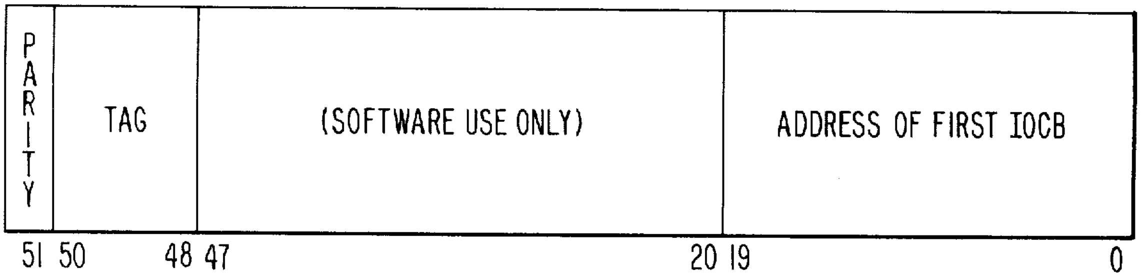
Figure 20:
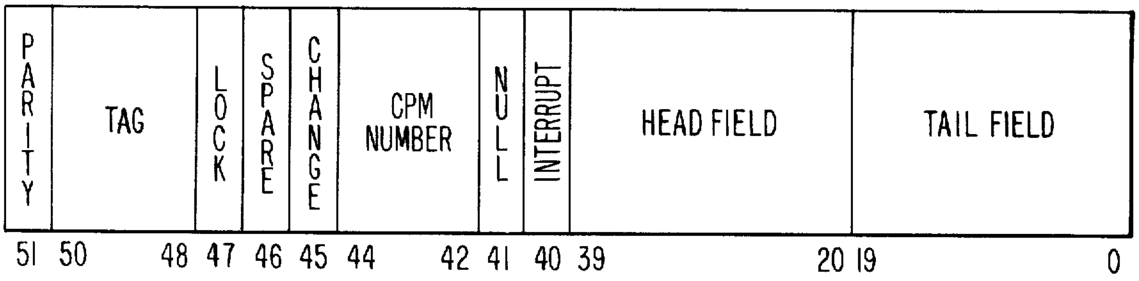
Figure 22:
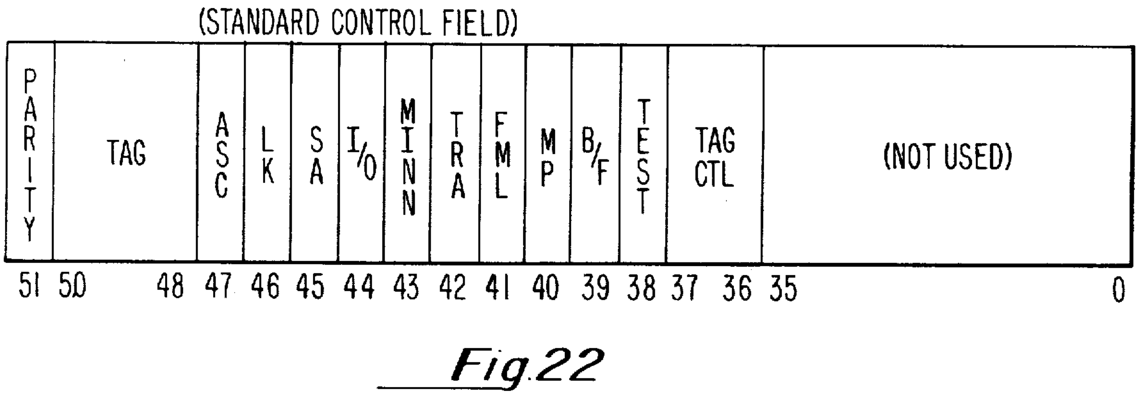
Figure 23:
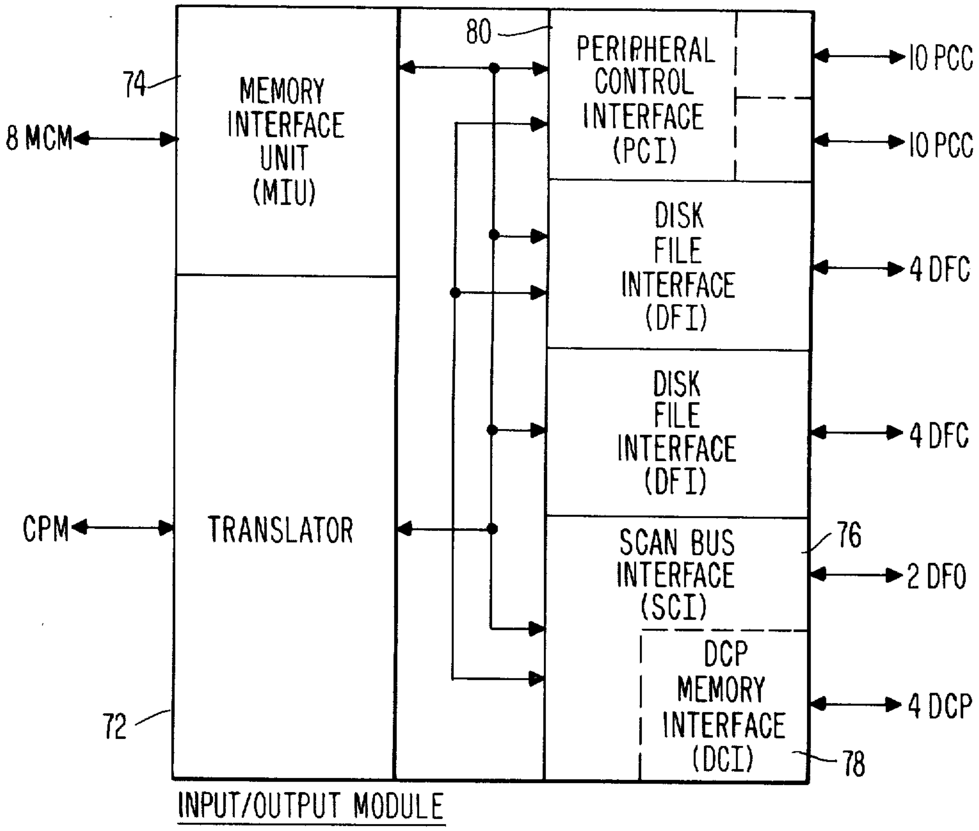
Figure 24:
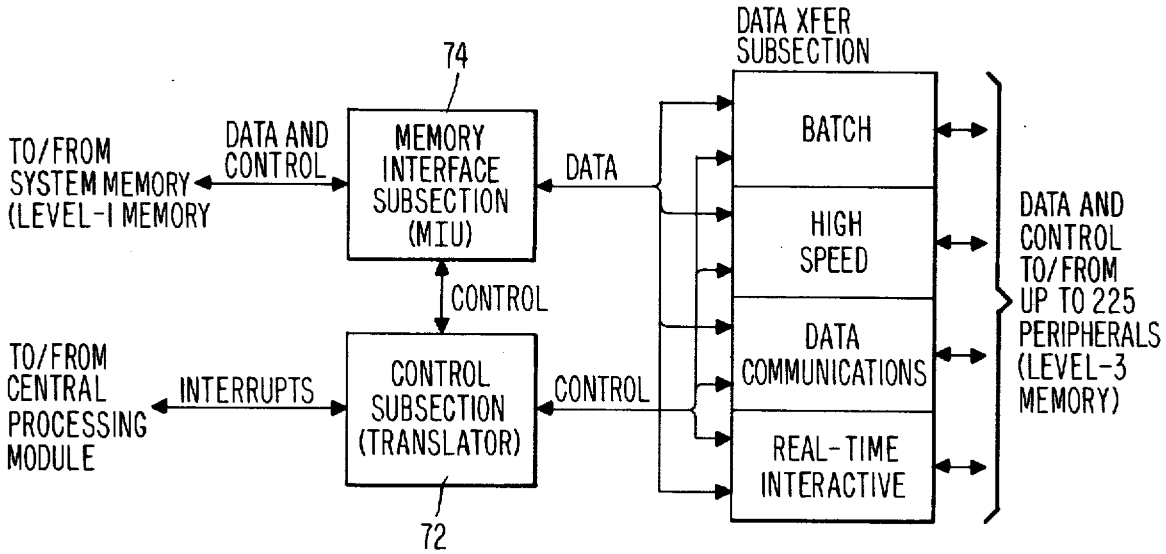
Figure 25:
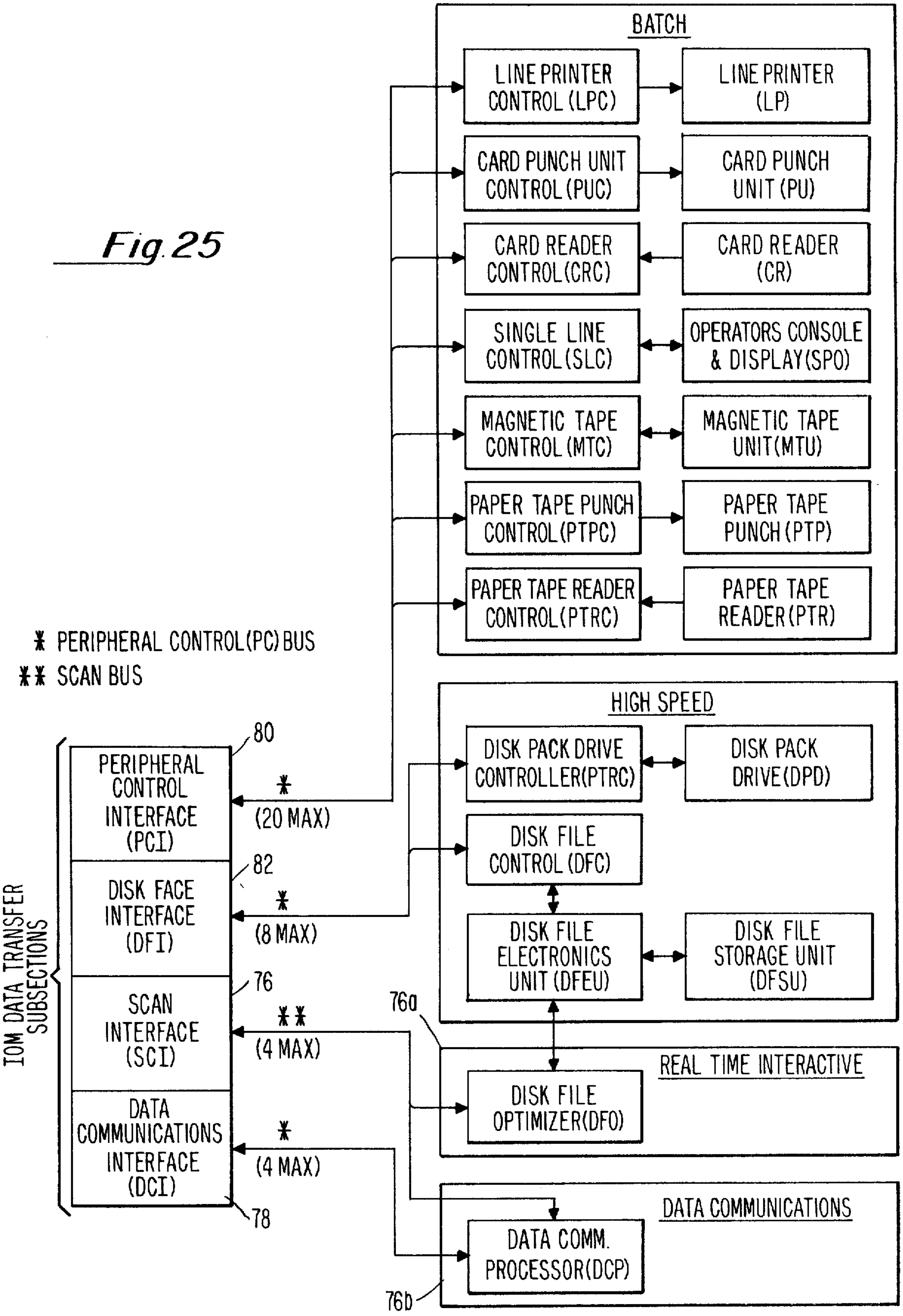
Figure 26:
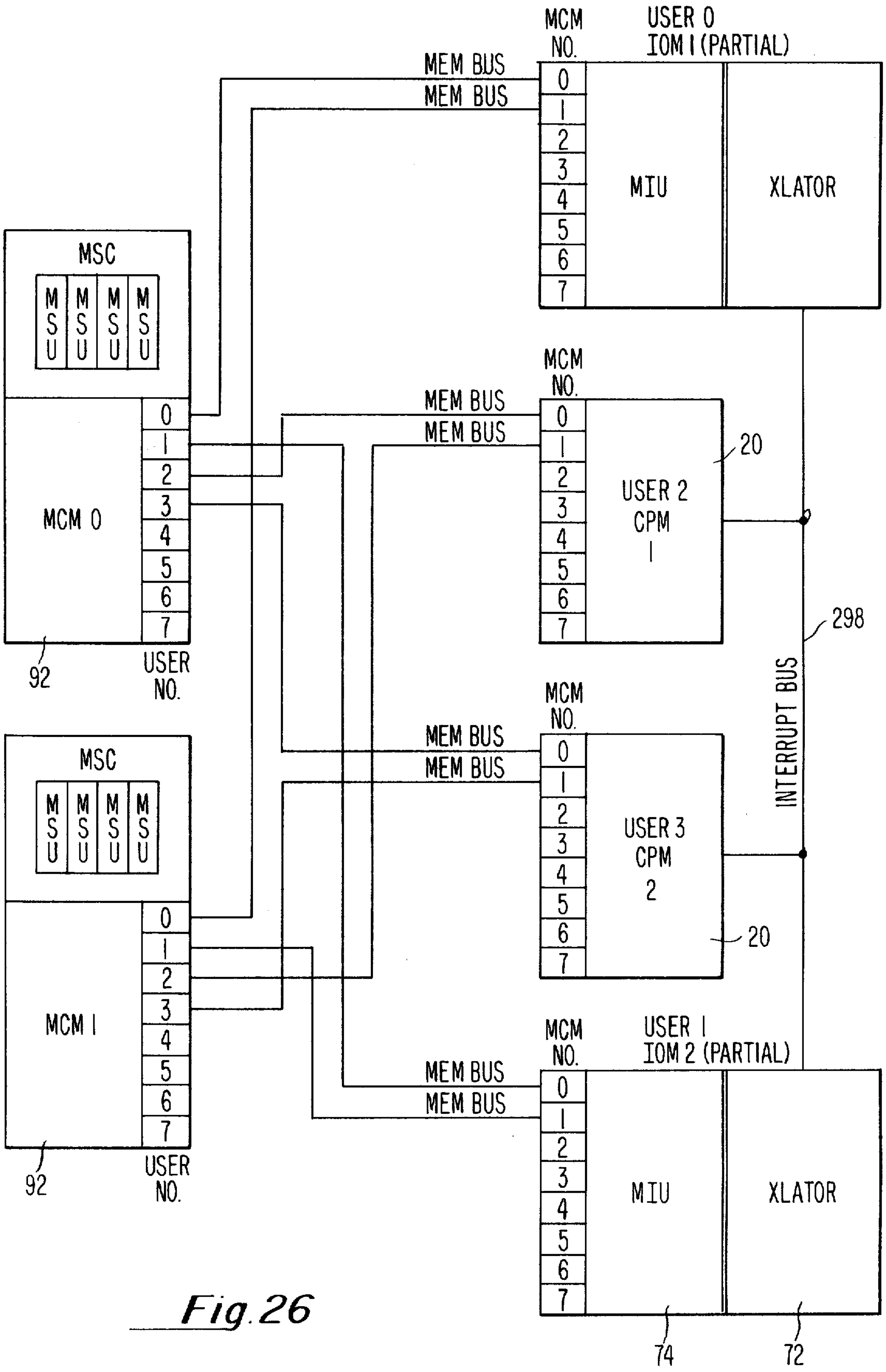
Figure 27:
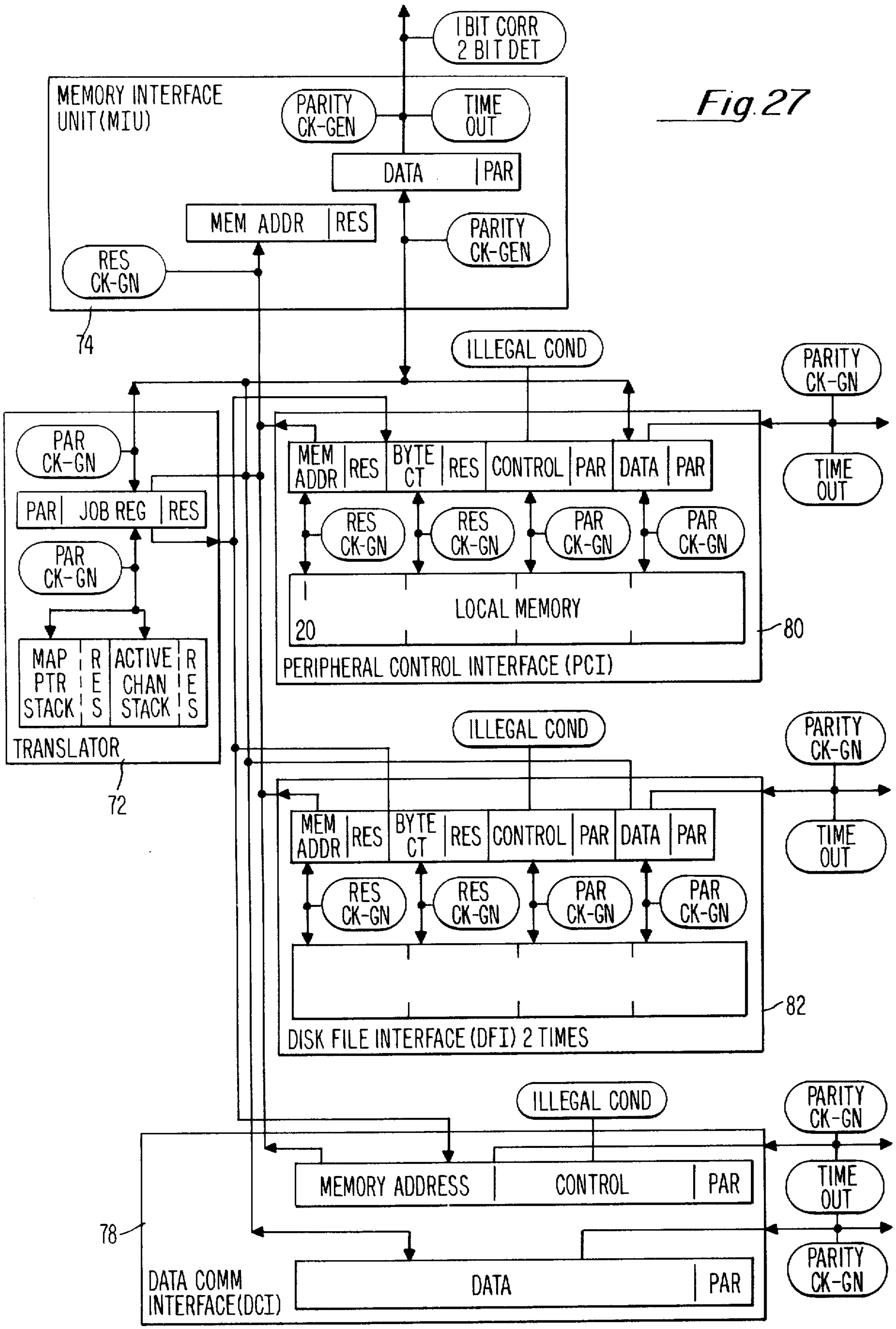
Figure 28B:
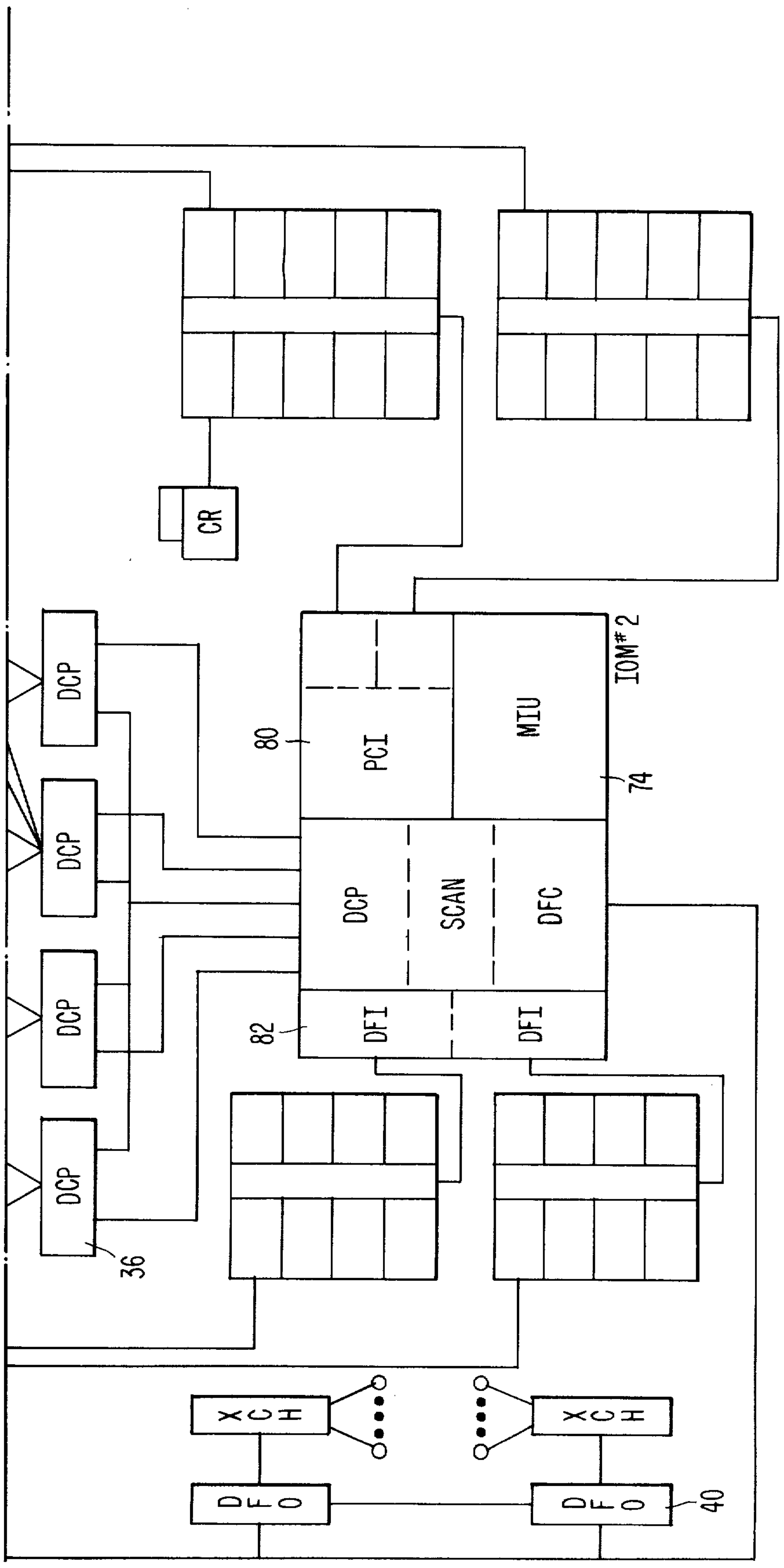
Figure 28:
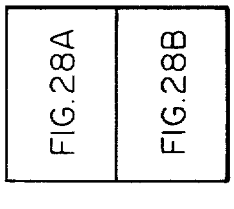
Figure 28A:
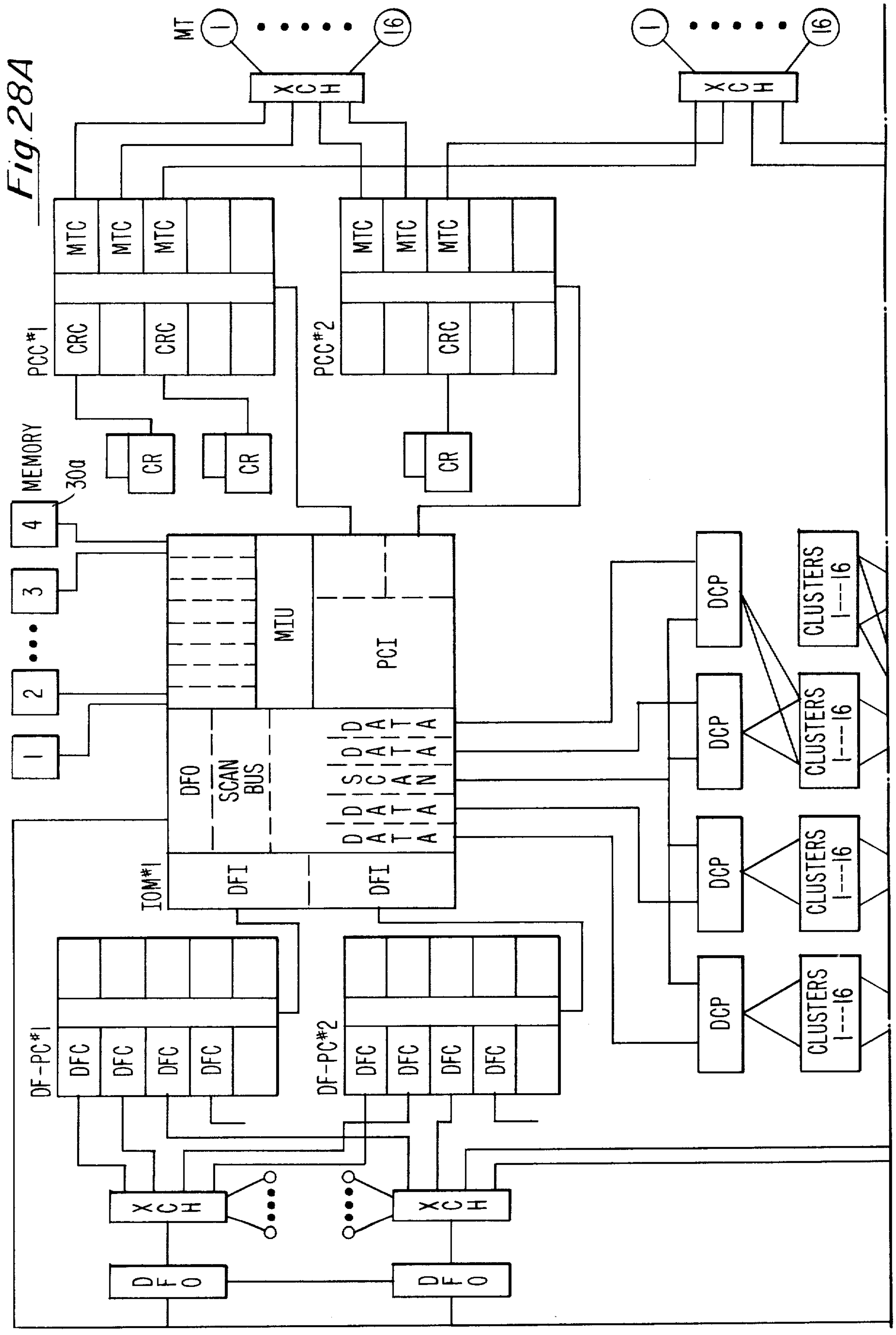
Figure 29:
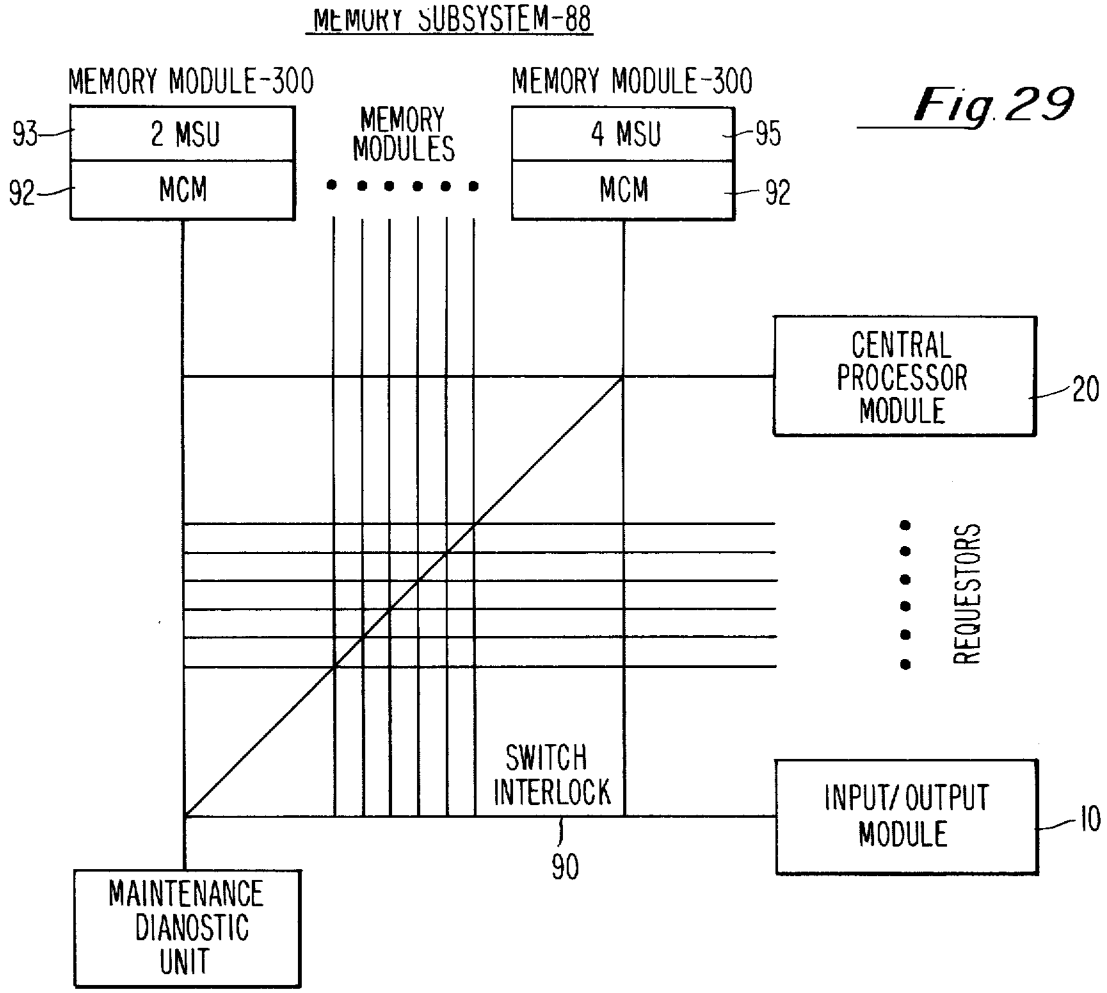
Figure 30:
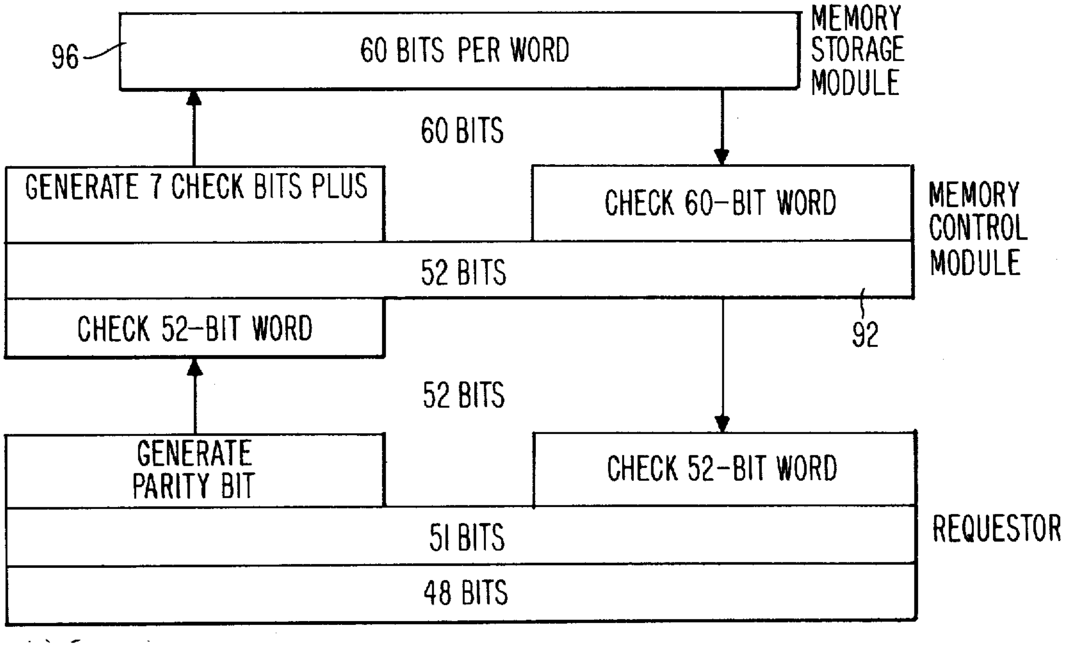
Figure 31:
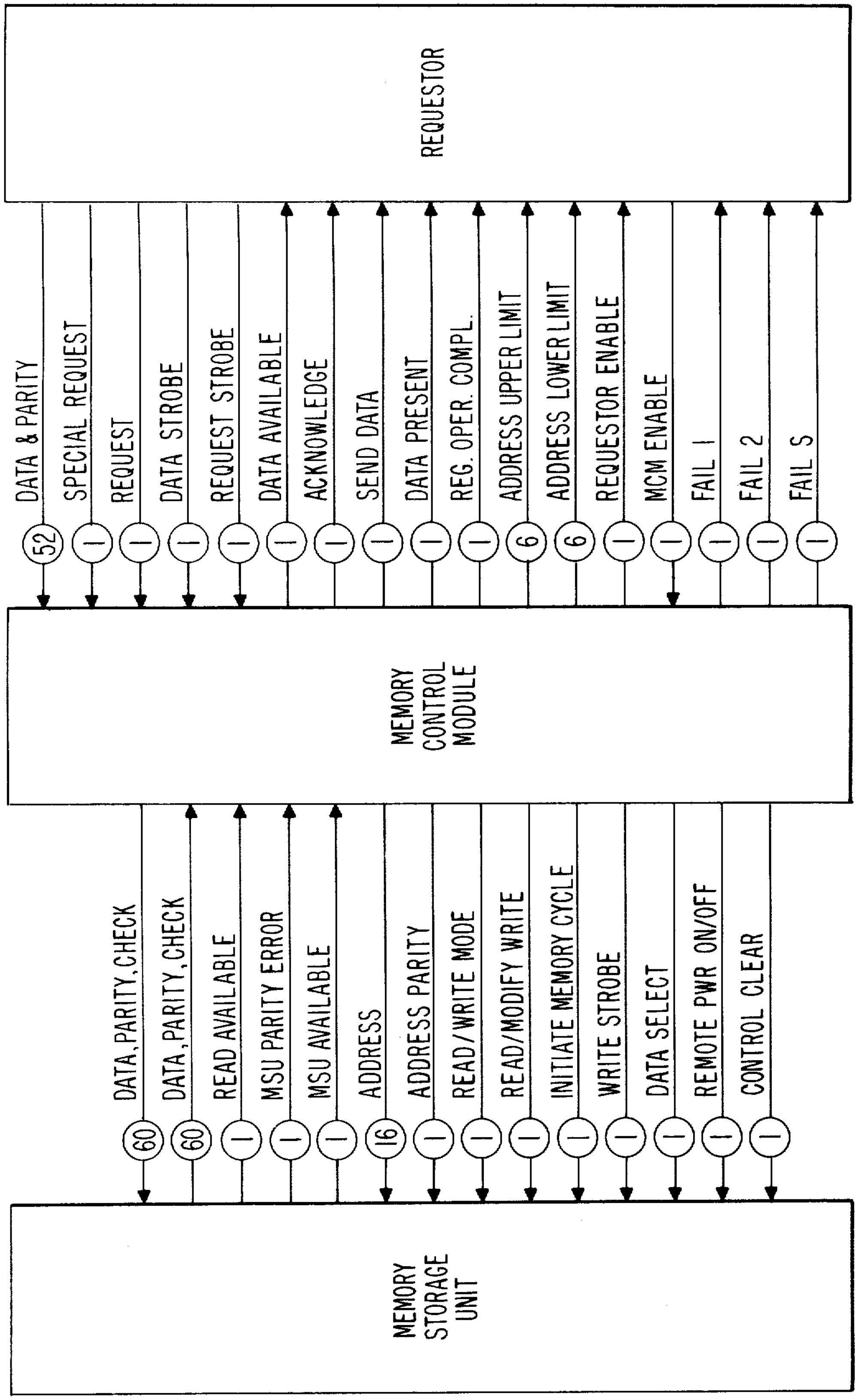
Figure 32:
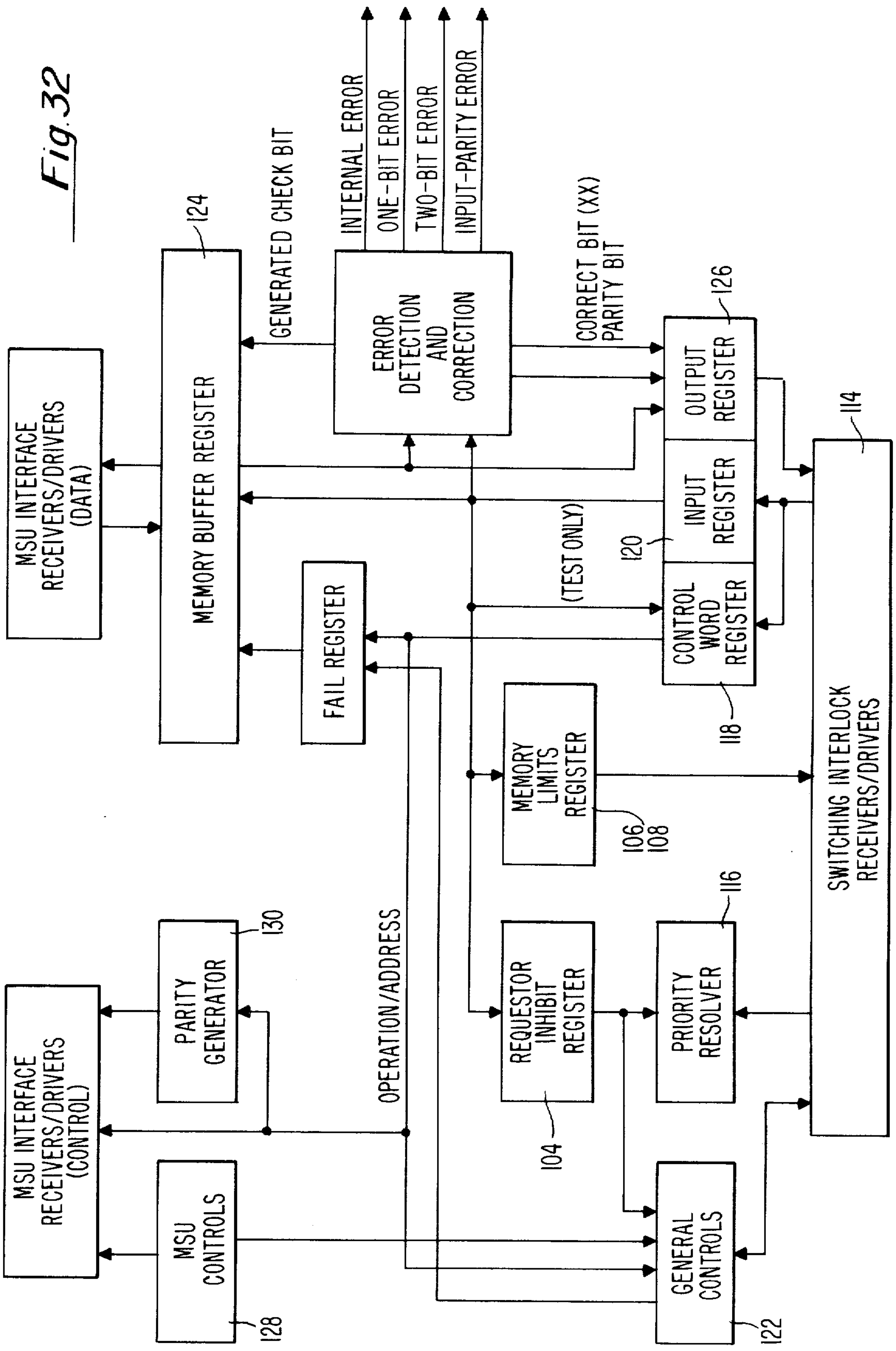
Figures 33, 33B:
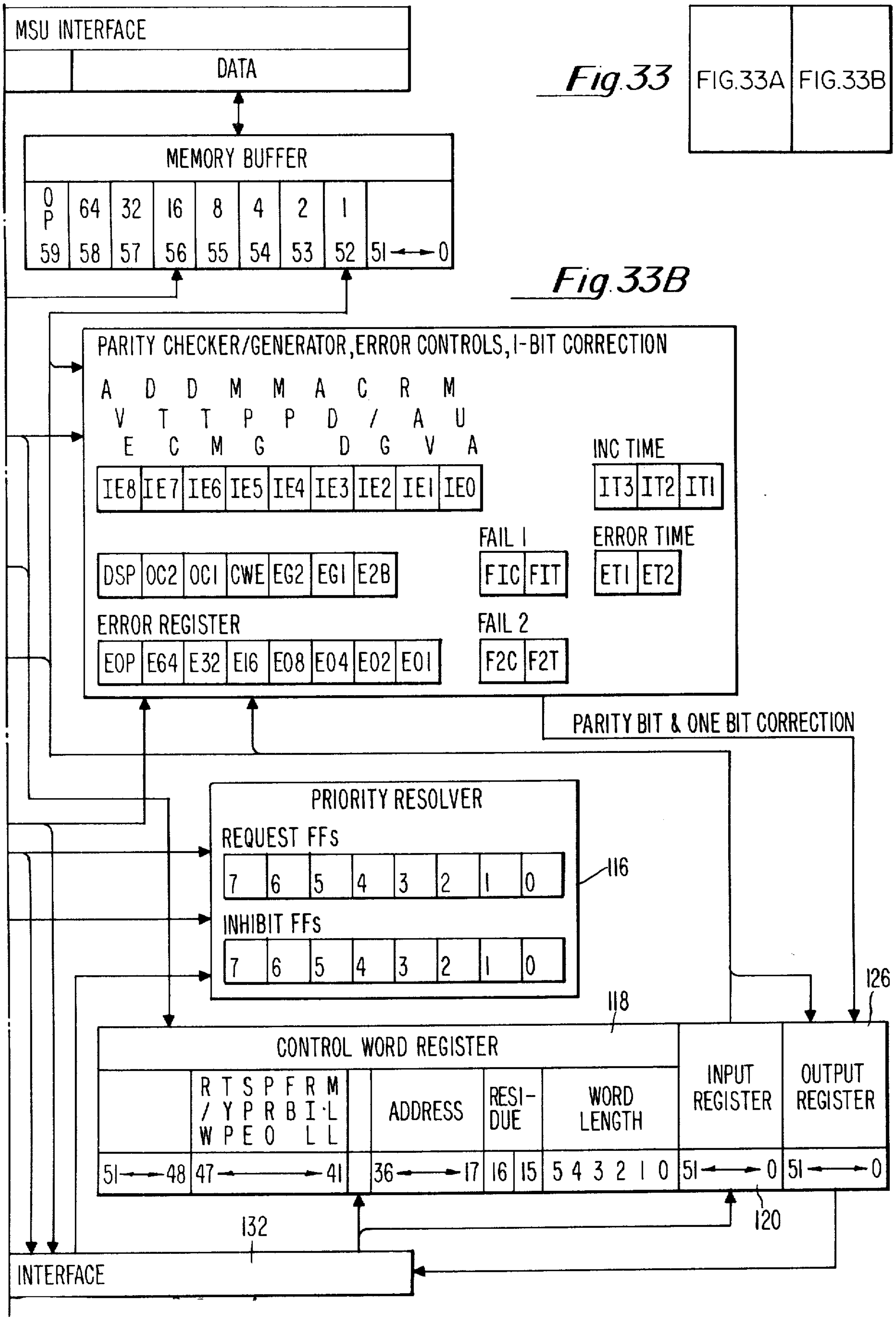
Figure 33A:
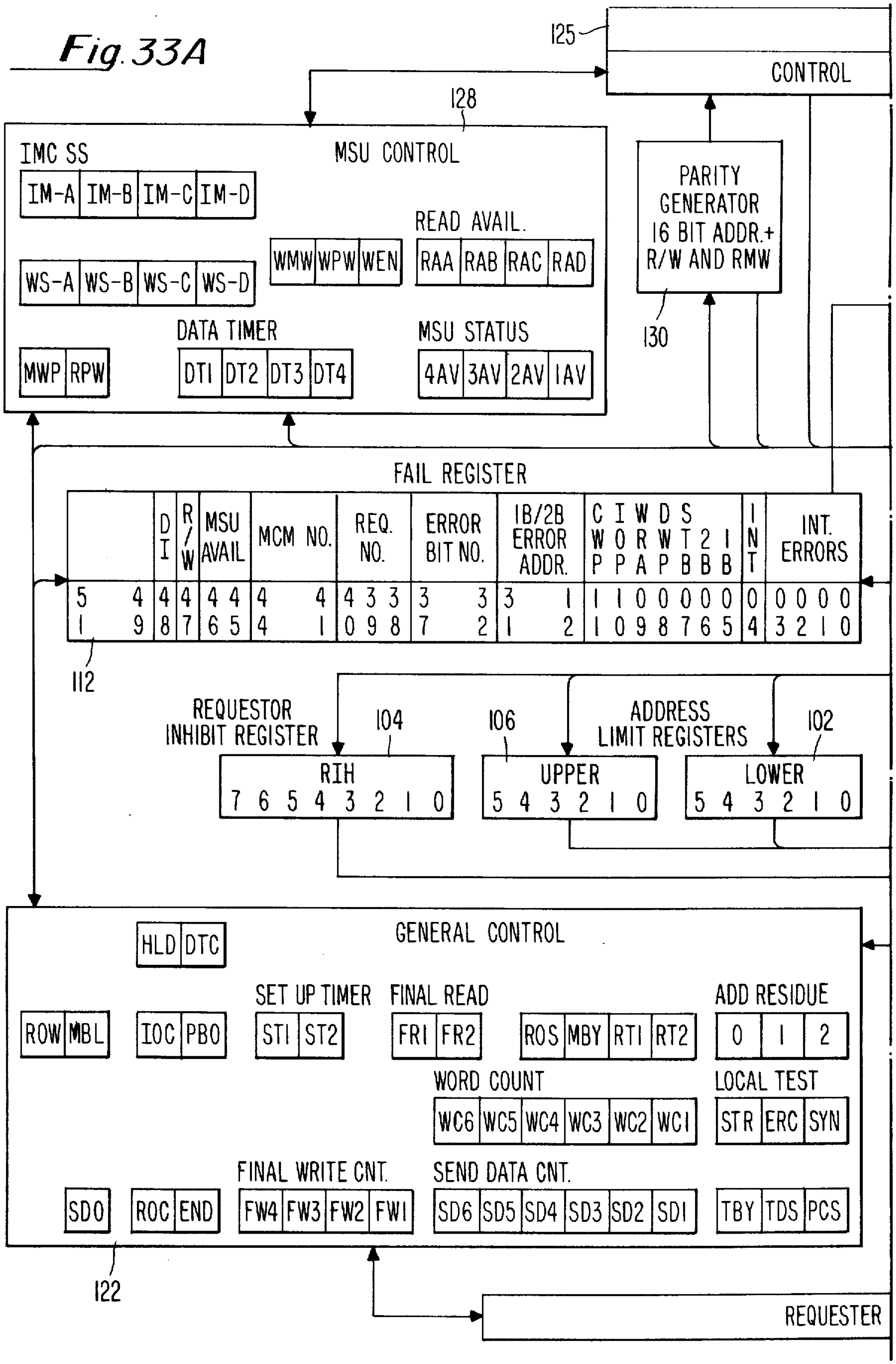
Figure 34:
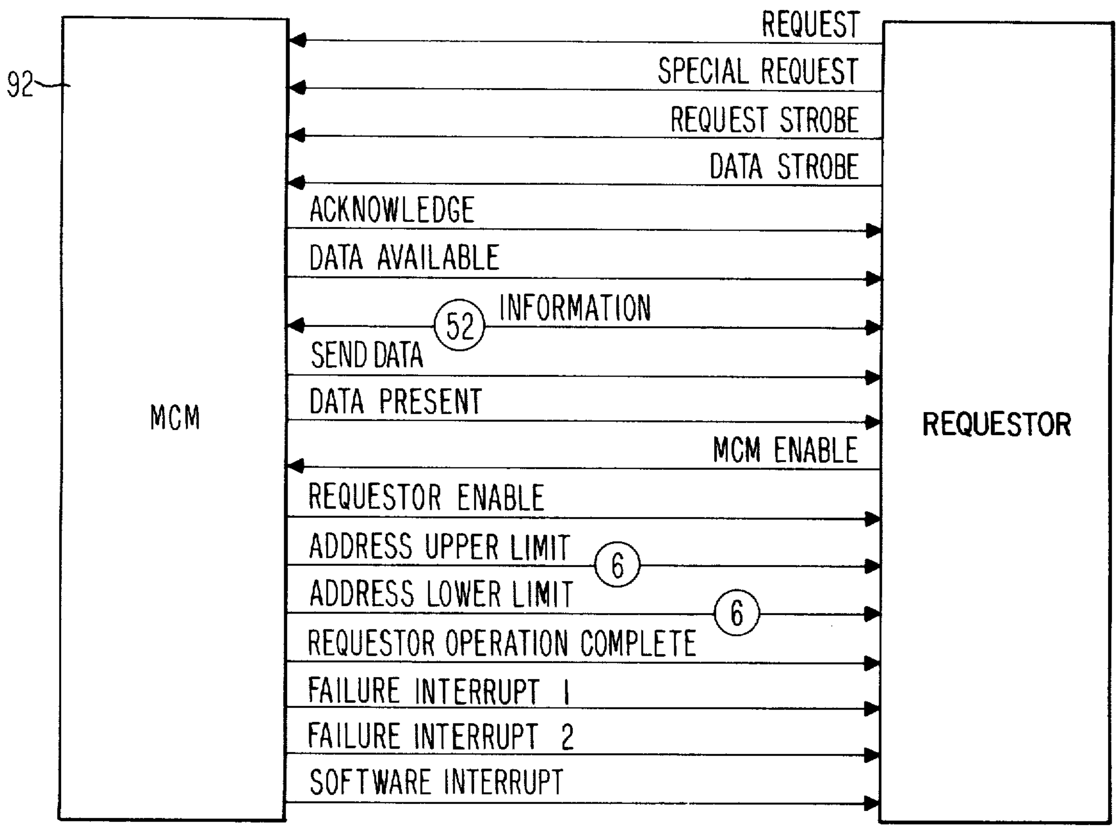
Figure 36:
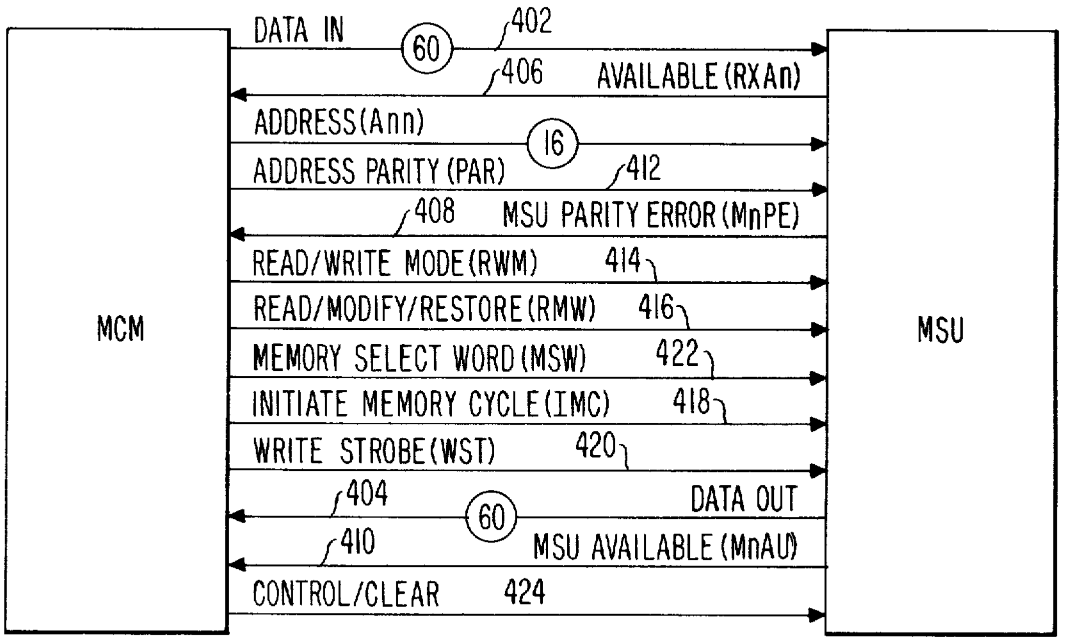
Figure 35:
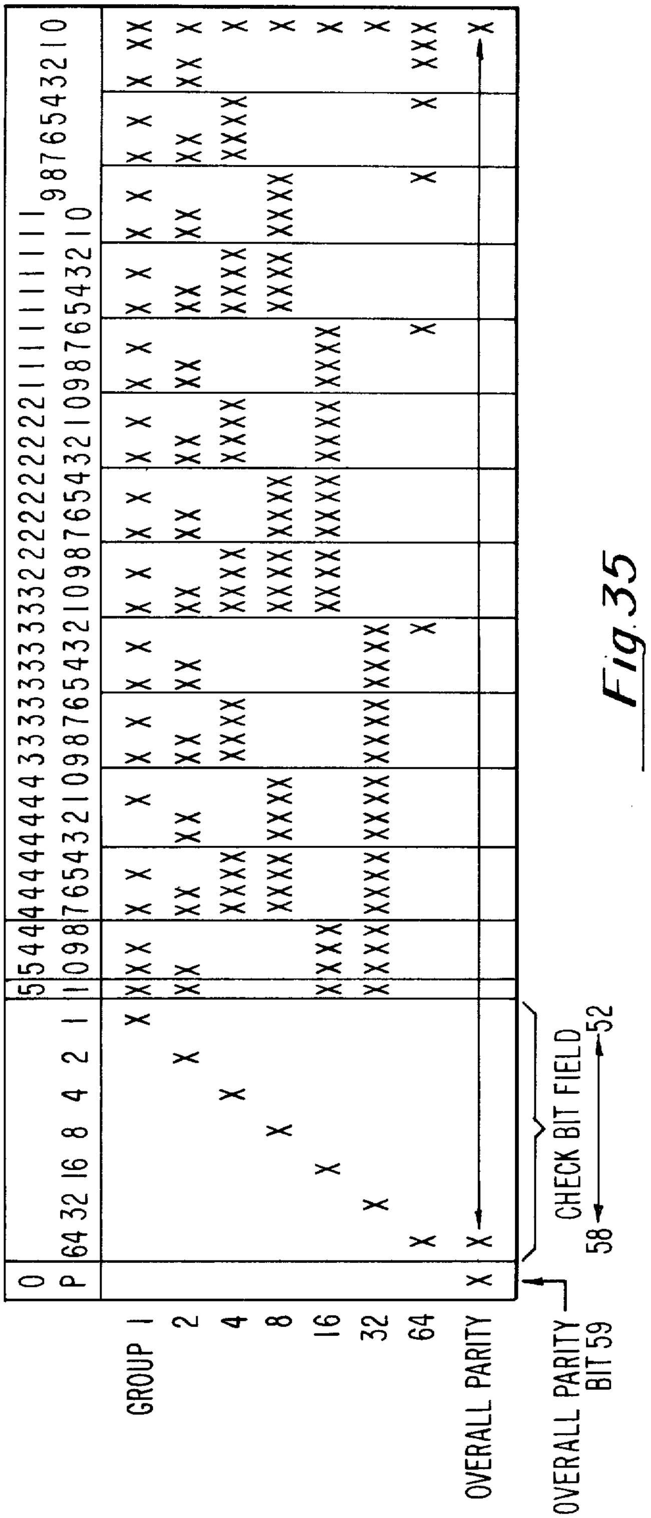
Figure 37:
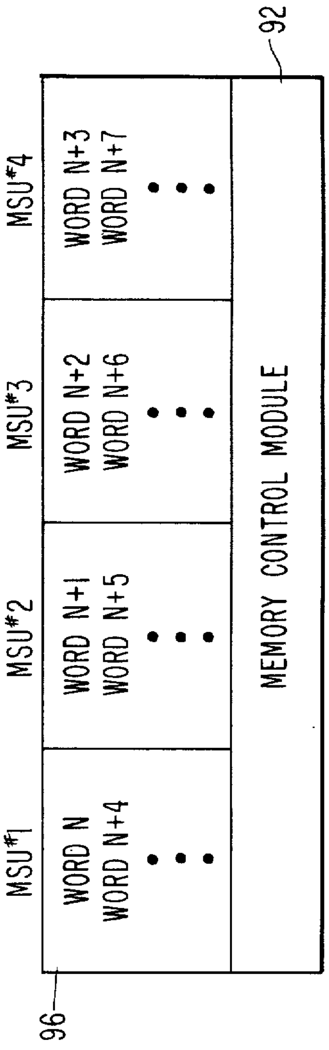
Figures 38, 38B:
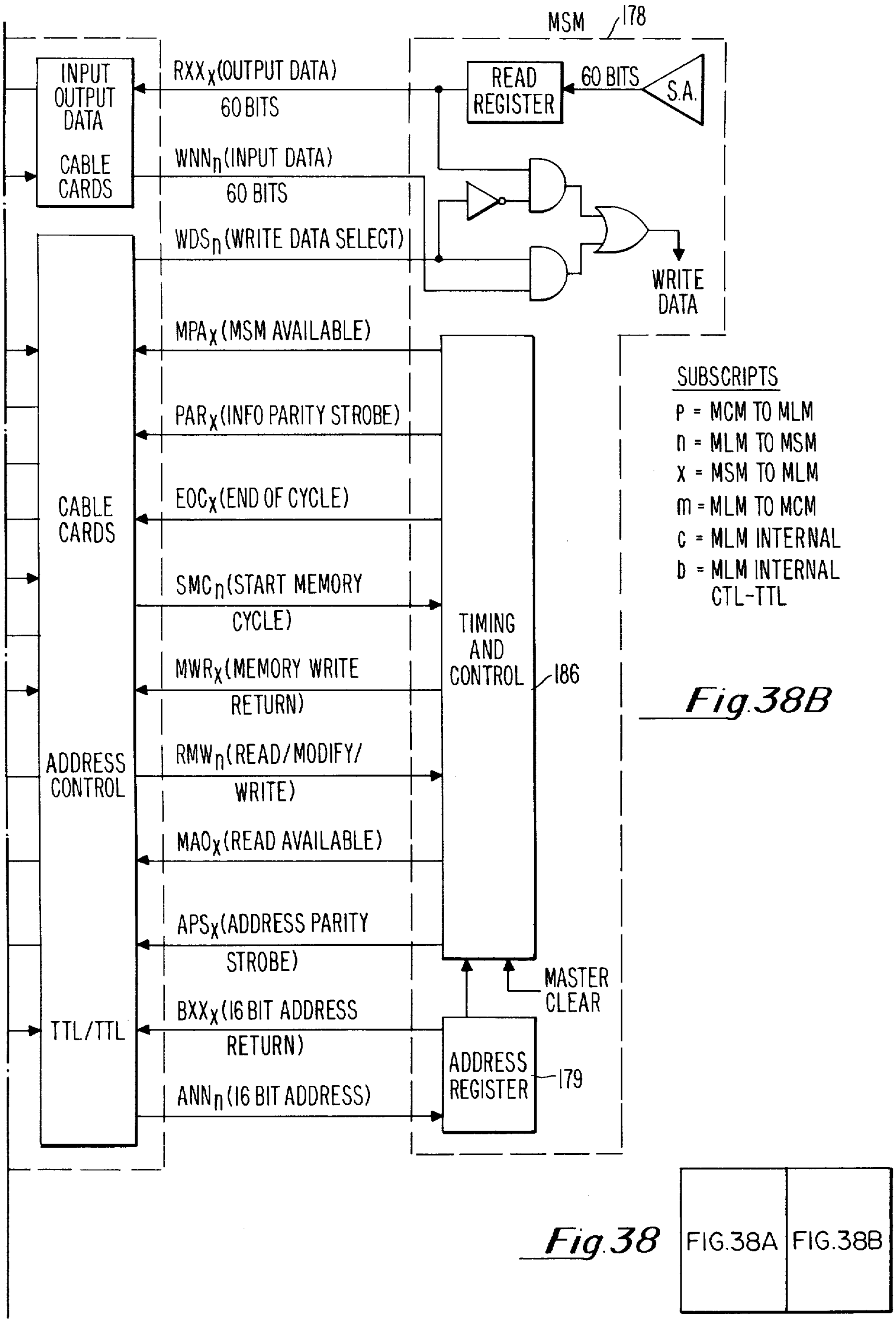
Figure 38A:
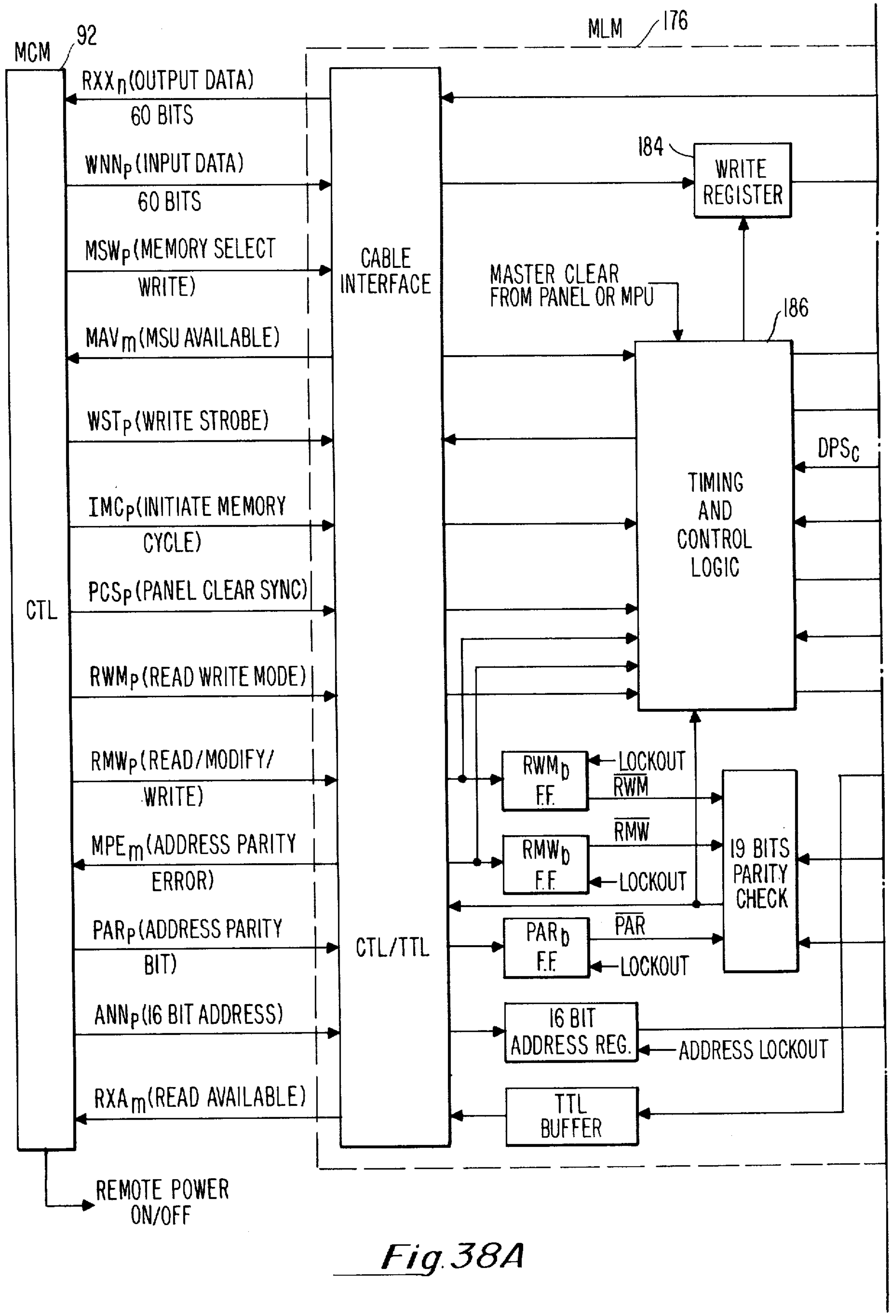
Figure 39:
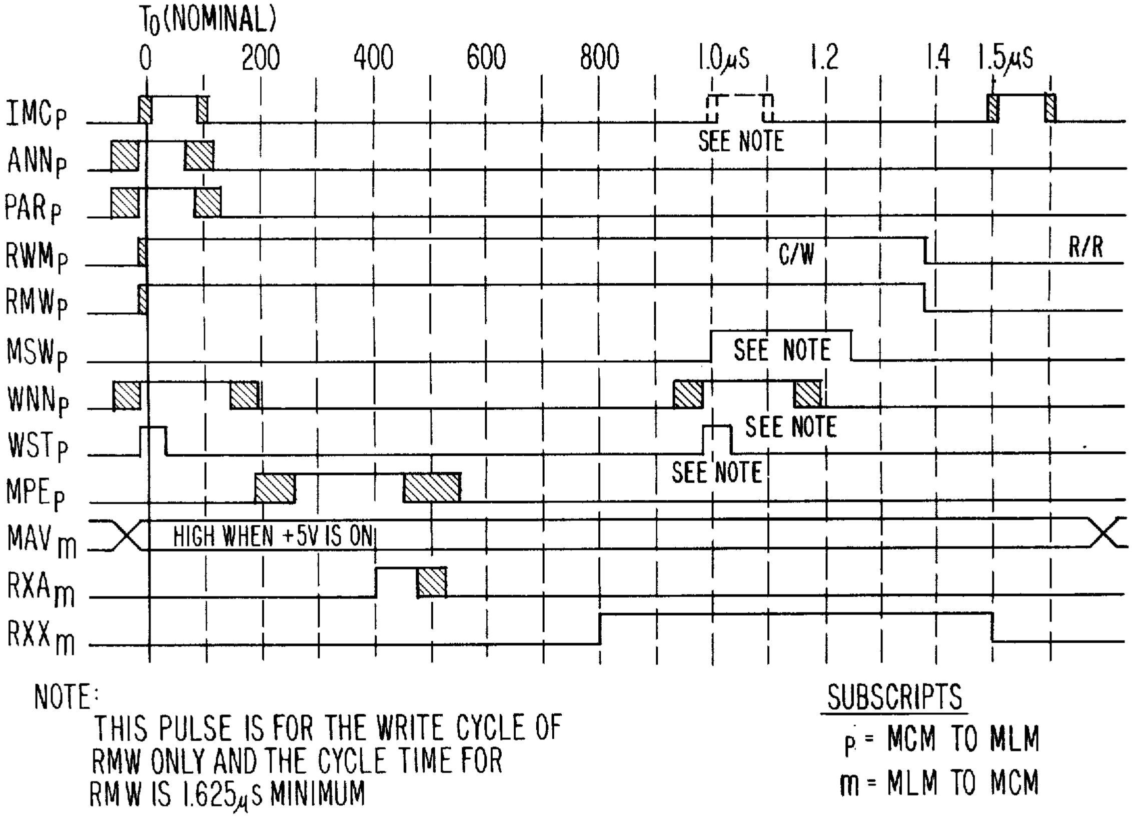
Figure 40:
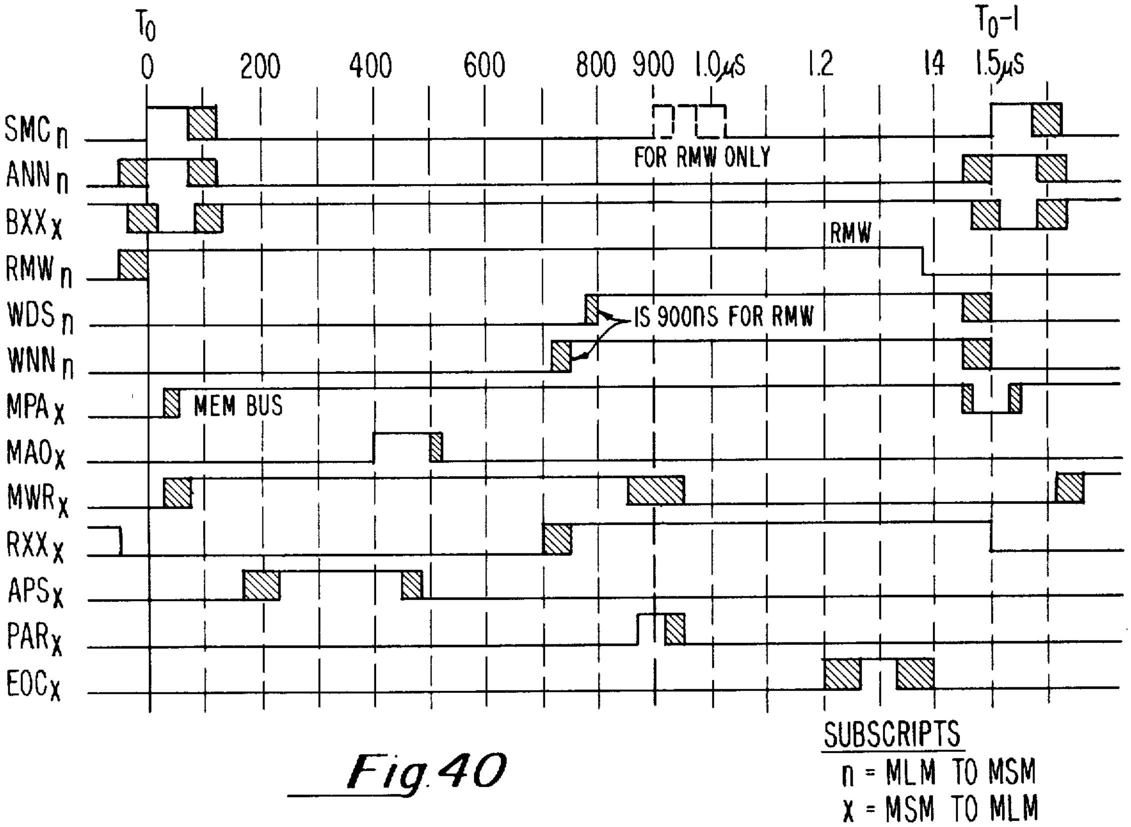
Figure 41:
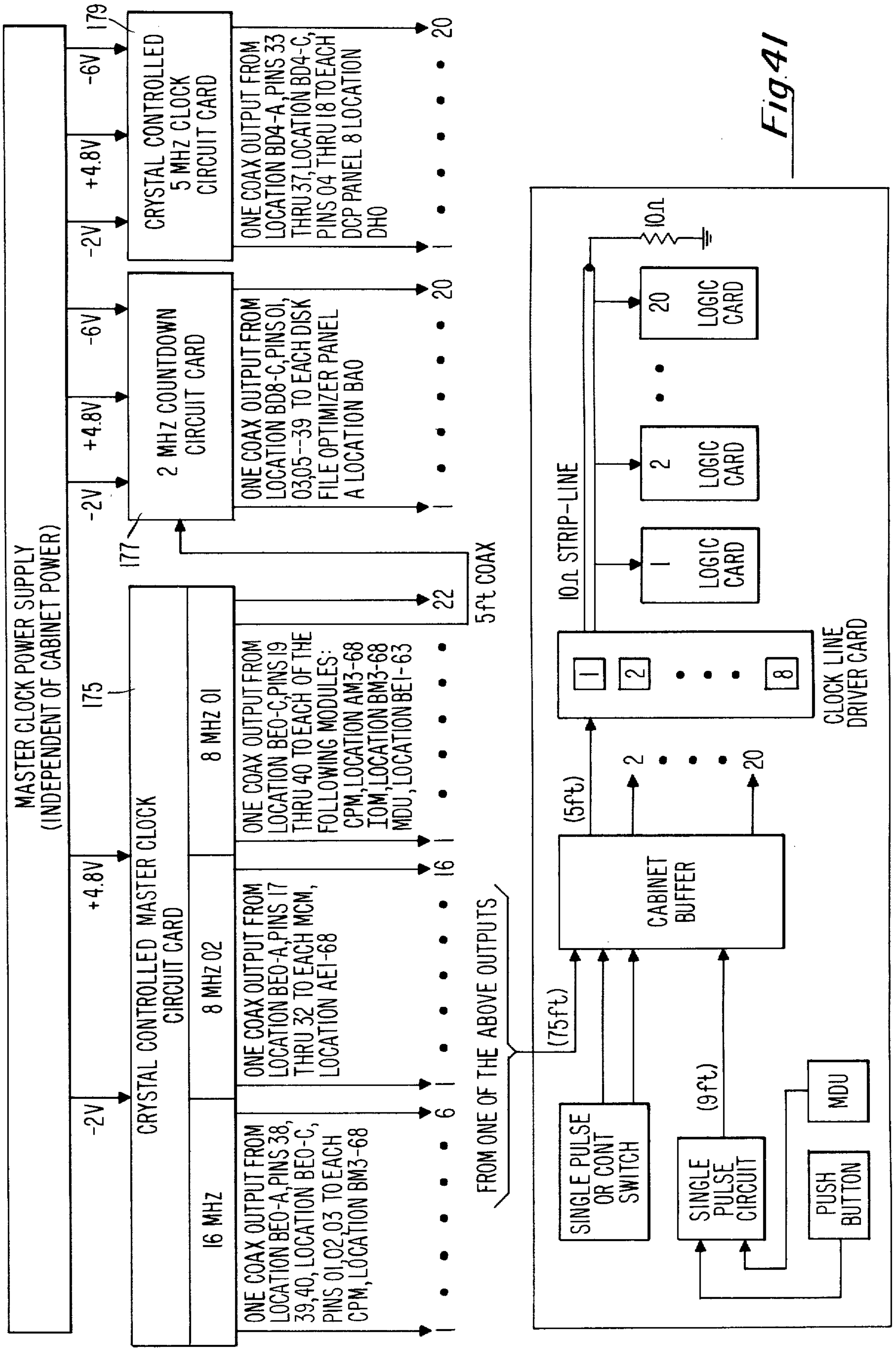
Figure 42:
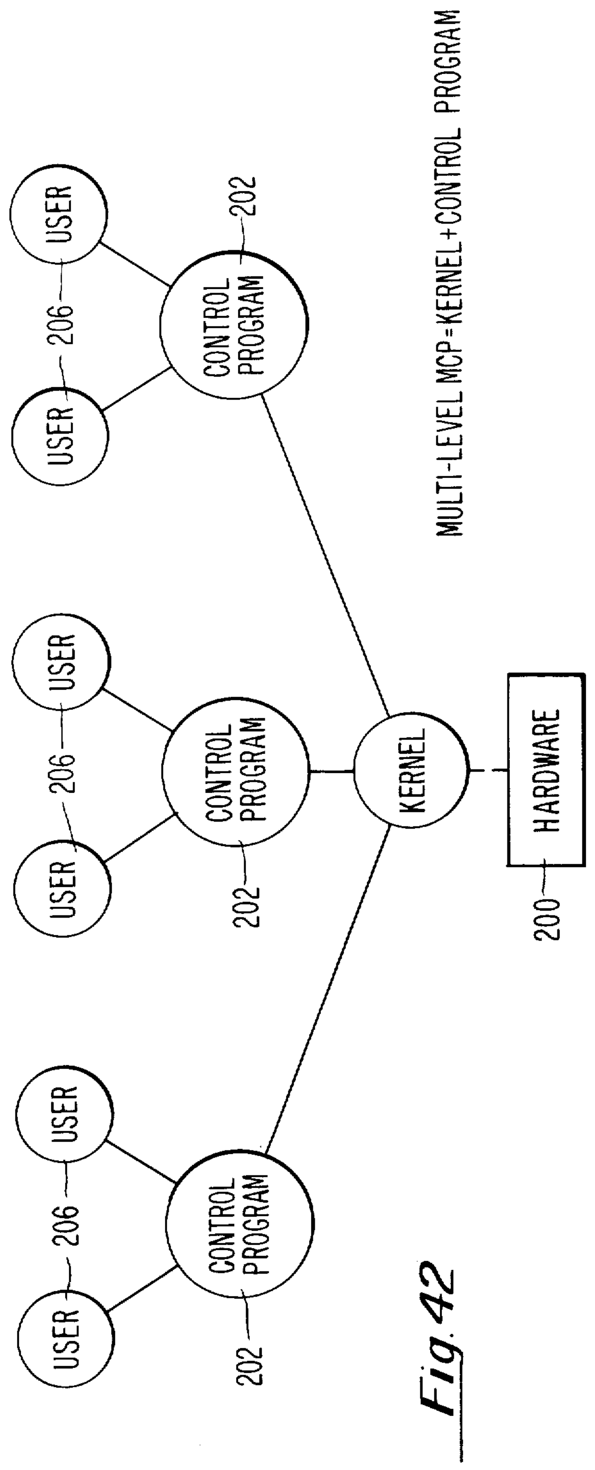
Figure 43:
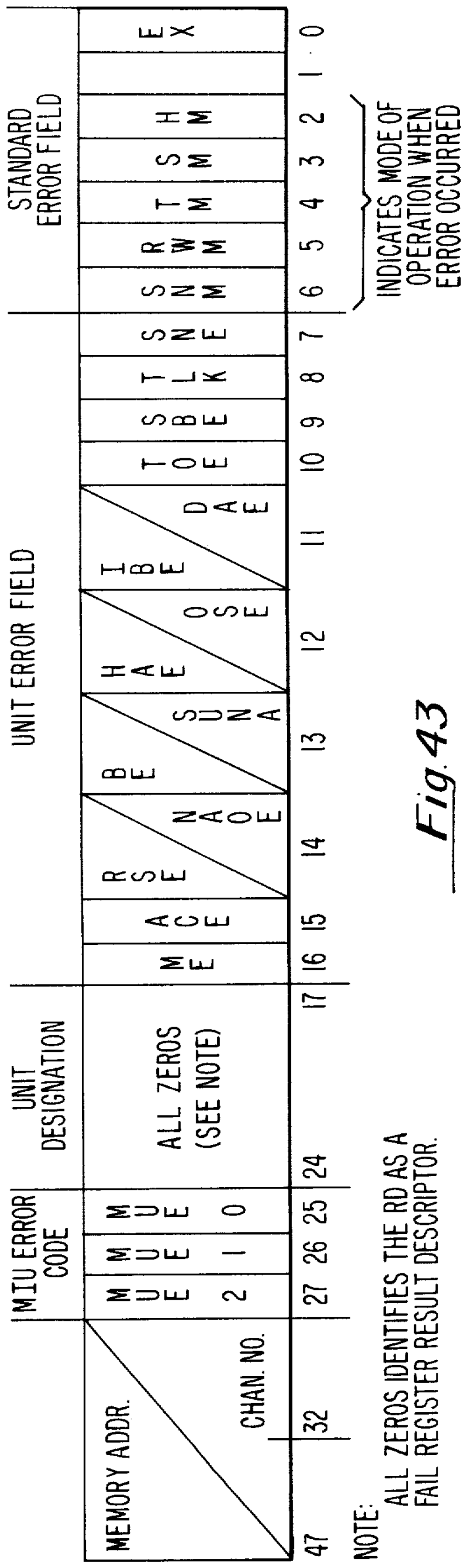

FIG. 15A and 15B comprise a functional block diagram of a job map for the input/output module of FIG. 12;

FIG. 16 is a representation of the format of a Home address control word as employed with the instant invention;

FIG. 17 is a representation of the format of a unit table control word as employed with the instant invention;

FIG. 18 is a representation of the format of an input/output queue head control word as employed with the instant invention;

FIG. 19 is a representation of the format of an input/output queue tail control word as employed with the instant invention;

FIG. 20 is a representation of the format of an status queue header control word as employed with the instant invention;

FIG. 21 is a representation of the format of an input/output control block as employed with the instant invention;

FIG. 22 is a representation of the format of an input/output control word as employed with the instant invention;

FIG. 23 is a diagram showing the functional areas of the input/output module of FIG. 12;

FIG. 24 is a basic block diagram of the input/output module of FIG. 12;

FIG. 25 is a functional block diagram of typical data transfer classification for the input/output module of FIG. 12;

FIG. 26 is a functional block diagram of the typical input/output interface with the central processor module of FIG. 4 and main memory of the system of FIG. 2;

FIG. 27 is a functional block diagram showing the data/error detection flow of the input/output module of FIG. 12;

FIGS. 28A and 28B comprise a functional block diagram showing input/output module path redundancy;

FIG. 29 is a diagram showing the modularity of a memory subsystem of the system of FIG. 2;

FIG. 30 is a functional diagram showing the data word transfer between memory and a user of memory;

FIG. 31 is a representation of the interface between a memory storage unit, a memory control module and a requesting unit;

FIG. 32 is a simplified block diagram of a memory control module of the instant invention;

FIGS. 33A and 33B comprise a detailed block diagram of a memory control module of the instant invention;

FIG. 34 is a representation of the signal interface between a memory control module and a requesting unit;

FIG. 35 is a diagram showing the function logic for error detection and correction in a memory module of the instant invention;

FIG. 36 is a representation of the data and control interface between a memory control module and a memory storage unit;

FIG. 37 is a diagram showing interlacing of memory storage units of the instant invention;

FIGS. 38A and 38B comprise a block diagram of a memory storage unit of the instant invention;

FIG. 39 is a timing diagram for a memory logic module of the instant invention;

FIG. 40 is a timing diagram for a memory storage module of the instant invention;

FIG. 41 is a block diagram for the clock system of the instant invention;

FIG. 42 is a simplified block diagram of the multi-level operating system of the instant invention;

FIG. 43 is a representation of the format of the fail register for the input/output module of FIG. 12.

GENERAL DESCRIPTION OF THE SYSTEM

The information processing system of the instant invention is a large scale, truly general purpose, balanced, flexible, modular multi-programming and multiprocessing computer system that is suitable for such diverse applications as time-sharing, scientific problem solving, and business data processing. The system of the instant invention is designed to handle complex data structures and sophisticated program structures dictated both by higher level languages presently in use and by the requirements of advanced problems and is designed to manage efficiently the massive on-line and archival storage requirements of large data bases, and to accommodate vast networks of data communications devices.

The system of the instant invention is a very fast, modular parallel processing system with exceptional versitility and configuration, and can be tailored to the processing needs of a user by arranging central processor modules, input/output modules, and memory modules on an electronic grid, or exchange in a variety of ways depending upon the exact needs of the user. If the high performance and adaptability of the system of the instant invention could be attributed to a single factor, it would be to the balance attained by means of the controlled interraction of independently operating computing, input/output and memory modules through the exchange. With this arrangement, which will be described in detail, the throughput of the instant system as a whole is maximized, and the performance of no single element of the system is maximized to the neglect or detriment of the others.

The key to the efficient and balanced use of the system of the instant invention is the multi-level operating system, a unique executive software operating system that automatically makes optimum use of all the resources of the system. It is this operating system, which will be described in detail, that makes multi-processing and multi-programming both functional and practical by dynamically controlling the system resources and by scheduling jobs or tasks in the multi-programming mix. In operation, the multi-level operating system allocates system resources to meet the needs of the program introduced into the processing system. It continually and automatically reassigns resources, starts jobs, and monitors their performance.

Further implications of the modularity and flexibility of the system of the instant invention are its expandability (the capacity to add hardware modules without reprogramming) and its increased reliability is achieved by the use of fail-soft techniques that (in addition to providing for error detection and error correction, redundancy of data paths, and independence and redundancy of power supplies) excludes faulty modules from the system and permit processing to continue (again, without reprogramming) even with the temporarily reduced configuration.

Even though the system of the instant invention is a very large and immensely complicated and thus able to perform complex computations, the system is, nevertheless, comprehensible to the persons who use it: programming is accomplished only in higher level, problem-oriented languages (COBOL, ALGOL, FORTRAN, PL/I, and ESPOL); the control language used in entering jobs into the system is a simple, free-form English-like language; and the messages that pass between the system and the operator are brief, clear and easy to learn.

Although the balanced use of the principal components of the system as a whole under the control and coordination of the multi-level operating system is the key to the high throughput of the system, the high performance of the system is in large part achieved by improving the speed of execution of instructions, by reducing or masking the overhead associated with references to memory, by freeing the central processor modules from concern with input/output operations, and by employing fail-soft measures that minimize system degradation. Moreover, the system main-frame hardware has been designed and built strictly according to stringent circuit and wiring rules and proven design and packaging techniques well known in the art. This factor and the incorporation of monolithic integrated circuits in the processing elements, permits the system to perform consistently at high operating frequencies.

The fail-soft features of the system of the instant invention are designed to keep the system running 100 percent of the time, minimize system degradation, and to provide the user with tools for performing his own data recovery. These goals are achieved by a unique combination of hardware and software throughout the system. In the instant invention, the system is maintained operational by the higher reliability of the system hardware, by the incorporation of error detection circuits throughout the system, by single-bit error correction of errors in memory, by recording erros for software analysis, by modular design, by use of separate power supplies and redundant regulators for each module, by use of redundant busses, and by the ability of the multi-level operating system to reconfigure the modules of the system to temporarily exclude a faulty module. In short, the detection and reporting of errors is accomplished by hardware, analysis of errors is performed by software, and the reconfiguration of the system is accomplished dynamically by multi-level operation. Because of the modularity of power supplies and the use of redundant regulated supplies for critical voltages, the impact of a malfunctioning voltage supply is minimized and does not result in a catastrophic failure.

Minimization of system degradation is achieved by providing diagnostic programs and equipment for rapidly identifying and repairing faults and for reestablishing confidence in a repaired module before it is returned to the user's system. The diagnostic portion of the multi-level operating system is designed to identify a faulty module, and by the use of a maintenance diagnostic unit of the instant invention, a fault in any main frame module or in a disk file optimizer is narrowed to a single clock period and to a flip-flop and its associated logic circuit. Finally, by the use of a card tester on the maintenance diagnostic unit, the faulty integrated circuit chip can be identified.

To provide the user with tools for performing his own data recovery the system of the instant invention is designed with such features as installation allocated disk, protected disk files, duplicate files, and fault statements in the higher level programming languages used on the system. Installation allocated disks permits the user to specify the physical allocation of his critical disk files in order to facilitate the maintenance and reconstruction of these files. Protected disk files permit the user to gain access to the last portion of valid data written in a file before an unexpected system halt. The use of duplicate disk files is to avoid the problem of fatal disk file errors. The multi-level operating system of the instant invention maintains more than one copy of each disk file row, and, if access cannot be gained to a record, an attempt is made to gain access to the copy of the record. By the use of fault statements, the user can stipulate the action to be taken by his program in case certain errors occur.

Figure 1:
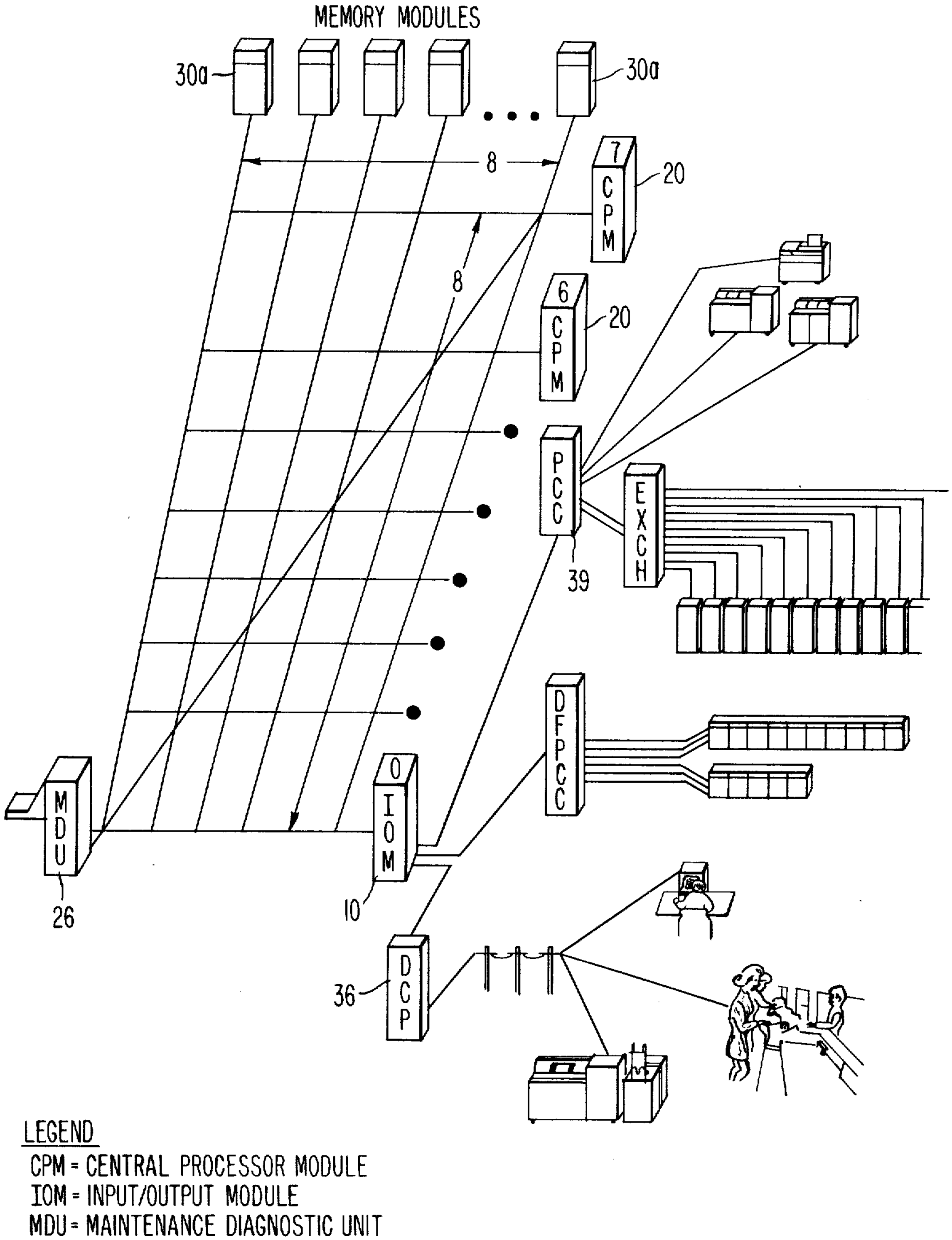

Physically the components of the system of the instant invention falls into three categories. The first category includes the central components of the system, namely, the central processor modules 20, the input/output modules 10, the memory modules 30*a*, which collectively comprise main memory 30, the maintenance diagnostic units 26, and the operators console (not shown), see FIG. 1. The second category includes the peripheral controls 38 and exchanges, the disk file optimizer 40, the data communications processor 36, see FIG. 2, and AC power supplies.

The third category includes standard peripheral devices that are joined in the central system by means of the standard peripheral controls, adaptors, and exchanges and standard remote devices that are joined to the central system by means of line adaptors and the data communications processors 36.

The arrangement of the components of these three categories into a system and the size of the system depends on the application and workload of the user. In the following paragraphs, the maximum and the typical configuration with full fail-soft capabilities will be described.

The theoretical maximum configuration of the system of the instant invention is shown in FIG. 2. As many as eight memory modules 30*a* may be arranged on an exchange with a combined total of up to eight requestors of memories 30*a*, i.e., central processor modules 20 and input/output modules 10. Any single requestor of memory may address and gain access to the entire content of the high speed main memory 30. A maintenance bus 32 is provided to service the controls for the memory modules 30*a*, the central processor modules 20, the input/output modules 10, and the disk file optimizers 40. Either one or two maintenance diagnostic units 26 may be placed on the maintenance bus 32. At a rate of up to 6.75 million bytes per second, a single input/output module 10 is capable of transferring data simultaneously between main memory 30 and 28 peripheral controls 38 (including eight high speed controls) and between main memory 30 and as many as four data communications processors 36. It is also capable of handling as many as four disk file optimizers 40 (devices that are used in improving the rate of transfer of data between main memory 30 and disk files). In the preferred embodiment, the number of high speed, medium speed, and low speed peripheral devices that may be attached through controls and exchanges to a single input/output module 10 or that may be included in the input/output subsystem is 255. For purposes of discussion, each card reader, pseudo reader card punch, line printer, tape reader, paper tape punch, operator's display terminal, and free-standing magnetic tape unit; each station on a magnetic tape cluster; and each electronic unit in a disk file subsystem is considered a device. By suitable cross connections through exchanges, it is possible to establish pathways between disk files, disk packs, or magnetic tape units in more than one input/output module 10, hence, these peripheral devices can be shared by all of the input/output modules 10 in the system.

Figures 3, 3B:
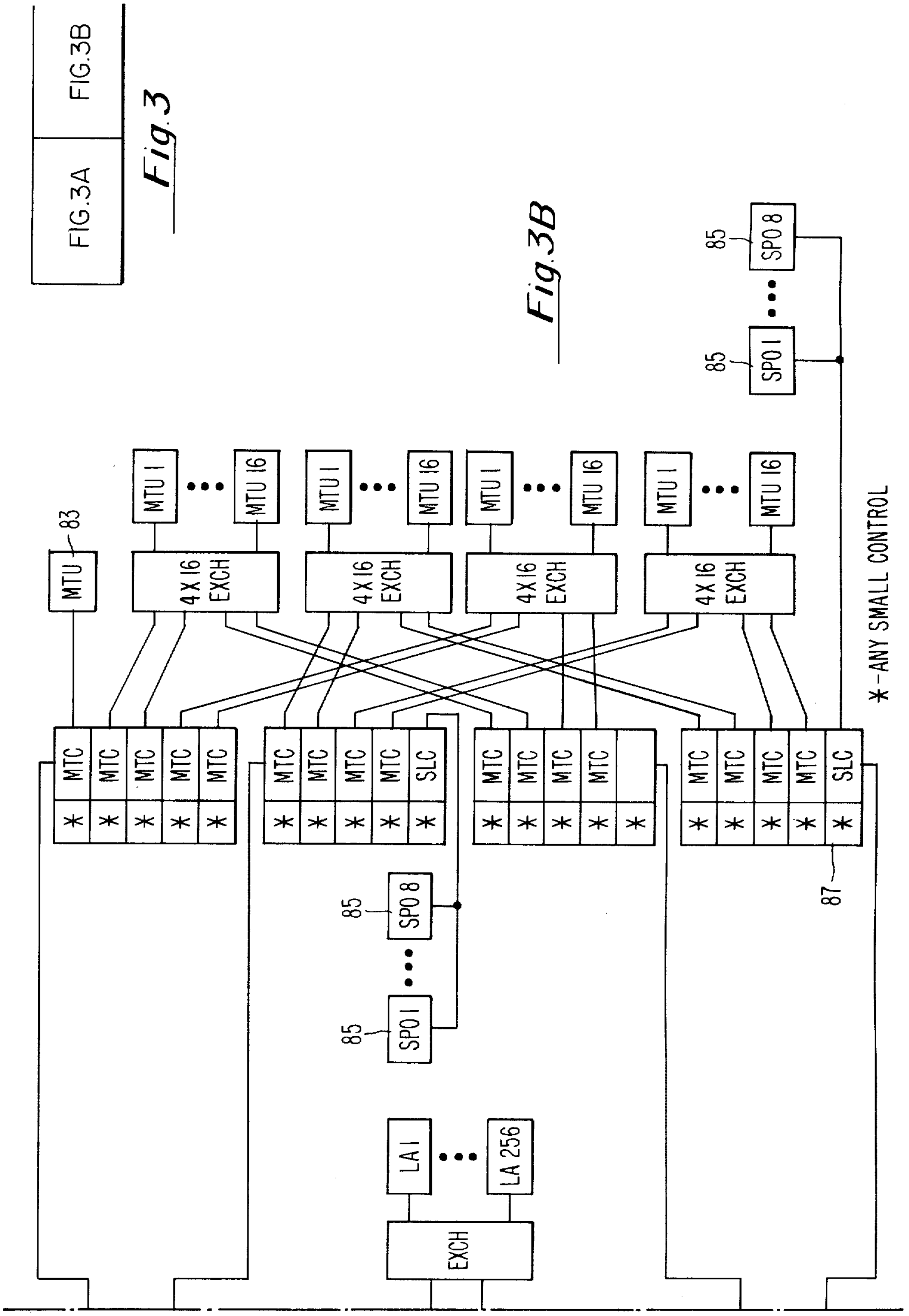
Figure 3A:
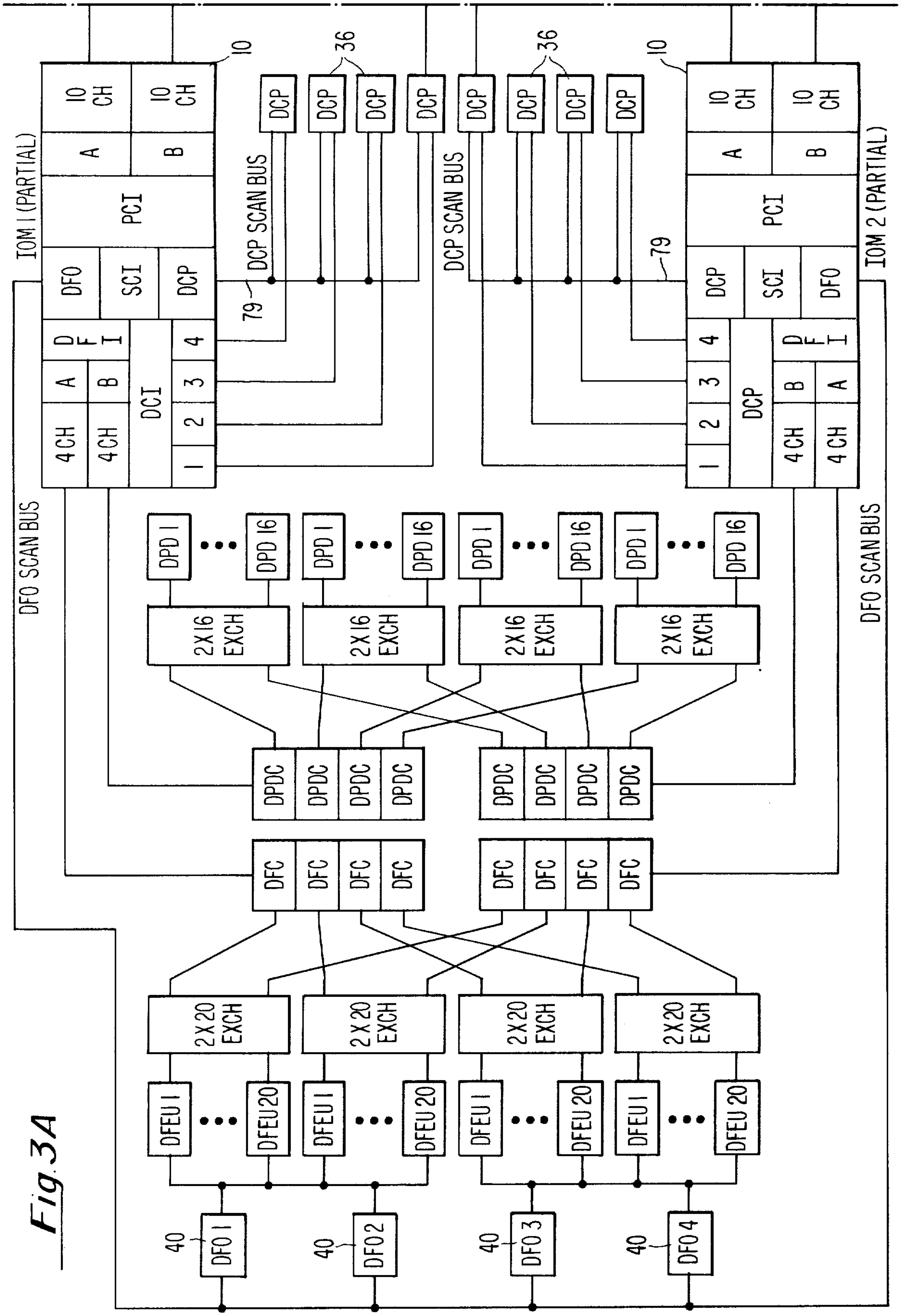

Among the peripheral devices available are disk files and disk file memory modules that constitute a virtual memory which in effect greatly expands the storage capacity of the main memory 30 of the system; see FIG. 3, these modules, which are interfaced with the input/output module 10 through controls are as follows: (1) head-pertrack-disk file optimizers 40 to form optimized-access memory banks capable of storing some 450 million to 8 billion 8-bit bytes information per input/output module 10 and whose access time is in effect in the range of 2 to 6 milliseconds or four to ten milliseconds; (2) head-per-track disk file modules that are combined (without the control of the optimizer) into random access memory banks of from 15 million to 16 billion 8-bit bytes per input/output module 10 and whose average access time is 20 to 35 milliseconds; (3) disk pack memory modules that are combined into random access memory banks with a capacity of from 121 million to many billions of 8-bit bytes of storage per input/output module 10 and whose average access time is 30 milliseconds.

Besides the 255 peripheral devices that may be included in an input/output subsystem, there is a vast network of remote terminals, remote controllers, and remote computers that can be accommodated by the up to 1,024 remote lines serviced by the four programmable data communications processors 36 that can be controlled by a single input/output module 10. Normally, each line handles a number of remote devices, and, naturally, systems that have more than one input/output module 10 can have more than one data communications network. The maximum number of data communications processors 36 that can be included in the system of the instant invention is 28, (seven input/output modules).

The power, speed, flexibility and reliability of which the system of the instant invention is capable are fully realized in a configuration that includes two central processor modules 20, two input/output modules 10, four memory modules 30*a*, one maintenance diagnostic unit 26, and its associated magnetic tape unit 35, and two operator's consoles 27 (one per IOM). Besides these central components, this typical fail-soft configuration must include two disk file memory subsystems (one for each input/output module 10) or a single disk file subsystem that is shared by means of exchanges by the two input/output modules 10, peripheral controls 38, and AC power cabinets. Naturally, a complement of peripheral devices and their controls and exchanges, data communications processors 36, and remote devices suited to the application and workload of the system is also required. A system of the proportions described above incorporates fully the fail-soft features of the system of the instant invention and takes complete advantage of its capabilities of handling 4-word transfers of data to and from main memory 30.

The following paragraphs provide a description of the principal components and functional subsystems that, under the control of the multi-level operating system of the instant invention and arranged in the configuration suited to the particular data processing needs, comprise the preferred embodiment of the information processing system of the instant invention. These components and subsystems are the central processor modules 20, the input/output subsystem, the memory subsystem, the maintenance diagnostic unit 26, the operator's console (not shown), the disk file subsystem, the data communication subsystem, and the power subsystem.

DETAILED DESCRIPTION OF THE INVENTION

A. Central Processor

The computational element of the system is the central processor module 20. In the preferred embodiment the central processor module 20 has a 16 mHz clock rate. There are three major, independent, asynchronously operating sections of the central processor module 20, namely, the program section 42, the execution section 44, and the storage section 46, see FIG. 4. Communication between these sections is carried out by means of queues of operations. Because of the parallelism of the central processor module 20, arithmetic computations and data manipulations, the calculation of addresses, and the transferring of data to and from memory may go on at the same time.

Briefly, the program section 42 performs instruction decoding operations of object code strings and absolute address calculations, the execution section 44 performs all arithmetic and logical data manipulation operations, and the storage section 46 performs all storage related functions. The general interconnections and data flow between these three sections is shown in FIG. 4. As discussed, communications between the sections is established by operating queues.

The program section 42 includes a program buffer 48 and program barrel 54, a program control unit 56, a fault control logic 58 and an address unit 60. The program section 42 is responsible for extracting each instruction from the program code string and initiating processing of the instructions. The program section 42 also controls and responds to the fault interrupt system, which will be described later. The primary responsibility of the program section 42 is to separate the object code string into operations which are then placed in the appropriate queues for the execution section 44. A few instructions are operated entirely by the program section 42, such as an unconditional branch, and others are executed in part.

In the preferred embodiment, Polish notation is used as the base for the system's ALGOL compilation algorithm. In compiler translation, the source expression is examined one symbol at a time with a left to right scan and is combined into logical entities. As each logical entity is examined, a specific procedure is followed so that the Polish notation expression is constructed in its finalized form with one scan of the source expression. When the program is compiled, the computational part of the source program will be converted into a machine language string of instructions. An example of this is the source language plus sign (+) which will be directly replaced by the machine language ADD instruction. The language string, resembling a Polish notation string, will be referred to as the program code string. This code string will be divided into two or more variable sized segments, according to the structure of the program. Program segments are normally stored on disk files. When a program is executed, program segments are made present in memory as needed. Because such program segments cannot be modified, a single copy of a program segment in memory may be used for several concurrent executions of the same program; thus, the program code string is often described as "reentrant" or "recursive."

As mentioned earlier, a program code string may be divided into two or more program segments. For each program segment, there is a single segment descriptor, which defines the length and location of the program segment. The segment descriptors are stored in a special stack known as the segment dictionary. Thus, each job is associated not only with one job stack, but also with one segment dictionary stack. In addition, the multi-level operating system of the instant invention has its own stack and segment dictionary. Within the job stack, a Program Control Word (PCW) is provided for each point of entry into a segment of code. The program control word (PCW) provides an index, not only into the segment dictionary to locate the proper segment descriptor, but also into the program segment itself to locate the proper program word and syllable.

The constants and variables of a program are assigned locations within the "stack" of a program when it is compiled. The stack can be thought of as analogous to a physical stack with the last item placed on top of the stack. When items are removed (one at a time) from the stack, the item on the top of the stack is the first item to be removed. The item at the bottom of the stack remains at the bottom of the stack until all other items have been removed from the stack. The stack not only provides an easily manageable means for keeping a dynamic history of the program as it is being processed, but also lends itself to the use of program code strings based on Polish notation.

Figure 5:
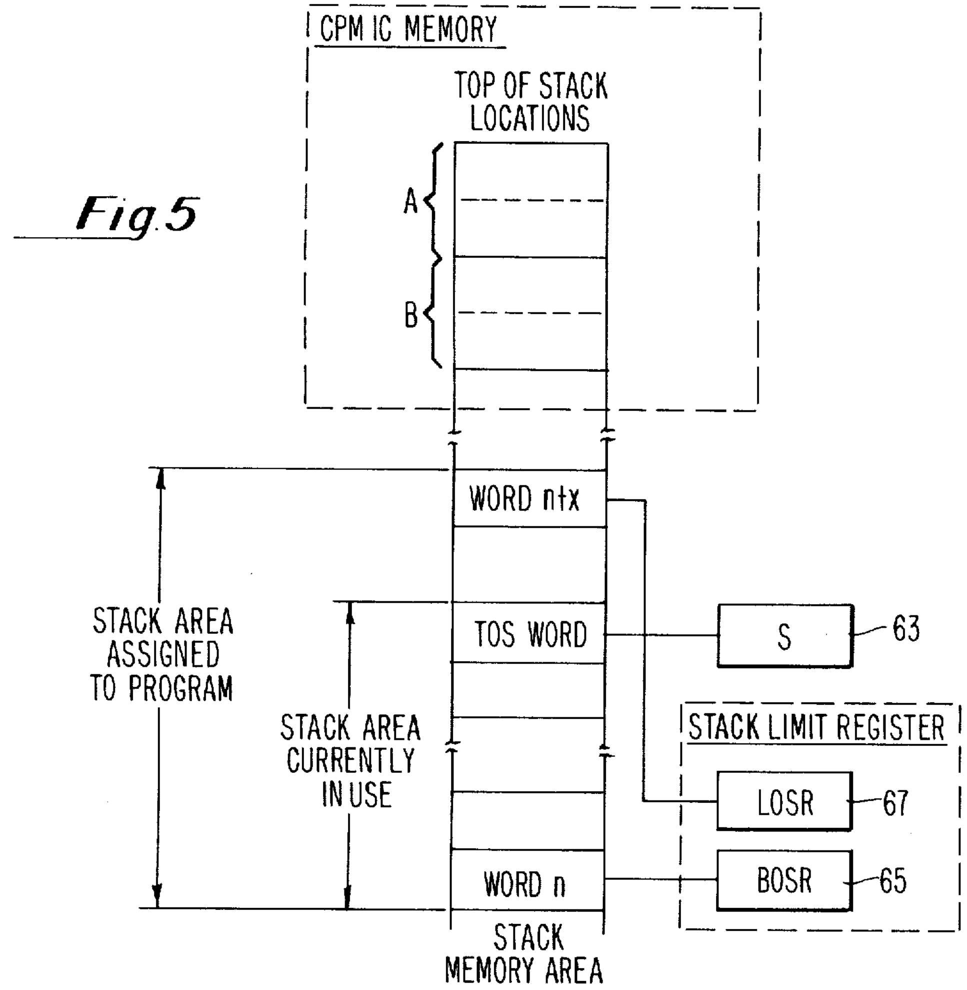
FIG. 5 is a functional block diagram of a stack buffer employed in the central processor module of FIG. 4.

In the preferred embodiment, when a job is activated, two top-of-stack locations (A & B), see FIG. 5, are linked to the job's stack. This linkage is established by a stack-pointer register (S) 63, which contains the memory address of the last word placed in the stack. The two top-of-stack (TOS) locations (A & B) extend the stack to provide quick access for data manipulation. Data is brought into the stack through the top-of-stack locations in such a manner that the last operand placed into the stack is the first to be extracted. Total capacity of the top-of-stack location (A & B) is two operands. Loading a third operand into the top-of-stack locations causes the first operand to be pushed from the top-of-stack locations into the stack. The stack-pointer register (S) 63 is incremented by one before a word is placed into the stack and is decremented by one after a word is withdrawn from the stack and placed into the top-of-stack location. As a result, the S register 63 continually points to the last word placed into the job's stack.

In the preferred embodiment, a job's stack is bounded, for memory protection, by two registers; the Base-of-Stack register (BOSR) 65 and the Limit-of-Stack register (LOSR) 67. The contents of the BOSR register 65 defines the base of the stack, and the contents of the LOSR register 67 defines the upper limit of the stack. The job is interrupted if the S register 63 is set to the value, contained in either the LOSR register 67 or the BOSR register 65.

The contents of the top-of-stack location are maintained automatically by the central processor 20 to meet the requirements of the current operator. If the current operator requires data transfer into the stack, the top-of-stack locations receive the incoming data, and the surplus contents, if any, of the top-of-stack locations are pushed into the stack. Words are brought out of the stack into the top-of-stack locations. These words are used by the operators which require the presence of data in the top-of-stack locations. These operators, however, do not explicitly move data into the stack.

In the preferred embodiment each top-of-stack location (A & B) can accommodate two memory words. For single precision operations, location A will contain one single precision operand and location B will contain the other single precision operand. However, calling a double precision operand into either of the top-of-stack locations (A & B) will cause both halves of the double precision operand to be loaded into the A or B location. The first word is loaded into the top-of-stack and its associated tag bits are checked. If the value of the tag bits indicate double precision, the second half of the operand is loaded into the second half of the top-of-stack location. Double precision operands revert to single words when they are pushed down into the stack (the most significant half of the operand is pushed down first). The process is reversed when a double precision operand is returned from the stack of the top-of-stack locations. That is, the least significant half of the double precision operand is popped up first and the tag is discovered to have a value of two, causing the most significant half of the operand to also be popped into the top-of-stack.

In the preferred embodiment, stack implementation includes a 32-word stack buffer 50, which permits a portion of an active stack to be contained in IC memory locations within the central processor modules 20. This stack buffer 50, see FIG. 6, may contain information which has not yet been written to core or main memory 30, as well as copies of words which are resident in core or main memory. Stack buffer 50 permits a portion of the stack to be held local within the central processor module 20, to provide quick access for stack manipulation by the execution section 44 of the central processor module 20.

In addition to the portion of the stack held local in the stack buffer 50, certain other data from the stack may be contained in a local memory within the central processor module 20. This local memory, the associate memory of memory 52, is used to capture data fetched by the program unit look ahead which is not resident in the stack buffer. Although an active stack may be contained partly in the stack buffer 50 within the central processor module 20 and partly in core memory, the stack buffer 50 is purged whenever the stack becomes inactive (when a move-to-stack operation takes place). This purging of the stack buffer 50 causes the unique data within the stack buffer 50 to be copied to core memory.

One very important aspect of the system of the instant invention is the retention of the dynamic history for the program being processed. Two lists of program history are maintained in the system's stack, the addressing environment list and the stack history list. Both of these lists are dynamic, varying as the job proceeds along different program paths with varying sets of data. The two lists grow and contract in accordance with the procedural depth of the program. Both of these lists are generated automatically by the system hardware.

Turning now to the execution section of the central processor 20, the execution section 44 includes an execution unit 62 and the execution unit input queues 64. The execution section 44 is responsible for all data and control manipulations involving the stack. The execution section 44 performs all arithmetic and logical operations as well as stack related control functions. The execution section 44 is driven in an orderly manner from a first-in first-out list of operations placed in its operator queue by the program section 42.

The storage section 46 includes a storage unit 66, the stack buffer unit 50, the associative memory 52, and a communications unit 68. The storage section 46 is responsible for all storage related functions. Some of the storage section's duties are implied, such as maintaining the stack buffer 50, but most operations are explicit in that they result directly from the processing of program code. Implicit operations for storage section 46 are placed in the input queue 70 of the storage unit 66 by either the program section 42 or the execution section 44. It is the responsibility of the storage section 46 to determine if an address reference points to local storage or main memory 30 in which case, a main memory cycle is necessary.

These major sections are subdivided into units which operate relatively independently. The program control unit 56 of the program section 42 is an asynchronously functioning unit of logic intended to maintain the program buffer 48, and separate the object code into operations which are placed in the appropriate queues of the execution unit queues 64 for execution. The organization of the program control unit 56 is such that multiple syllable operators that overlap word boundaries in the program buffer 48 do not cause additional overhead. Branch points which happen to be within the buffer 48 are detected automatically and that code is entered without program fetch from the main memory 30.

In the preferred embodiment, the program buffer 48 of the program section 42 of a central processor module 20 is an array of IC memory chips which provides a total local memory capacity of 32 words of 60 bits each. The actual physical configuration is two memories of 16 words each. As shown in FIG. 4, these two memory divisions are interleaved such that all odd words from main memory 30 are stored in one division and all even words in another. Each division is further divided into four segments, zero through three. The buffer is loaded in segments of four words per main memory reference. The algorithm for loading the program buffer 48 is based on anticipation rather than waiting until the buffer 48 is empty, so that full advantage is taken of the natural idle time on the main memory bus 47, as shown in FIG. 2. As the words are brought in, they are alternately placed in the odd and even divisions of the program buffer 48. Each word brought in has parity checked on all 51 bits. As each word is placed into the program buffer 48, parity is generated and stored on each syllable; thus, regardless of the number of syllables for a given instruction or its route through the central processor 20, its integrity is maintained by parity on each individual syllable.

The address computation unit 60 of the program section 42 includes the logic necessary for the calculation of absolute addresses. This unit has a storage area of 48 words by 20 bits. The storage area is provided with input and output registers, of which the output register is used to buffer registers during an adder/comparator cycle so that a storage cycle may occur simultaneously. The input register of the storage area is used to buffer data for a write cycle so that the controlling logic can release immediately instead of waiting for the storage cycle to complete. This input register also serves to hold a value for the adder/comparator, for subsequent calculations such as found in string processing (e.g., index plus constant plus base). All write cycles into the storage area of the address computation unit 60 are controlled by the execution section 44, but read cycles for the purpose of address computation can be initiated from either the execution section 44 or the program section 42 of a central processor module 20. Separate read registers are provided for these two sections, and a priority resolver settles any conflicts. It should be noted that the address computation unit 60 is not directly in the pipeline and is therefore not queue driven. As previously mentioned, the address computation unit 60 is autonomous only to the extent that a write cycle to the IC memory of a central processor module 20 need only be initiated and not completely controlled by the initiating logic.

The fault control unit 58 of the program section 42 is designed to aid in the general maintenance, and error recovery under the guidance of the fail-soft portion of the multi-level operating system of the instant invention. Error recovery is aided by a system of multiple levels of control states coupled with alternate stack and display zero capabilities. The fault control unit 58 includes a fault condition register which records system interrupts and conditions the central processor 20 to take the necessary action in order to handle these interrupts. This register records both operator dependent and operator independent interrupts.

The execution unit 62 of the execution section 44 of a central processor module 20 is the final stop in the processing pipeline. The great majority of instructions are not completed until the execution unit 62 is reached. The execution unit 62 is the only unit in the processor 20 which operates on value data. It also has some control word formation and address calculation responsibilities. This unit includes the two top-of-stack registers A and B and may temporarily store parts of character strings on which it is operating. The execution unit 62 like the program control unit 56 is queue driven. All operations and operator associated data are placed into the queue of the execution unit 62 by the program control unit 56. The value data inputs are supplied by the storage control unit 66 of the storage section 46. Responsibility for the write control into the queue is shared by the program and storage units. Reading of information from the queue is the sole responsibility of the execution unit 62. The status of the input queue is monitored, for obvious reasons, by the program section 42 in order to detect queue full, and queue empty when unit synchronization is necessary. A queue input register is provided to allow the transmitting unit to release as soon as the register is loaded. The actual write cycle initiates after the loading of the queue input register. In the preferred embodiment, the queue is implemented by memory chips thus affording simultaneous read and write operations.

The storage unit 66 of the storage section 46 of the central processor module 20 includes the logic necessary to control all references to main memory 30. Main memory references can be initiated independent of the program operator function or as a direct result of operator execution. The independent operations are the control of the program buffer 48, the associative memory 52 and the stack buffer 50. The references to main memory 30 which are a direct result of operator execution are presented to the storage control unit 66 through its operation queue 70. The actual operations in the queue are placed there by the program control unit 56 as the program is phased. The addresses pertinent to an operation are placed in a queue by either program control, or by the execution section 44.

The storage control unit 70 is responsible for monitoring stack functions to determine if they are within the limits established by the Base-Of-Stack register (BOSR) 65 and the Limit-Of-Stack register (LOSR) 67. In checking these limits, the storage control unit 66 must take into account the number of locals so that bounds detection is not after the fact.

The input queue is controlled essentially by all of the sub-sections of the central processor 20. The program control unit 56 also provides the operator. The address can be calculated by either the program control unit 56 or by the execution unit 62 and data for store functions is always taken from the execution unit 62. When a reference is determined to be "not local" the storage control unit 66 initiates a reference to main memory 30. In the event that anything out of the ordinary occurs during a main memory fetch reference, the storage unit 66 initiates an orderly termination and passes the data and sufficient control information to describe the problem to the execution unit 62 through the unit's input queue 64. It is necessary that reaction to irregularities be deferred by the storage unit 66 since on fetch functions this unit may be ahead of the actual execution point. The execution unit 62 is the section of the central processor 20 which actually defines the point of execution for the program, therefore nothing that unexpectedly changes the order of the program may be allowed to take place until the associated operator reaches the top of the execution queue 64. For store functions, the execution unit 62 and the storage unit 66 are already in sync and fault reaction takes place immediately.

In the preferred embodiment, the storage control unit 66 is capable of overlapping operations within its unit. This situation occurs whenever a reference to main memory 30 is initiated. When the communication unit 68 of the storage section 46 is handling an external reference, the storage unit 66 can go on to the next entry in its input queue 70. If in the event that an operation references a variable that is local to the stack buffer 50 or associative memory 52, then the local reference is completed in parallel with the main memory reference. The overlap is not restricted to one operation. The storage unit 66 is free to process operations out of its input queue 70 for as long as possible or until the external reference is completed. The benefit of this overlap comes from the fact that most references to variables used in constructing a Terminal descriptor are local. Then, although the item referenced by the Terminal descriptor is external (data array in particular), the time spent in main memory 30 is effectively masked by subsequent descriptor construction.

The program buffer 48 of the program section 42 is a 32-word area of local processor memory used to capture a portion of the executing program's object code. Since a program buffer 48 is up-dated in multi-word segments, full advantage is taken of the phased memory system. In the preferred embodiment, object code averages 3.5 instructions per program word so that a good deal of program logic will be resident to the program buffer 48. The buffer "window" tends to slide over the object code string to entirely capture program loops; hence, in most cases, branching may take place without a main memory reference for the new program word.

The stack buffer 50 is an area of memory assigned to a job to provide storage for basic program and data references. The stack also provides temporary storage for data and job history. When a job is activated, a linkage between its stack and the top-of-stack registers (A & B) is established by the stack pointer register (S) 63, which contains the memory address of the last word placed in the stack. The stack buffer serves to extend the stack memory area into the processor local IC memory and to provide quick access for stack manipulation by the execution unit 62, see FIG. 6. The primary purpose of the stack buffer 50 is to hold, locally, a portion of the stack environment in any of 32 IC memory locations. The addressing scheme in this local memory is organized in a wrap-around fashion. Data is brought into the stack in such a manner that the last operand placed in the stack is the first to be extracted. As previously discussed, after the two top-of-stack registers (A & B) are filled, loading a third operand into the top-of-stack causes the first to be pushed into the stack buffer 50. As entries are pushed into the stack buffer 50, and when saturation is attained, a segment of the buffer entries is autonomously moved into main memory 30 so that the stack buffer 50 maintains the top area of the stack memory area. Any stack adjustment to main memory 30 is always accomplished in multi-word segments in order to take full advantage of the phased memory system. This "window" of stack entries tends to capture the current addressing environment of the executing program stack. In the instant invention, the stack buffer 50 can be directly addressed within limits, as if it were actually an area of main memory 30. The direct addressing of the stack buffer 50 action is transparent to the programmer. Therefore, knowledge of this action is not necessary for the programmer.

Figures 6, 7:
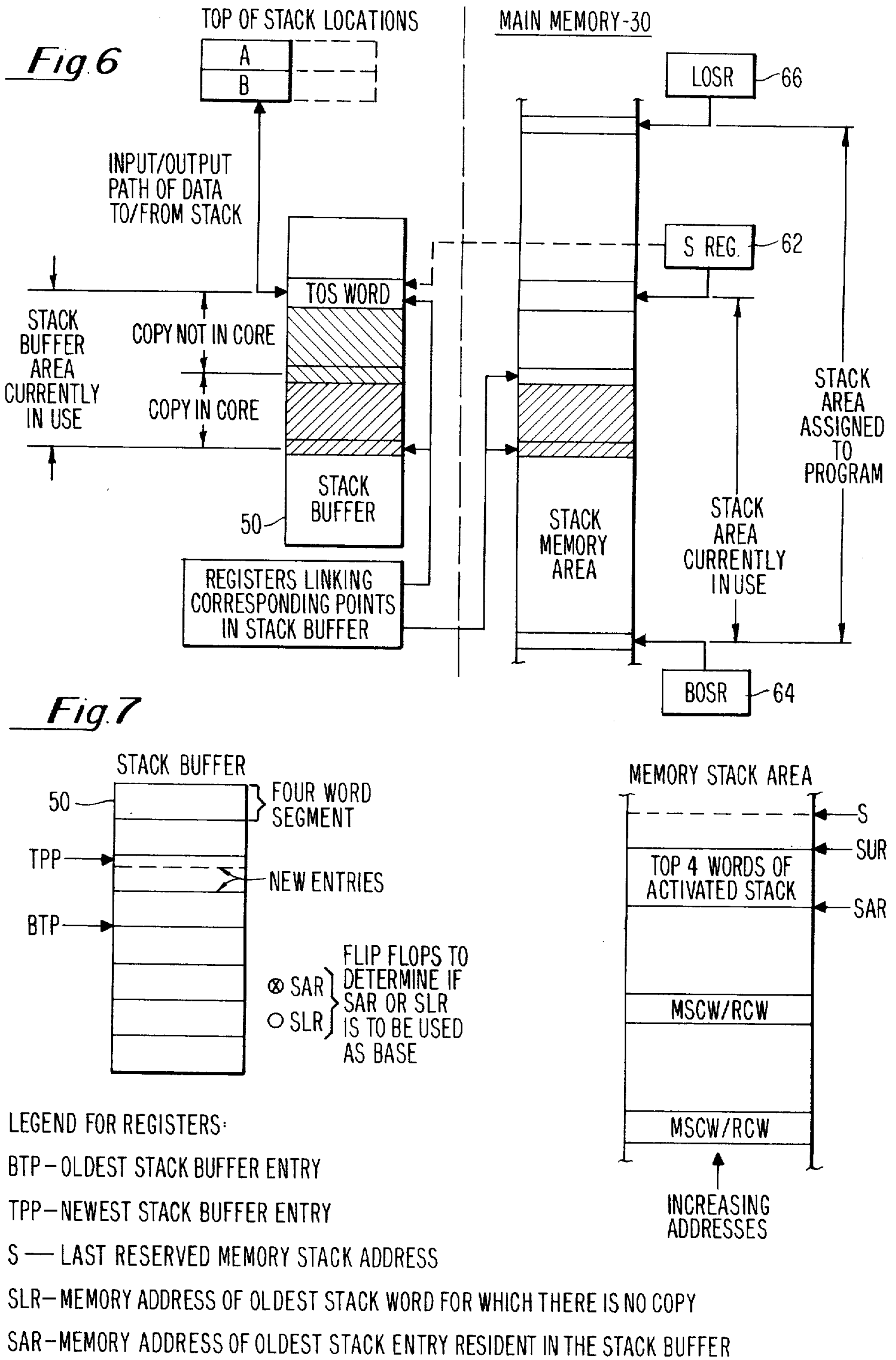
FIG. 6 is a functional block diagram of the stack buffer and a stack memory area employed in the central processor module of FIG. 4.
FIG. 7 is a functional diagram of a stack buffer operation.

As shown in FIG. 7, the main memory address of the top-of-stack buffer 50 or newest entry is contained in the stack top register(s) 63. The main memory address at the bottom of the stack buffer 50 is contained in the stack limit register (SLR) or in some cases, in the stack address register (SAR). After the central processor module 20 is assigned to a job stack, the top four words of the stack memory area are transferred from main memory 30 to the stack buffer 50. Subsequent stack expansions and local data references are executed entirely within this buffer 50. When the stack buffer becomes full, a four word segment is transferred to main memory 30 thus taking full advantage of the phased memory system. Stack cutbacks, resulting in the stack becoming empty cause the next four word segment of the main memory stack to be brought into the stack buffer 50 and the address registers up-dated accordingly. The stack buffer 50 can be thought of as a "window" of stack entries which slide along the main memory stack as the job stack changes in size, so that it always includes some portion of the top area of the stack. This type of buffer structure is especially effective in a procedure or subroutine organized environment. In order to reduce conflicts and prevent possible destruction of valid shared data in main memory 30, only those variables which have been pushed into the stack buffer 50 from the top of stack registers (A & B) are sent to main memory 30. This would occur during a purge or a buffer segment move. The job of keeping track of this boundary of new data is accomplished by holding the absolute address of the variable that has not yet been sent to main memory 30 in the stack link register (SLR). As the stack buffer 50 slides along the main memory stack, it tends to hold variables that have not yet been placed into memory 30, new data and entries that are copies of the main memory stack. Because of this action, the stack address register (SAR) is utilized whenever the buffer 50 contains both new and copied data. The stack address register (SAR) always includes the absolute address of the deepest stack entry in the buffer 50. In order to transfer entries between the stack buffer 50 and main memory 30, stack buffer addresses corresponding to the main memory addresses in the S register 63 and the stack address register (SAR) must be maintained. The IC memory locations used for this purpose are the BTP and TPP registers, shown in FIG. 7, which store the stack buffer addresses of the oldest and newest entries, respectively. Because the stack buffer uses a wrap-around addressing scheme, the BTP and TPP registers serve mainly as pointers for absolute value is unimportant. The TPP, BTP, S, SAR and SLR registers are used to align the stack buffer "window" along the main memory stack as shown in FIG. 7. FIG. 7 illustrates a situation where the central processor 20 has just changed to another stack to resume execution. The filling of the stack buffer 50 has just begun with the transfer of the top four word block from the main memory stack. Execution is continuing as indicated by the new entries formed in the stack buffer 50. Additional area for stack expansion must be created when the stack buffer 50 is full. When this situation arises, the stack address register (SAR) is incremented by four and the stack link register (SLR) now represents the lead address of the variable which must be moved to main memory 30. At the completion of the operation, the stack link register (SRL) is equal to the stack address register (SAR).

It is sometimes necessary to automatically purge the stack buffer 50. When purging, all variables within the buffer 50 and above the SLR setting are transferred to main memory 30. With the appropriate instruction, the purging of the stack buffer 50 occurs before the actual lock reference to main memory 30. This insures that the contents of the stack buffer 50 are copied into main memory and therefore available to another processor. A purge operation concludes with the SLR set equal to the contents of the S register 63 incremented by one, which indicates that the entire contents of the local buffer are copies of main memory.

Figure 8:
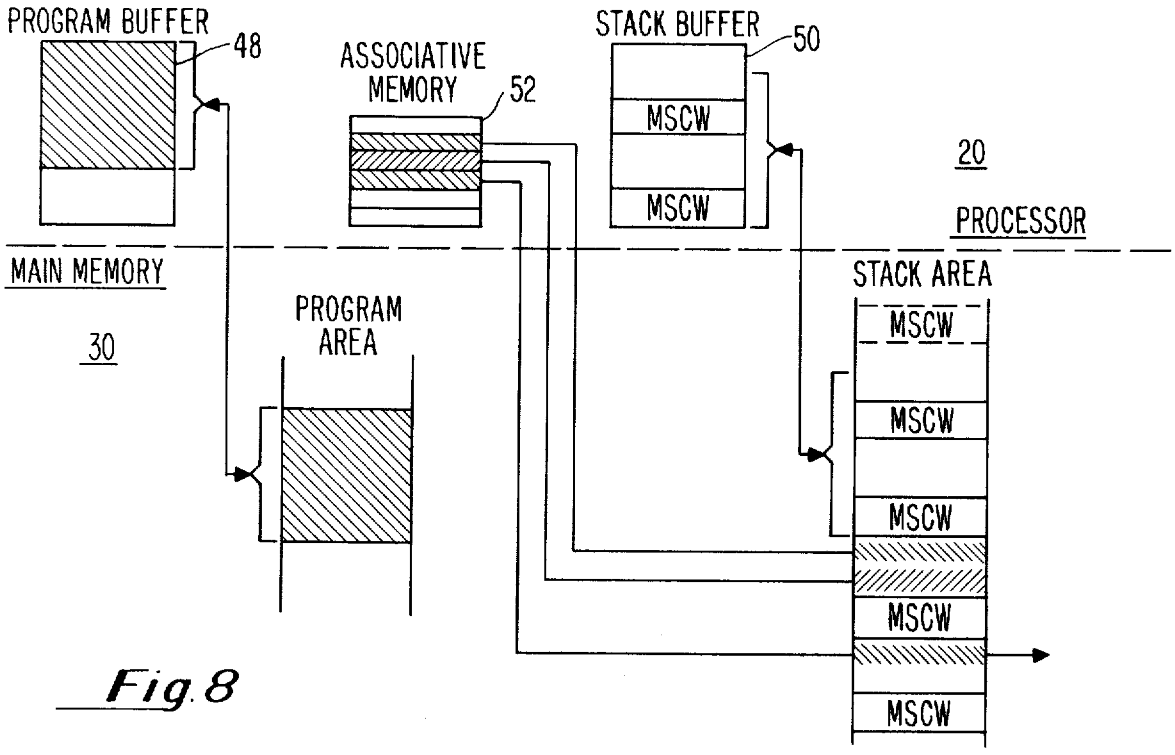
FIG. 8 is a generalized functional diagram of a buffer system of the instant invention.

The associative memory 52 is a general data buffer implemented to provide fast access to frequently used variables and descriptors which are outside the area contained in the stack buffer 50. In the preferred embodiment, the associative buffer or memory 52 is a processor IC memory comprising sixteen words of 78 bits. Each word is composed of 51 bits of data and tag, a parity bit, 20 bits of main memory address, two bits of residue on the address, and four spare bits. The associative memory 52, see FIG. 8, is loaded with any item referenced by an IRW (indirect reference word) unless the item is a double precision operand or another IRW. Such entries include data descriptors, step index words, and single precision operands. The data descriptors retained may include dope vector entries such as those used in multi-dimensional and segmented array implementation. When such items, requested by either the program control unit 56 or the execution unit 62 are brought into the communication unit 68, they are copied along with their main memory address into the associative memory 52. A future reference to the item may find it still resident in the associative memory 52, and thus can eliminate a reference to main memory 30. After the associative memory 52 is full, the oldest resident entry is overwritten each time a new item is brought into the associative memory 52. When an item has been overwritten it is reentered into the associative memory 52 on the next reference to the item, so that frequently used items tend to be available in the current contents of the associative memory 52.

When information is to be stored in a main memory address currently available in the associative memory 52, the data in that associative memory location are updated along with the data in the main memory location. Therefore, valid entries in the associative memory 52 are current copies of the associated items in main memory 30. Any store operation performed by the storage control unit 66 is executed to main memory 30 as well as to local areas if applicable. Since stores always update the contents of main memory 30, the contents of the associative memory 52 never need to be overidden into main memory 30. After successful completion of the local memory store, the execution unit 62 may continue to execute operators in its queue, even though the store to main memory 30 is not complete. This is possible because conflicts such as protected writes and accidental procedure entries will not have been detected on the store to local memory. The hardware can invalidate all information in the associative buffer 52 when necessary, such as when entering the multi-level operating system for reallocation. A record is maintained of the validity of each word in the associative buffer 52. When information is requested from main memory 30, a check is made under control of the storage control unit 66 to determine if the requested information is currently contained in either the stack buffer 50 or the associative memory 52. This action of local detection occurs as an operator and address are removed from the storage unit input queue 70. In the event that a reference is found in both the associative memory 52 and the stack buffer 50, the stack buffer 50 is given preference since it conceivably could be a latter copy of that reference which was created by a series of functions causing push-down operations.

COMMUNICATIONS UNIT

The communications unit (CU) 68 provides the interface between the central processor module 20 and main memory 30. All main memory accesses are performed by this unit. Requests for memory operations are made to the CU 68 by the program buffer 48, the storage unit 66, and the stack buffer 50. Information fetched by the CU 68 from main memory 30 is forwarded to the execution units 62, the stack buffer 50, the associative memory 52, or, for program code, to the program buffer 48.

Access to the CU 68 is granted to the requesting CPM units on a priority basis. First priority is given to the stack buffer 50, because the execution unit 62 is waiting for the results of any request made by the stack buffer 50. The stack buffer requests are made when performing a stack-buffer fill, empty, or purge operation. The storage unit 66 has second priority as the execution units 62 may be waiting for the results of a storage unit request. The program buffer requests have third priority as these requests are made in anticipation of the actual need for additional program code.

Figure 9:
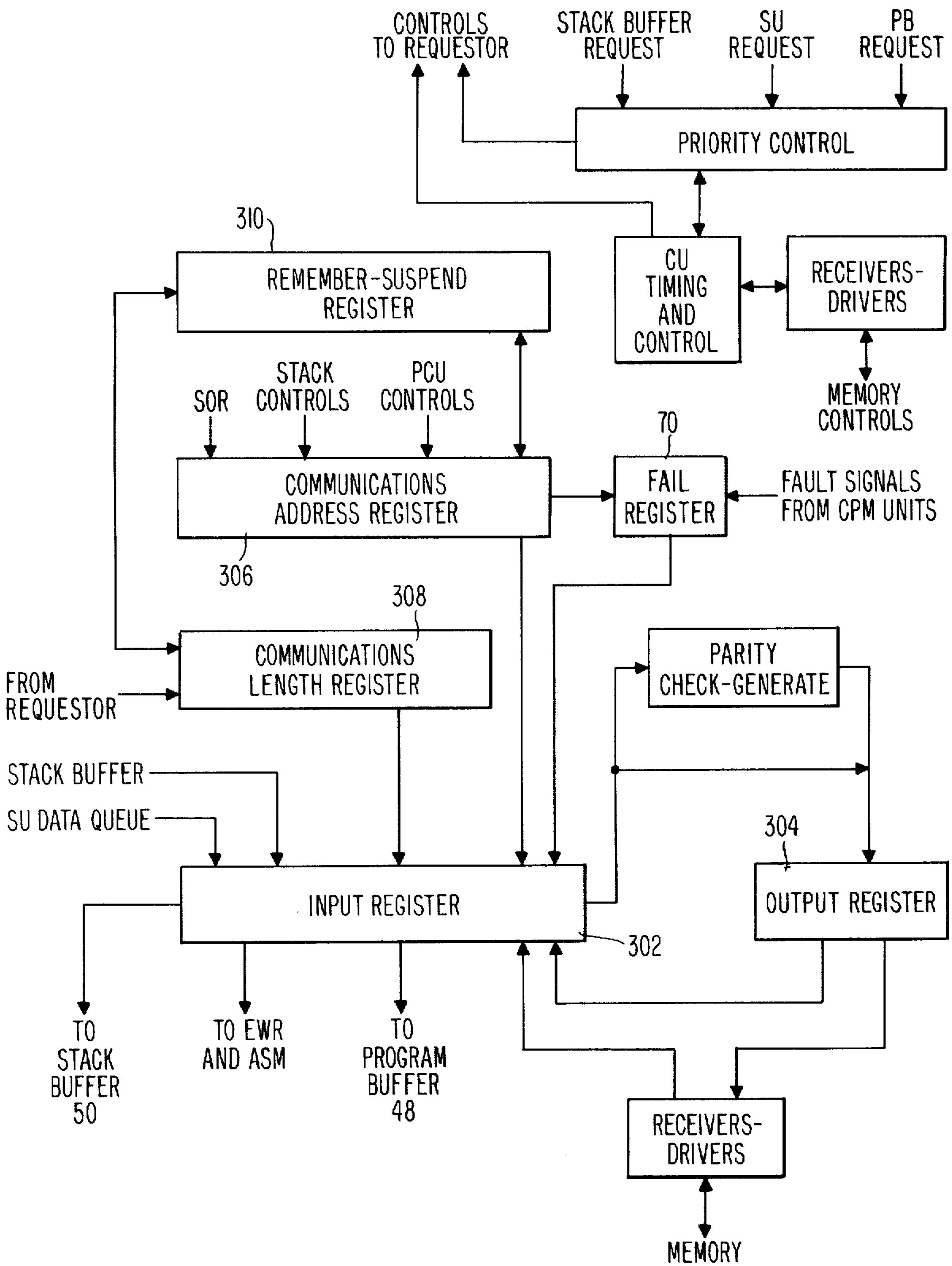
FIG. 9 is a generalized block diagram of a communications unit employed in the central processor module of FIG. 4.

The major logic elements of the communications unit as shown in FIG. 9, include input (IN) and output (OP) registers 302, 304 respectively, the communications address (CA) register 306, the communications length (CLN) registers 308, the remember-suspend (RS) register 310, the fail (FL) registers 70 and the control logic. The fail register 70 while assessible to the communication unit 68 is used by the fault control logic 58 of the CPM 20 and will be described later.

On single-word memory operations, the absolute memory address of the operation is contained in the CA register 306. For multi-word operations, the starting address is in the CA register 306 and the number of words to be fetched or stored is in the CLN register 308. During the operation, both the address and the word count are adjusted for each word fetched or stored. In the preferred embodiment, program code is fetched in eight-word blocks, which requires two four-word fetches (if the memory configuration allows four-word phasing). If, at the end of the first four-word fetch of program code, a higher priority request has been made for CU use, the current memory address and word length are transferred to the remember-suspend register 310 for temporary storage. Then the second four-word fetch is delayed until after the higher-priority request has been serviced. When no other requests are pending, the RS register 310 contents are loaded back into the CA register 306 and CLN register 308 and the fetching of code is resumed.

When access to main memory 30 is required, the CU control logic compares the six most significant bits of the address in the CA register 306 with the limits established for each memory control module (which will be described later) and selects the appropriate module. Then, the starting address and other control information for the operation are sent to the selected module in a memory control word. The control word is assembled in the input register 302, then transferred to the output register 304 and is sent to the addressed memory control module. The receipt of the control word is acknowledged by the memory control module.

For fetch operations, the memory control module notifies the CU 68 that access has been granted by sending a data-present (DAP) signal and the requested data to the CU 68. The data is received by the IN register 302 and is subsequently forwarded to the program buffer 48, the stack buffer 50, the associative memory 52, or the EWR, as appropriate.

Data for store operation is received by the CU 68 from either the storage unit data queue or the stack buffer 50. Data for store operations is buffered in the IN register 302 until the CU 68 gains memory access. Following the transfer of the control word and the acknowledgment of the receipt of this word, the selected memory control module informs the CU 68 of access by sending a send-data signal to the CU 68. On obtaining access the CU 68 transfers the data into the output register 304 and the word is then sent to the selected memory control module.

To further aid in understanding the physical and conceptual design of the central processor module 20, some of the basic operational concepts of the central processor module 20 are presented.

In the preferred embodiment, the central processor module 20 is designed as a pipeline processing unit. Therefore, each processing station may be operating simultaneously on a different task. As any instruction is passed through the processing pipeline, successive operations are performed by the various processing stations until the instruction is fully executed.

In general, the program operators in the program code string are fetched from memory 30 in multi-word segments and placed in the program buffer 48. The operators are extracted one at a time by the program control unit 56 and each is separated into one or more micro-operators, which are queued for processing by the execution unit 62. The program control unit 56 determines what data will be required for execution of the micro-operator and requests this data for the storage unit 66. For literal values, which are contained in the code string, the program control unit 56 extracts the data and forwards it directly to the execution unit 62. Therefore, as the execution unit 62 processes the micro-operators, the required data is usually instantly available, allowing the execution unit 62 to perform the required processing without delay. Results derived by the execution unit 62 may either be stored in one of the local memory areas or may be sent through the storage unit 66 and the communications unit 68 to main memory 30. By using this pipeline technique, relatively low speed processing is achieved without compromising equipment reliability.

To further increase processing speed, extensive use has been made of buffer memory areas contained within the processor 20. These local memory areas, which have already been described, are used to store program code, a portion of the active program stack, and frequently referenced variables.

In the preferred embodiment, the utilization in the central processor module 20 of special high-speed integrated circuit (IC) memories for the program buffer 48, the stack buffer 50, and the associative buffer 52, reduces and at times virtually eliminates the time spent waiting for the completion of transfers of data to and from main memory 30. Because these buffers are filled autonomously (two or four words at a time, depending upon configuration of the main memory 30, on the principle of anticipation rather than that of need followed by demand), the replenishment of their contents takes full advantage of normal main memory idle time.

Program buffer 48 provides local storage for up to thirty-two 60-bit program words and permits tight loop capture of program loops of 32 words or less. A loop once in the buffer may be extracted repeatedly without further fetching of program words from main memory 30. The 32 word stack buffer 50 provides local storage for (and hence quick access to) descriptors, variables, and control words at the top of the stack of a job that is being executed. The associative data buffer 52, which is composed of 16 78-bit words, provides local high speed storage for the operands of a job that are most often used but that are not close enough to the top of the stack to be placed in the stack buffer 50.

The stack structure of the system of the instant invention is not merely a software fabrication imposed upon congenial hardware. Rather, the hardware mechanism for structuring and manipulating the stack is intrinsic to the central processor module 20. This hardware stack mechanism makes possible the control of subordinate routines, communications between processes, and the servicing of interrupts to be treated in a uniform and efficient way.

Memory protection (preventing a program's gaining access to or altering data not assigned to it) is achieved by a combination of hardware and software mechanisms. The hardware mechanisms include automatic detection of a program's attempt to index beyond an assigned data area and the use of control bits which are set by software and which prevent the user's program from changing program words, data descriptors, segment descriptors, memory links, indirect reference words (IRW), control words, and tables of the software operating system.

The operators of the central processor module 20 act upon vectors, entire words, characters, groups of bits, and single bits. The same set of operators is used in performing both single-precision and double-precision arithmetic.

Interrupt conditions detected by the central processor module 20, and input/output module 10, or by a control module of a memory module 30*a* are processed by the central processor module 20, which prepares the stack for entry into the interrupt-handling procedure of the multi-level operating system, places the needed parameters in the stack, and causes entry into the interrupt-handling procedure of the operating system. Thus, by automatically discontinuing (either temporarily or permanently, depending upon the interrupt condition) the process being executed at the time the interrupt condition occurs, the system is able to deal with nearly every condition (both normal and abnormal) that may arise in a multiprogramming, multiprocessing environment.

In a preferred embodiment, the central processor module 20 operates in either of two states, namely, the control state which is used only by the multi-level operating system, or the normal state, which is used by both user programs and the multi-level operating system. The interrupt-handling procedure of the multi-level operating system is always executed in the control state. The differences between the two states are that in the control state the processing of interrupt conditions arising outside the central processor module 20 (external interrupts) is inhibited whereas in the normal state, it is not so inhibited and that in the control state the central processor 20 may execute privileged instructions that may not be executed in the normal state by the central processor 20.

In addition to the two states, the central processor module 20 can operate in any one of five interrupt modes, namely, the normal mode (CMO), the control mode 1 (CM1), control mode 2 (CM2), control mode (CM3), and control mode 4 (CM4).

Utilization of residual checking in all arithmetic operations and of parity checking in data transfers greatly facilitates the detection of errors within the central processor 20. If a failure occurs with the central processor module 20, a processor internal interrupt is produced and the cause of failure is denoted by the contents of a fail register 70 of the processor module 20.

The fail register (FR) 70, see FIG. 10, is physically located in the communications unit 68 of the central processor module 20 and is used to provide additional information concerning processor internal and memory related error conditions.

The fail register (FR) 70 may be considered as comprised of three parts: a part concerning errors which are internal to the central processor module 20, a part concerning errors which are memory-related, and a single bit indicating continuability after alarm interrupts. Each of these parts is independently set by the fault control logic 58 of the central processor module 20: the three parts are read and cleared (read destructive) as one. If more than one interrupt affecting one of the three parts of the register 70 occurs before the register is read and cleared, the part is completely overwritten with the information about the most recent interrupt. In a system which includes more than one control processor module 20, any or all of the central processor modules 20 may operate in control state or normal state, as well as in any of the interrupt modes.

The individual sections of the CPM Fail register 70 are used as follows: the processor internal error section is used for all processor internal errors (processor internal memory related errors use the memory related section as well). The memory related section is also used for memory parity, Memory Fail 1, and invalid access errors, but only when parameter P2 is not used, in which case P2 will be all zeros. The memory related section is also used for all Memory Fail 2 interrupts. The continuability bit is only applicable to Alarm interrupts. The Memory Fail 1 and 2 interrupts will be discussed in detail later.

In addition to the above interrupt conditions, the memory portion of the fail register 70 also reports an interrupt recovery routine by a control module portion of a memory module 30*a* which will be described later. When an interrupt condition is detected, a bit assigned to designate that condition is set in the 27 bit fail register 70. However, the indication of the error is queued with the operand, and the central processor module 20 is not interrupted until after the affected operation is completed by the execution unit 44.

Errors which are internal to a central processor module 20 are described by the setting of the CPM Fail Register 70. Error conditions reported include: parity, residue, continuity, and decoding errors in the execution unit; and queue overwrite, residue error in the address unit; internal error in the program unit, and memory error on protected store.

The processor internal portion of the fail register 70 reports parity, residue, continuity and decoding errors. The memory related portion of fail register 70 reports a number of different types of interrupt conditions. An interface error detected during an operation between the communication unit 68 and the other sections of the central processor 20 are reported to the fail register 70 as well as a parity error detected during an access to main memory 30. Also reported by the fail register 70 is the interrupt condition which exists when an address does not exist in main memory 30 and when a memory time out occurred in the central processor 20.

The central processor module 20 operates in normal mode (CMO) until an interrupt condition is detected. The first three control modes (CM1, CM2, CM3) allow for recursive attempts to enter the hardware interrupt routine (the fault control logic 58 of the central processor module 20). Control mode 4 (CM4) indicates that these attempts were not successful. There is no direct connection between the states of operation and the modes of operation of the CPM 20. The CPM 20 may be in any of the four interrupt modes while either in control state or in normal state.

INPUT/OUTPUT SUBSYSTEM

Figure 11:
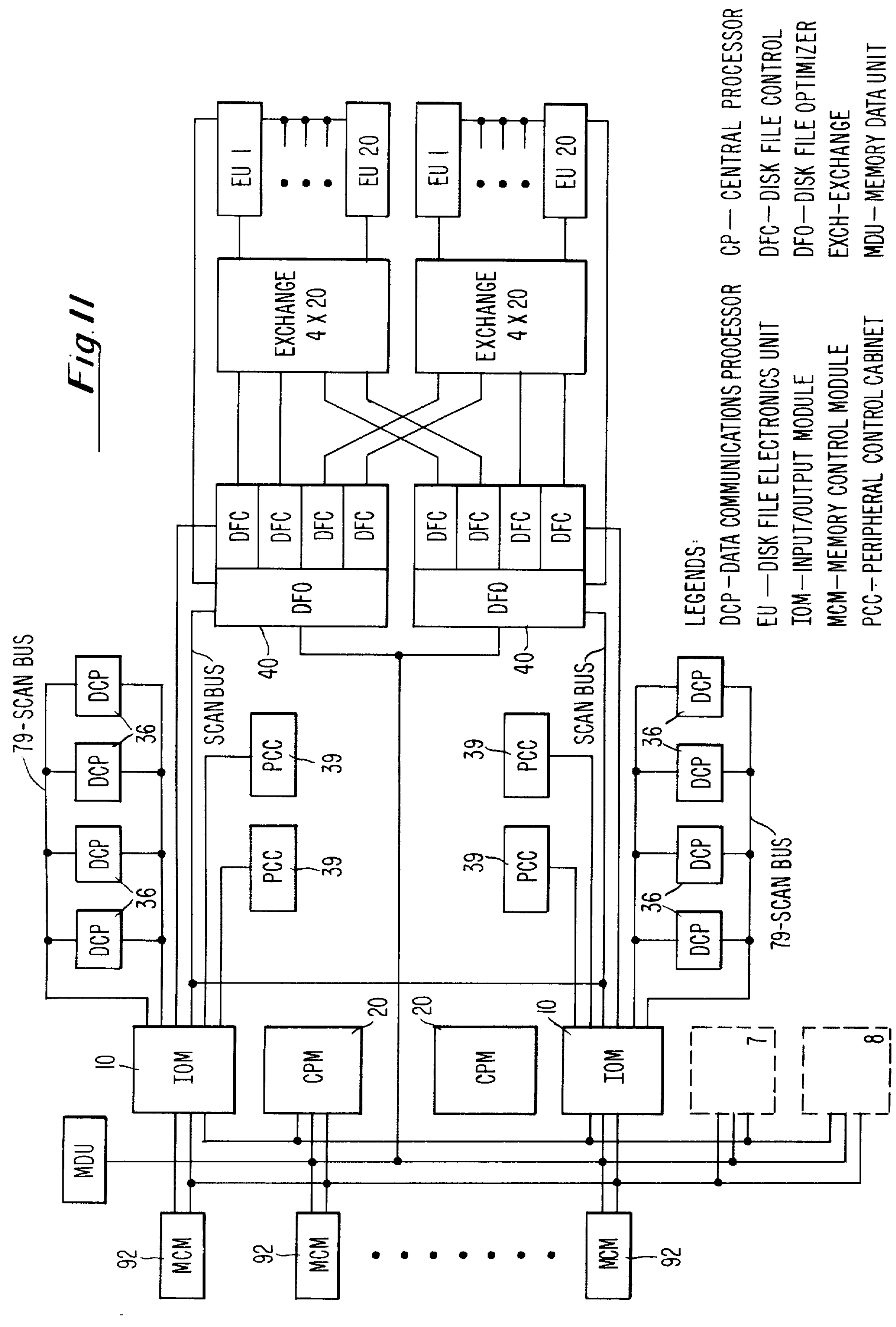
FIG. 11 is a simplified block diagram of the system of the instant invention.

Turning now to the input/output subsystem of the instant invention. The primary function of the input/output subsystem is to control and buffer the transfer of fixed-length data fields between main memory 30 (level-1) and the storage media of peripheral devices (level-3) of the information processing system. The peripheral devices are the media through which the system user communicates with the system. In the system of the instant invention, the peripheral devices operate independently of the central processor module 20 but always under control of the multi-level operating system through the input/output subsystem. The input/output subsystem includes one or more input/output modules 10, which is referred to as the IOM, and one or more peripheral control cabinets 39, see FIGS. 2 and 11. The input/output subsystem as an entity is interfaced directly with the level-1 and the level-3 storage systems and indirectly, by way of the level-1 subsystem with the central processor module 20. Within limitations, the number of input/output modules 10 and the number of peripheral control cabinets 39 within an input/output subsystem is dependent upon the user's requirements. The limitations are (a) that the combined total number of central processor modules 20 and input/output modules 10 in a system may not exceed eight and (b) a maximum of 28 peripheral controllers 38 may be connected to a single input/output module 10.

In the preferred embodiment the modularity concept applied to the design of the input/output module 10 provides an efficient, economic match to the user's system requirement. The modularity concept primarily concerns interface capability, and in particular, the peripheral interface capability provided by the data service subsections. These subsections are asynchronous and provide distinct peripheral connectivity capabilities. This uniqueness, derived from the asynchronous nature of the modular subsections, is a fail-soft advantage. Data-service failures are limited to a specific interface area, and thus allow the remaining interface capabilities to continue in service. The modularity concept has also permitted the use of additional data buffering within selected subsections on a device-speed basis. This use of buffering enables the faster peripheral devices of the system to communicate with main memory 30 in a faster multiple-word-mode using the phased memory transfer capability of the system. This efficient match of device rate to memory produces a higher input/output module 10 transfer rate.

Modularity in the input/output module 10 is achieved by use of the adapters, see FIG. 12. The respective adapters are defined below. The PC adapter A (PC/ADP-A) provides 10 peripheral controller (PC) channel capability to the first PCC 39, and ready line capability for three exchanges. The PC adapter B (PC-ADP-B) provides 10 peripheral controller channel capability to the second PCC 39 and ready line capability for four exchanges. The disc file controller adapter A (DFC/ADP-A) provides four disc-file-controller (DFC) channel capability to the first PCC 39 dedicated to disc controllers only. The disc file controller adapter B (DFC-ADP-B) provides four disc-file-controller channel capability to the second PCC 39 dedicated to disc controllers only. The scan bus adapter (SC/ADP) provides scan-bus capability to the input/output module 10 for driving the data communications processor (DCP) 36 and the disc file optimizer (DFO) 40. The disc-file-optimizer adapter (DFO/ADP) provides two disc file optimizer (DFO) channel capability. The datacomm processor adapter A (DCP/ADP-S) provides one data communications processor (DCP) channel capability for the first data communication processor 36. The datacomm processor adaptor B (DCP/ADP-B) provides one DCP capability per adapter (three used for the DCP's 2, 3, and 4). The memory bus adapter (MB/ADP) provides the input/output module capability for operating with a second group of eight memories. The switch interlock adapter A (SWI/ADP-A) provides capability for operation with two memory modules 30*a*. (Two used for the first four memory modules 30*a*). The switch interlock adapter B (SWI/ADP-B) provides capability for operation with two memory modules 30*a*. (Used for all additional memory modules 30*a*).

The modularity provided in the design of input/output module 10 of the instant invention allows the input/output subsystem to include a variety of IOM/PCC combinations, and therefore allows interface with the peripheral devices in a multitude of configurations. An example of the possible types of interface connections between the input/output subsystems of the instant invention and peripheral devices is shown in FIG. 10. As illustrated, the input/output subsystem may be connected with the peripheral devices through owned and/or shared exchanges, and/or directly with the peripheral devices.

Characteristically, the input/output module 10 is designed to provide the system user with maximum throughput and flexibility while requiring a minimum of central processor overhead. The input/output module 10 is characterized by its ability to operate asynchronously with the central processor 20 in the initiation, servicing, and termination of the device transfers. The base for this asynchronous mode is the request "map" concept. In essence, the input/output module 10 is queue driven from a map of I/O requests that reside in main memory 30. In requesting an input/output operation, the central processor module 20 alters the map in main memory 30 only to the extent of its interest to enter a request. The input/output module 10 later "trails" the same central processor path in recognizing and initiating the input/output request. Since main memory 30 (where the map resides) is a shared resource in the preferred embodiment, the central processor 20 and the input/output modules 10 may asynchronously access and process the map. Once the input/output module 10 is initiated, the central processor module 20 continues to process, queues new requests, processes, etc., such that the input/output module transfer times to and from devices are asynchronous and do not involve central processor cycles. To efficiently accomplish this task, the input/output module 10 of the instant invention includes a special purpose, hardwired multi-processor that services the map. In addition to this basic overlap advantage, the input/output module 10 further increases system throughput by a variety of techniques. For example, by reducing system processor overhead by handling real time interactive loops (for example, the DFO 40) directly without system intervention, or reducing system processor overhead by handling device termination cycles can increase throughput. Or partitioning the servicing of the data transfers into the input/output module 10 subsections designed to specifically handle the four principle classes of data throughput, which are the batch (line-printer, card reader, etc.), high speed (disc files), data communication (data communication processors 36), and real time interactive (disc file optimizers 40) can increase system throughput. Each subsection is completely independent and operates asynchronously with other subsections. They are unique and are buffered to match their device class thereby allowing an input/output module 10 to efficiently run to the throughput capability of a memory port of the memory subsystem. Increased througput is also achieved by allowing the input/output module 10 to select a transfer path for a device as the path becomes available (referred to as deferred binding).

Figure 13:
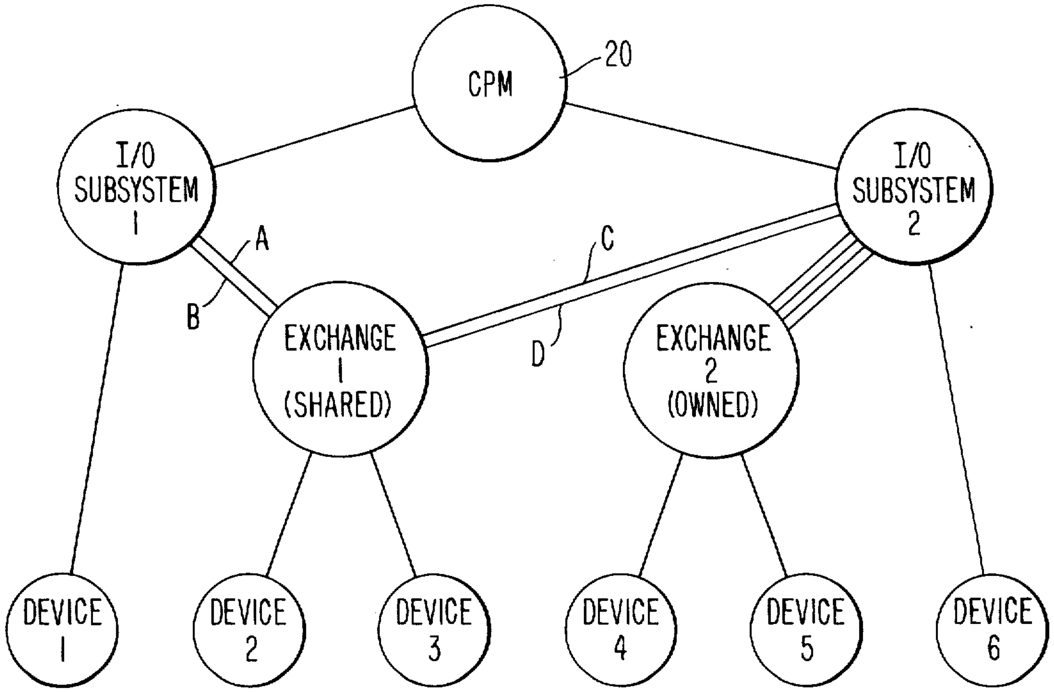
FIG. 13 depicts a general configuration of an input/output subsystem of the instant invention.

As shown in FIG. 13, maximum throughput can be realized only if the binding of a data path between an input/output module 10 and a device is delayed until the device is ready to initiate the job. For instance, if device D2 is to be initiated, the path required to connect a process with D2 involves selecting between two input/output subsystems (I/O subsystem 1 and 2) and between channels (A and B or C and D) within each input/output subsystem. If the path is pre-selected programmatically, the situation can develop in which the device is free but the pre-selected path is not. Thus, execution of a request would be unnecessarily delayed if an alternate path did not in fact exist.

Delay-binding the path programatically generally requires that the central processor module 20, which initiated the job, be involved in the operation until the actual device initiated is accomplished. Since this reduces the parallelism of both central processing and the input/output subsystems, it is more efficient to have the input/output modules 10 manage the path selection. The total system-processor time required to accomplish an I/O operation is thus limited to the amount of time required for a central processor module 20 to construct and queue an input/output request in the level-1 memory. Once queued, I/O requests will be serviced by an input/output module 10 independent of any central processor module 20 involvement, as soon as a path to the selected device becomes available.

To enable central processor modules 20 to queue I/O requests and the input/output modules 10 to select paths and service requests, a list of unit table (UT) words (which describe the channels to be used for I/O requests) and a table of the I/O control block (IOCB) base address pointers (Queue-Header and Queue Trail Tables) must be loaded into the level-1 memory at initialized (cold start) time. These tables allow each input/output module 10 to be aware of the devices it can service and the order or priority of exchange devices, and is the mechanism used by the central processor modules 20 to queue requests. When a request is processed (or the start I/O process) requires that a transfer of data be made by an input/output module 10, the central processor module 20 is required to perform the following operations: (a) construct either single or multiple requests which explicitly define the operation(s) required to complete the job; (b) store the request in level-1 memory, and (c) inform the input/output modules capable of servicing the job requests of the level-1 locations at which the requests are stored.

The requests are then left in level-1 memory until an input/output module 10 is read to service them. All requests for I/O are made at what is termed the home address (HA) level. That is, each processor requesting to execute I/O must specify a unit designate (UD) number for use as an index into the unit table (UT). The unit table is then used with the UD number to queue the request for the requested device. Upon completion of each I/O request, the state of either the IOCB software attention bit or of a status queue header (SOH) interrupt bit determines whether the input/output modules notify the central processor 20 of the terminated status. Thus, once the request has been queued, system software will be free to perform other tasks while waiting for the completion of the I/O request(s).

Figure 14:
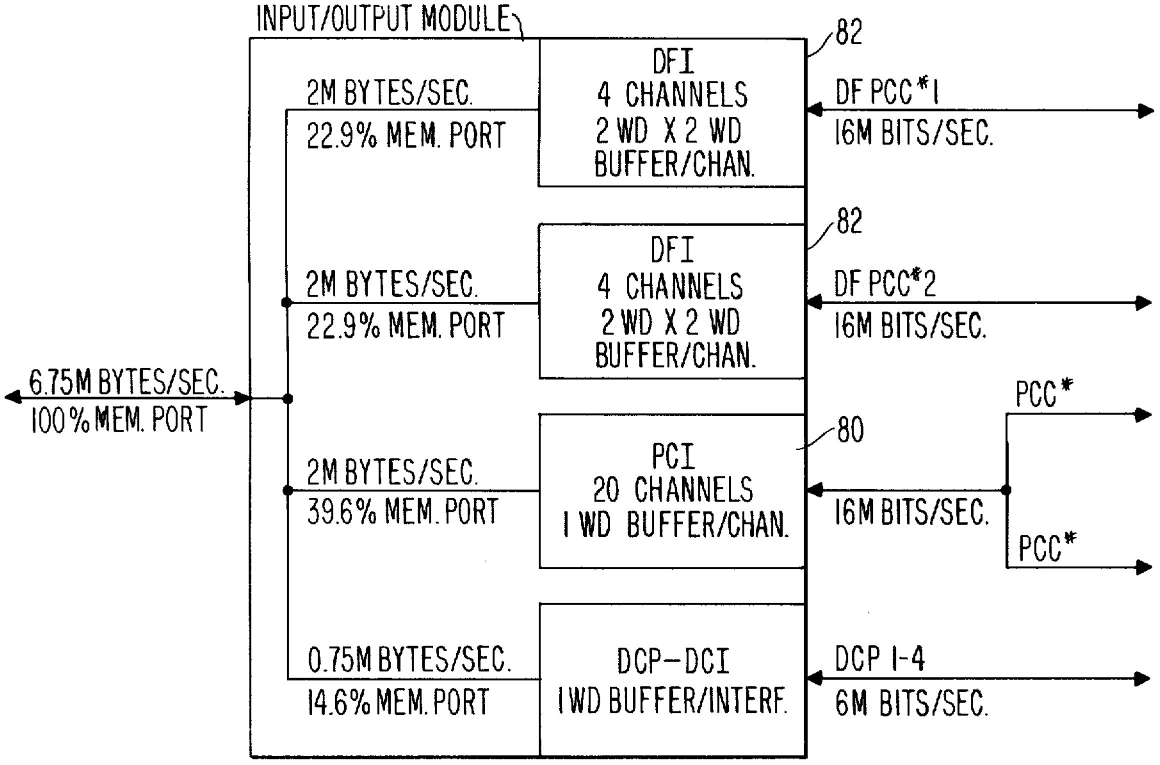
FIG. 14 is a diagram showing the information transfer rates for the input/output module of FIG. 12.

In the preferred embodiment, the transfer rate of the input/output module 10 is dependent upon the modular configuration of the input/output module 10 and the system memory speeds. FIG. 14 indicates the composition of the transfer rate for an input/output module 10 with all the previously described modularity adapters included, using a phased 1.5 micro second cycle memory system. A diagram of an input/output subsystem map (IOSM) 312 required for the I/O subsystem configuration represented in FIG. 13 is shown in FIG. 15. As shown in FIG. 15, the IOSM 312 is comprised of a home address (HA) 314, a unit table (UT) 316, a QUEUE table which is defined by a head 318 and tail 320, (IOQH, IOQP), the status queue header (SQH) 322, and an input/output control block (IOCB) 324. The following paragraphs will be devoted to a description of these elements.

The HA 314 is a basic software-constructed word used for communications with an input/output module 10. The HA 314 includes basic I/O instruction fields which, when decoded, condition the IOM logic to initiate the IOM operations. The HA word is stored in a level-1 memory address location. The fields of the HA word are shown in FIG. 16, and defined in Table 1.

TABLE 1

HOME ADDRESS FIELD DEFINITION

| Bit(s) | Function |
|---|---|
| Parity (51) | Provides odd parity for the word being transferred. |
| Tag (50-48) | Denotes word as being a single (000) precision word. |
| Lock (47) | When set, by software indicates the HA words are available for IOM use. Resets when IOM services HA words. |
| Bits (46 thru 44) | Not used. |
| Controls (43 thru 40) | Defines the Control Codes of the HA word. |
| Bits (39 thru 36) | Not used |
| Unit Designate (UD) (35 thru 28) | A unique 8-bit code-used with the UT base address to index and lock fetch from level-1 memory the UT word for the device to be started, and used with the QH base address to unlock fetch from level-1 memory the QH word, which points to the IOCB base address |
| Channel Number (27 thru 23) | Identifies one of the 32 possible IOM channels. |
| Bits (22-20) | Not used. |
| Ha,SO,UT, or QH (19 thru 0) | Used to establish a new base address or during a cold-start operation to transfer to the IOM the following base addresses: All 4 registers are capable of being changed by an instruction after the system is initialized.<br>a. HA — 20-bit basic address obtained through a cold-start operation. |

TABLE 1 – Continued

HOME ADDRESS FIELD DEFINITION

| Bit(s) | Function |
|---|---|
| | b. UT — a 20-bit address indicating the base address of the UT. c. SQ — a 20-bit address which points to a status queue header (SQH). The SQH consists of the head and tail address of the status queue. d. QH — a 20-bit address indicating the base address of the IO Queue Table and is added to 256 to point to the IO Queue Tail. |

A UT word is required for each peripheral device (maximum of 255 devices) in the I/O subsystem. Each UT word is the main element used by the IOM 10 to serve as I/O requests. Each UT word for an exchange includes pointers to the first unit designate (FUD) and the next unit designate (NUD) numbers and its associated channel-number-base-address listing for the device type used for the I/O request. The various fields in the UT shown in FIG. 17 and defined in Table 2.

linked from the unit queue and linked to the SQ. If the software attention bit in the input/output control word (IOCW) is set (set by software) or if the interrupt bit in the SQH is set at the same time that the IOCB is being linked to the SQ, a channel interrupt signal is sent by the IOM 10 to the central processor 20. When a non-channel-related error is detected, the IOM 10 sends an IOM error interrupt signal to the central processor 20 and not the channel interrupt.

TABLE 2

UNIT TABLE WORD DEFINITION

| Bit(s) | Function |
|---|---|
| Parity (51) | Provides odd parity for the word being transferred. |
| Tag (50 thru 48) | Denotes word as being a single (000) precision word. |
| Lock (LK) (47) | When set, indicates the UT word is being operated on. |
| Magnetic Tape (MGT) (46) | When set, indicates this job request is for a magnetic tape. (set by software.) |
| Disk Pack (DSPK) (45) | When set, indicates this job request is for a disk pack. (Set by software.) |
| Bits (44 thru 40) | Not used. |
| Disk File Optimizer (DFO) (39) | When set, indicates unit is under control of a DFO. A ring walk will not be performed with this bit set. (Set by software.) |
| Exchange (EX) (38) | When set, indicates the unit is connected to an exchange. A ring walk will be performed (if the job bit is set) with this bit set. (Set by software.) Not used if bit 39 is set. |
| Job (JB) (37) | When set, indicates that all channels associated with this request were busy, and when a channel becomes free and no further request are queued for that device, this job is to be done. (Set by IOM.) Used only with exch. devices (Bit 38=1) Not used with DFO (Bit 39.) |
| Busy (BZ) (36) | When set, indicates that this unit is busy. (Set by IOM.) |
| *First Unit Designate (FUD) (35 thru 28) | Points to the First Unit Designate Number connected to the exchange. |
| Channel Number/Base Address (27 thru 23) | For units not on an exchange, the number of the channel to which this unit is connected. For units on an exchange, the lowest numbered channel to which the exchange is connected. |
| *Last Channel on Exchange (LCEX) (22 and 21) | Indicates the 2 least significant bits of the last channel number of the exchange, for the device to be used. |
| Bits 20 thru 17 | Not used. |
| Last (LST) (16) | When set, indicates this is the last Unit Designate on the exchange. |
| *Next Unit Designate (NUD) (15 thru 8) | Points to the Next Unit Designate number connected to the exchange. |
| Channel Used (7 thru 3) | These bits specify the channel that was used to service the device. (Set by IOM.) |
| Bits (2 thru 0) | Not used. |

*These apply only to exchange devices.

The formats and definition of the input/output queue head (IOQH) and the input/output queue trail (IOQT) are given in FIGS. 18 and 19 and in Tables 3 and 4, respectively.

A status queue (SQ) is a queue comprised of terminated IOCB's which have been linked together by a IOM 10. When a request is terminated, the IOM 10 that executed the IOCB inserts the termination status into the fifth word field of the IOCB. The IOCB is then un-

TABLE 3

QUEUE HEAD (IOQH)

| Bit(s) | Function |
|---|---|
| Parity (51) | Provides odd parity for the word being transferred. |
| Tags (50–48) | Denotes word as being a single precision word. (000) |
| (47–20) | For Software use only.) |
| (19–0) | Address of 1st IOCB. (If 19–0) are zero dur- |

TABLE 3-Continued

| QUEUE HEAD (IOQH) | |
|---|---|
| Bit(s) | Function |
| | ing a start I/O operation, an Illegal condition exists and a fail word is sent to the status Queue. |

TABLE 4

| QUEUE TAIL (IOQT) | |
|---|---|
| Bit(s) | Function |
| Parity (51) | Provides odd parity for the word being transferred. |
| Tags (50–48) | Denotes word being a single precision word. (000) |
| (47–20) | For software use only. |
| (19–0) | Address of last IOCB. |

stores the RD word in the sixth word field in the IOCB. The terminated IOCB is then linked to the status queue (SQ). To complete the termination, the queue head (QH) and queue tail (QT) of the QH table are nulled (set to zero) if this were the last request from this unit, and the UT word for the device is stored unlocked. If there are more requests, the address of the next IOCB is inserted into the QH. The control is then passed to the I/O start logic to initiate the next request. The various fields of the IOCB are defined in Table 6. Finally, the IOCW which is illustrated in FIG. 22, is the fourth word in the IOCB. The input/output control word (IOCW) includes the standard control field (SCF) which includes information useful to the data service sections (such as a memory protect bit, a memory inhibit bit, and a software tension bit of the IOM 10). The various fields of the IOCW are defined in Table 7.

TABLE 5

| STATUS QUEUE HEADER | |
|---|---|
| Bit(s) | Function |
| Parity (51) | Provides odd parity for the word being transferred. |
| Tag (50 thru 48) | Denotes word as being a single (000) precision word. |
| Lock (LK) (47) | When set, indicates the SQH word is being operated on. |
| Bit (46) | Not used. |
| Change (45) | Notifies software, when set, that a status change vector has occurred. |
| CPM Number (44 thru 42) | Points to the CPM that will be interrupted by either channel interrupt or error interrupt. |
| Null (41) | When a 0, indicates that the queue is empty; when a 1, indicates terminated jobs are under queue. |
| Interrupt (40) | When set, (set by software) indicates that the CPM number field shall be interrupted upon job termination. (Reset by IOM) |
| Head (39 thru 20) | A 20-bit address pointing to the IOCB of the first device terminated. (Not used if bit 41 = 0) |
| Tail (19 thru 0) | A 20-bit address pointing to the IOCB of the last device terminated. (Not used if bit 41 = 0) |

A status queue header (SQH), see FIG. 20, is assigned to each IOM 10 that is addressed by an SQ register 326 of the IOM 10. The SQH serves as the monitor of the SQ and is used by the IOM 10 to build and access the queue. When a request terminates, the SQH is locked-fetched and tested for a null condition (bit 41 reset). If a null condition is detected, the address of the terminated IOCB is stored in both the head and tail fields of the SQH and the null bit is set. If the null bit is detected set, then the address of the terminated IOCB is inserted into the next link (NL) field of the last terminated IOCB and is also inserted into the trail address field of the SQH. The various fields of the SQH word are defined in Table 5.

In the preferred embodiment an IOCB as shown in FIG. 21, is a block of six (or more) 51-bit words. These words are used to initiate requests for service (IOCW) and to relate requests for service, linking of requests, and requests termination statuses. When a request is terminated, the section of the input/output module 10 would perform the request inserts and insert a request termination bit into an active channel stack (ACS). The input/output module 10 that executed the IOCB then fetches the appropriate result descriptor information from the IOM 10, uses the result descriptor information to form a result descriptor (RD) word and Turning now to a general functional description of the input/output module 10, the input/output module and associated peripheral control cabinets 39 are employed to control the transfer data between the level-1 storage media and all peripheral units, independent of central processors 20. The input/output modules 10 receive instructions from the central processors 20, and in conjunction with the associated peripheral controllers 38, execute these instructions. At the completion of a data transfer, the input/output module 10 generates terminate instructions and stores terminate information in a designated stack area located in the input/output module 10. In the preferred embodiment, each input/output module 10 is capable of processing up to 28 simultaneous input/output (I/O) operations from up to 28 peripheral controls (PC's) 38, and can accommodate a combined maximum of 255 peripheral device, four (4) data communications processors 36, and four disc file optimizers (DFO's) 40. Physically each input/output module 10 can be considered as divided into the following six functional areas, see FIG. 23; (1) the translator 72; (2) the memory interface unit (MIU) 74; (3) the scan interface (SCI) 76; (4) the data communications processor memory interface (DCI) 78; (5) the peripheral control interface (PCI) 80; and the disc file interface (DFI) 82.

TABLE 6

| Word Field | IOCB Function |
|---|---|
| IOLINKAGE (NL) | Level-1 address of the next IOCB queued for this device (bits 0–19). |
| SIDELINK | Link to another job in this side chain; may or may not be for the same unit. Contains: a. Tag-unused b. Unit Designate for which that next IOCB is to be queued (bits 40 thru 47) c. Address of next IOCB in side chain (bits 20 thru 39) d. Bits 8 thru 19 — unused e. IOM mask (bits 0 thru 7) — identifies which IOM's could perform the side-linked job |
| Buffer Descriptor | This is a data descriptor which points to the bufer, and contains: a. Area Base Address (bits 0 thru 19) — this 20-bit address points to the level-1 location at which the buffer associated with this device can be found. b. Buffer Length (bits 20 thru 39) — specifies the buffer length (in words) in main memory. |
| IOCW | This word field defines the I/O job for the PCI or DFI portion of the IOM. For a detailed description of the format and definition of the IOCW contents, refer to figure 9–7 and to table 9–7. |
| CDL | This word field will contain the Channel Designate — level (CDL) information word which will be transferred to the channel selected for the operation. |
| IORD | Termination (normal or error) of the operation causes the IOM to transfer into this word field Result Descriptor (RD) information. |

NOTE: Translator Adds (Area Base Address + Buff Length) for final address.

TABLE 7

| Bit(s) | IOCW Function |
|---|---|
| The various fields of the IOCW are defined as follows: | |
| Parity (51) | Provides odd parity for the word being transferred. |
| Tag (50 thru 48) | Denotes word as being a single (000) precision word. |
| ASCII (ASC) (47) | When set, indicates that ASCII translation is required. |
| Link (LK) (46) | When set, indicates that a link to another IOCW is required. (The address of the new IOCW is stored in bits 0 thru 19). |
| Software Attention (SA) (45) | When set, indicates that the IOM will interrupt the CPM on the channel interrupt line at the time the IOCB is being linked into the status queue (SQ). |
| Input/Output (I/O) (44) | When set, indicates that the transfer is to be an input operation. When reset, indicates that the transfer is to be an output operation. |
| Memory Inhibit (MINH) (43) | When set, indicates that data will not be transferred to/from memory. |
| Translate (TRA) (42) | When set, indicates that internal IOM translation is needed. |
| Frame Length (FML) (41) | When set, indicates that the frame length is to be 8-bits. When reset, indicates that the frame length is to be 6-bits. |
| Memory Protect (MP) (40) | When set, indicates that the level-1 memory will not store into a location during a write operation and will send a fail signal when a memory word contains bit 48 = 1. |
| Backward/Forward (B/F) (39) | When set, indicates a backward operation on a tape unit. When reset, indicates a forward operation on a tape unit. |
| Tag Control (TCTL) (37 and 36) | Indicate the following: 37 36 / 0 0 Store single precision tags / 1 1 Store double precision tags / 0 1 Store program tags / 1 0 Tag field transfer |
| (35 thru 0) | Not used. |

The translator 72 is a special purpose processor capable of performing specific hardwired micro-sequences. It is the mechanism of the input/output module 10 that services I/O requests, generates the request descriptors required to initiate peripheral devices, and reports request termination and failure status conditions to the central processor 20. The operation of the translator is keyed to respond to certain declared flag conditions.

The memory interface unit (MIU) 74 performs all level-1 to level-3 data transfers between the input/output module 10 and a maximum of eight system level-1 memory controllers (MCM's). The MIU 74 detects level-1 memory error conditions, and reports them to the requesting functional unit of the input/output module 10 and to the translator 72 when applicable. The memory interface unit 74 manages level-1 memory access requests by the functional units of the input/output module 10 on a preassigned priority basis. First priority is given to data service requests while second priority is given to data communications processor interface requests. Third priority is given to translator requests.

The scan interface unit (SCI) 76, which includes the data communications processor memory interface (DCI) 78, includes the storage and controls required for providing scan bus 79 for communicating with four data communications processors (DCP's) 36 and four disc file optimizers (DFO's) 40. The scan bus 79 to the four DFO's 40 is shared between two input/output modules 10. The translator 72 initiates scan operations by transmitting a scan control word to the scan interface unit (SCI) 76. If a scan-out is required, the translator 72 is notified by completion of scan operations by the scan interface unit 86. If a scan-in is the operation completed, the translator 72 loads the scan-in information in the register denominated the B register in the translator 72. If an error is detected by the scan interface unit 76, the error information from the scan interface unit 76 is loaded into a register denominated the F register of the translator 72. The errors detected by the scan interface unit are Not Ready error, which occurs when a disc file optimizer 40 or a data communications processor 36 addressed by the scan bus 79 does not respond with a ready signal within 3 micro seconds, and a Module Error which occurs when a disc file optimizer 40 or a data communications processor 36 addressed by the scan but 79 detects an error on a scan-out or a scan-in operation.

The data communications processor memory interface (DCI) 78, which is part of the SCI 76, includes a storage capability and the controls required to interface with the memory busses 47 of four data communication processors (DCP's) 36. The memory transfer operations performed include: (a) Fetch (one word); (b) store with flashback (one word); and (c) protected store with flashback (one word). All errors detected by the DCI 78 or the memory interface unit 74 for a DCI memory request are translated to the data communications processor 36 that initiated the memory request.

The peripheral control interface (PCI) 80 enables the input/output module 10 to interface with from one to twenty peripheral controllers (PC's) 38 and coordinate data transfers between these controllers and the memory interface unit (MIU) 74 as directed by the translator 72. In the preferred embodiment, each peripheral controller (PC) 38 requires a one microsecond service cycle to transfer data. By means of overlapping service cycles and by use of local memory windows (a one-clock period during which a particular operation may be performed if no higher priority is required), it is possible to multiplex all twenty channels.

The disc file interface (DFI) 82 enables an input/output module 10 to be interfaced with up to eight (8) disc file controls (DFC) 81. The DFI 82 includes two independent, modular sections, each section capable of handling four data channels; each channel is interfaced with one DFC 81. Each section controls data transfers with the DFC's via a 16-bit data bus with a transfer rate of two eight-bit characters for transfer time. The level-1 transfer rate is two words (2 × 48 bits) for transfer time. Each data channel comprises a four-word data-buffer area, called local data memory (LMD). Upon command from the translator 72, the disc file interface 80 initiates requests with its associated disc file controls (DFC's) 81. During data transfer operations, the disc file interface 80 communicates with the memory interface unit (MIU) 74 to obtain level-1 access. Upon job completion, the disc file interface 80 notifies the translator 72 of the termination status and then awaits reinitiation.

All control work flow between the main memory 30 and up to 255 system peripherals is via the IOM subsection denominated the memory interface unit 74, the IOM control subsection denominated the translator 72, and one of four IOM subsections, each of which being uniquely buffered to match the class of data transfers assigned to it, see FIG. 24. The translator 72 subsection routes control of a given job request to one of these four subsections dependent upon data class, (e.g. batch, high speed, data communications, or real-time interreactive). All data flow on the other hand between main memory 30 and the peripherals is via the appropriate data-transfer subsection and/or the MIU 74; the translator 72 is not involved and is free for control of additional job requests. When a data transfer is complete, however, the translator 72 is given control over job termination, and control flow to main memory 30 is via the appropriate data-transfer subsection, the translator 72 and the memory interface unit 74.

Typical peripheral devices which may be assigned to each data-transfer class are shown in FIG. 25. Also shown in FIG. 25 are the data-transfer subsection names which are henceforth referred to. The following is a brief description of the interface capability of each subsection, and its physical relationship to typical peripheral equipment. The descriptions are presented in reference to FIG. 3, which illustrates the interface capability provided when two maximum-configuration input/output modules 10 and appropriate exchanges are utilized. It should be noted that a maximum of 28 peripheral controllers 38 (excluding DFO's and DCP's) may be connected to a single IOM 10.

The peripheral control interface (PCI) 80 of a single IOM includes either one or two interface sections, dependent upon user requirements. Each section has ten channel interface capability, for a total maximum capacity of 20 channels per input/output module 10.

In the preferred embodiment, each ten-channel section of a peripheral control interface (PCI) 80 can service a single peripheral control cabinet (PCI/PCC) 39, which may contain up to five large-controller channels and up to five small-controller channels, see FIG. 2. In each PCC cabinet 39, the large channels are numbered zero through four and the small channels are numbered five through nine. Any combination of five small controls may be housed in the PCI/PCC cabinet 39. The large controls (single line control and the MTC or magnetic tape control) may be connected to the peripheral units directly, or, in the case of the magnetic tape control (MTC) only, via exchanges. Any unused channels in the PCC cabinet 39 are left empty. The peripheral control interface 80 multiplexes all twenty channels by generating overlapping one-micro second data service cycles and by the use of "windows" in a self-contained local memory, as previously discussed. In the typical configuration, see FIG. 3, the use of two input/output modules 10 and appropriate exchanges (4 × 16) allows access by either input/output module 10 of 64 magnetic tape units (MTU). As illustrated in FIG. 3, the input-/output module number is one shown as having access to an additional non-exchange magnetic tape unit 83, and both input/output modules are illustrated as having access to the SPO units 85 via the single line controls (SLC) 87.

The disc file interface (DFI) 82 also includes either one or two interface sections, depending on user requirements. Each section has an interface capability of four channels, for a total disc-file-channel capability of eight channels per input/output module 10. Each four channel section of a disc file interface (DFI) 82 can service a single DFI/PCC cabinet 81. This cabinet contains only large channels (four maximum) which are dedicated to either disc files or disc packs. The channels may be connected to the peripherals either directly or via exchanges. In a typical configuration as shown in FIG. 3, the use of two maximum DFI-configuration IOM's (eight channels per IOM, for each disc file and disc pack) and appropriate exchanges (2 × 24 disc file, 2 × 16 for disc packs) allows access by either input/output module 10 (IOM1 or IOM2) of eighty disc file electronics units (DFEU) (400 disc file storage units) and 64 disc packs (DPD).

The scan interface (SCI) 76 consists of two sections, a DFO scan interface **76*a* and a DCP scan interface 76*b*. The disc file optimizer (DFO) scan interface 76*a* provides scan-in and scan-out control for up to four DFO's 40 via a scan bus. If a second input/output module 10 is utilized, the DFO scan bus is shared by the two IOM's. The DCP scan interface 76*b* provides scan-out control only, and they communicate with up to four DCP's 36 via a scan bus. The scan interface 76 is not used for DCP scan-in functions, which are initiated by the data communications processor 36. For these functions, the data communications processor 36 communicates with main memory 30 directly via memory interface 74. The DCP scan bus is not shared by a second input/output module 10**.

The data communications interface (DCI) 78 provides the data and control interface for the input/output module-initiated-scan-out operation, and the data interface only for the DCP-initiated-scan-in operations. Interfaces are provided in each input/output module 10 for up to four data communications processors 36. The use of two input/output modules 10 in a system allows interface with eight data communications processors 36.

FIG. 26 illustrates a typical interface configuration between the input-output modules 10, the control modules 72 for memory modules **30*a*, and the central processor modules 20 of the system of the instant invention. The following is a brief description of the interface capability of the memory interface subsections 74 of an input/output module 10 with main memory 30, and the translator subsection 72 of an input/output module 10 with a central processor module 20 of the system. The memory interface subsection includes eight interface areas, as illustrated in FIG. 26. Each interface area is dedicated to a distinct memory control module (MCM) 72, and is connected to it via a unique memory bus. The bussed IOM/MCM interface is referred to as a memory/user pair. A similar capability exists within the central processor module (CPM) 20, which also contains eight MCM interface areas. Each CPM interface area is dedicated to a distinct MCM 72 and is connected to it via a unique memory bus. The bussed CPM/MCM interface is also referred to as a memory/user pair. In the preferred embodiment, the interface capability of a MCM 72 is eight memory busses, each of which is connected to one and only one input/output module 10 or central processor module 20. Therefore, the maximum combined number of central processor modules 20 and input/output modules 10 which may be bussed to any MCM 72 is limited to eight. The maximum number of MCM's 72 which may be contained in the system of the instant invention is also limited to eight. This limitation is imposed by the eight MCM-dedicated interface areas of each input-/output module 10 or central processor 20 in the system. The typical memory-bus configuration illustrated indicates that the use of two input/output modules 10, two central processor modules 20, and two memory control modules (MCM) 72. This configuration provides a total eight memory/user pairs (MCM 0 to User 0 through 3 and MCM 1 to User 0 through 3). The maximum number of memory storage units (MSU) which will be described later, with which an MCM 72 can communicate (four) is also illustrated. Each of these MCM's can access in the preferred embodiment of the invention, 262,144 words of memory (four MSU's of 65,536 words each). Each input/output module 10 or central processor module 20, when connected as illustrated in FIG. 26**, can therefore access 524,288 words of memory.

The interface between the input/output modules 10 and the central processor modules 20 of the system of the instant invention consists only of an interrupt bus 298. The translator subsection 72 of an input/output module 10 is informed by the central processor module 20 of job requests via the bus, and the translator 72 informs the central processor module 20 of non-channel-related IOM errors via the bus. In addition, the translator 72 uses the bus to inform the central processor module 20 of (1) input/output job completion when so requested by software, a supervisory position (SPO) or a date communications processor 36, and (2) status change by vector or disc pack. The interrupt bus is common to all input/output modules 10 and central processor modules 20 in the system.

In the preferred embodiment, the input/output moldule 10 is designed to operate asynchronously with the central processor module 20 in the initiation, service, and termination of input/output transfers for the use of the "job map" in level-1 memory. As previously discussed, the "job map" consists basically of five software-constructed elements which define the job request, the peripheral device, and the IOM channel. In general, the map elements inform the central processor module 20 of its IOM/peripheral resources and their status. When necessary, the central processor module 20 then alters the queued job request of the "job map" to the extent of its interest and interrupts the input/output module 10 to request service. The input/output module 10 then accesses the "job map" to determine the input/output job and initiate it. Since the "job map" is a shared resource of the input/output module 10 and the central processor 20, the IOM transfer times are masked by the continual processing and queuing of new requests by the central processor module 20, thus maximum system throughput is obtained with a minimum of central processor module time.

The input/output module 10 also manages path selection to the requested device (as opposed to programmatic preselection of a path which is generally used). This path management eliminates the occurrence of situations whereby (1) the requested device is free, (2) the preselected path is not, and (3) an alternate path exists but cannot be used due to the programmatic preselection. These situations generally require involvement of the central processor module 20 and the input/output module 10. Since the input/output module 10 manages the path selection in the system of the instant invention, the involvement of the central processor module 20 regarding job initiation ends when an interrupt is sent to the input/output module 10. The input/output module 10 then initiates a job request when the requested device and any path of that device is available.

In the preferred embodiment, the design of the input/output module 10 incorporates extensive error-detection logic which monitors the flow of control words and data between the input/output module 10 and the other main-frame modules, within the input/output module 10 itself, and between the input/output module 10 and peripheral devices. Particular emphasis is placed upon preserving the integrity of all memory operations. In general, the error-detection hardware includes parity check and generate circuitry, residual check circuitry, circuitry to detect illegal commands, conditions, and control states, and timeout circuitry for memory transfers, scan bus operations, and internal IOM transfers.

In the preferred embodiment, the design of the input/output module 10 incorporates the prime concepts of fail-soft which are: error detection, error reporting, and transfer path redundancy. Specific emphasis is directed towards providing extensive error detection, which is the basis for the fail soft system. The input/output module 10 includes extensive error detection logic organized to monitor the operational flow of an input/output module on an inter-module/intra-module basis down to the device-data-transfer level. Particular emphasis is placed upon preserving the integrity of all memory operations. This concept permits the detection of an error to occur immediately and to recover with the validity of main memory 30 protected and undisturbed. This concept is the foundation of an effective fail-soft system. The error detection hardware of the input/output module 10 includes a parity (check and generate) of memory data transfers; a parity (check and generate) of device data transfers in each PCI 80, DFI 82, scan bus, and DCI 78 data service subsection; a parity (check and generate) of internal register transfers between and within all IOM subsections; a parity (check and generate) of internal local memory stacks within each subsection, continuous detection of illegal commands, conditions, and control states within the control logic of each subsection; residual check on all arithmetic operations within each subsection; time out on memory transfer operations, time out on scan bus operations; and time out on internal transfers between the translator 72 and all data service subsections. In addition, the control word generated by an input/output module 10 for a memory transfer is validated by the memory controller 72. In the preferred embodiment, the memory transfer is completed with a one bit error correction, two bit error detection. The organization of the above-described detection logic is shown in FIG. 27. The detection hardware is shown in the oval indicators, as well as the data-control flow within the input/output module 10 at the subsection level. Note that only one of the DFI subsections is shown. In actuality, there is a second identical DFI subsection with its own detection logic.

The flow begins with the fetch from main memory 30 of request control information. The fetch command from the input/output module 10 was first checked against an MCM access mask for that IOM 10, then checked for parity by MCM. All subsequent memory operations undergo these same tests. The data is sent to the input/output module 10, first passing a one bit correction, two bit detection check. Control data is then parity checked in the IOM 10. Passing this, the data is sent to the requesting translator section 72. The translator 72 examines this data in its work register, including a parity check to verify the internal bus transfer. Once the translator 72 determines that this is a command to initiate a new request, it fetches the appropriate base address from its map pointer stack and checks the residue. It adds the unit designate (UD) field from the initial command to the base, validates the resultant by a residual check, then requests a memory access from this address. The memory interface unit (MIU) 74 receives this address, checks the residue to verify the internal transfer, generates the appropriate control word and sends this request from the input/output module 10 to the memory control. The fetched data is sent back to the translator work register passing through all the checks described earlier.

Again, the data is examined by the translator 72, appropriate fields are added to the base address, residues checked, and additional control data fetched from main memory 30 until the translator 72 has sufficient data to generate a request descriptor (RD) to be sent to a data service subsection of an IOM 10. The original parity from main memory 30 is accessed to build the request descriptor. Therefore, the confidence and validity of the descriptor about to be initiated is consistent with that when the job was requested by the central processor module 20 under its final combined checks. The request descriptor for example, a load from disc file, is sent to the appropriate DFI subsection. Upon receiving this descriptor in its request register, the DFI 82 checks residue on the memory address and byte count fields, and the validity of the control field combination. Passing these checks, the descriptor is stored in the related local memory channel location and the disc controller is initiated by transmission of the CDL sequence. On each subsequent request from the disc file to transfer data to the input/output module 10, this descriptor is fetched from local memory and stored in the request register, residue is checked on memory address and byte count fields, control information is verified conditionally and by parity, and the data buffer is checked for parity. If these tests are passed, the data is acceptable to the buffer. The byte count field, control information, and the data buffer are all up-dated. Residues and parity bits are modified and the request descriptor is stored in local memory. At the next data request, the descriptor is retrieved and passed through the same check cycle.

When sufficient requests have been received to fill the data buffer, the DFI 82 sends a memory store request to the MIU 74, at the memory address location. The MIU 74 receives the address, checks the residue to verify the internal transfer bus, and sends the proper control word to the memory controller 72. The data is moved from the buffer to the MIU 74, with a parity check to verify the internal data bus transfer, and sent to memory with parity. This sequence of request initiation and data service handling is continuously in process on each channel. An error at any point in the flow causes a halt to that operation, with the specific result descriptor generated to pinpoint the fault. In summary, error detection is present for every operation that moves a character of data in or out of the system. Particular emphasis is placed on insuring the validity of main memory 30, especially by residue checks on arithmetic operations on memory addresses and by memory access checking in the memory control, so that fail-soft concepts commence from a confident base.

In the preferred embodiment, input/output errors detected by an input/output module 10 and the peripheral controllers 38 are processed by the IOM 10. These errors are sorted by the IOM 10 into two categories: (1) channel or request related faults, and (2) module or non-request related faults. All faults are stored as error reports in the status queue (SQ), located in level-1 memory. Request faults are stored in the result descriptor (RD) format and module faults are stored in the fail register format. Interrupts are generated for all fail register entries, but only for result descriptor entries as requested in the request input/output control word (IOCW) or bit 40 of the status queue header (SQH). The status report entries are the basis for the diagnostic actions of the fail-soft software, which will be described later.

The fail-register of the input/output module is used to provide the translator 72 with the capability of reporting errors that cannot be associated with a specific I/O request. The method of reporting the fail register information is through the use of a "Fail Unit" Designate Number (Fail UD No. =255). When an error occurs that requires the use of the "Fail UD," the fail register contents are placed in the result descriptor (RD) word of the I/O control block (IOCB) pointed to by the I/O queue head of the Fail Unit Designate. The fail IOCB is then delinked from the queue of fail IOCB's (the fail IOCB's may be blank except for the linked address) and linked to the status queue (SQ) in the same manner as in normal termination. An error interrupt is sent to the processor on all errors that require the use of the fail register, see FIG. 43. The register is further defined in Table 8. Note that the IOM fail register is a 48-bit register which includes information regarding errors which cannot be associated with a particular channel or device. It is this type of error which will cause an IOM error interrupt.

Allowing that a fault can, and has, occurred and that consequently it shall be detected immediately and reported, it is now most important that another transmission path exist within the subsystem. Redundancy exists at the module level with multiple memories, memory controllers, CP's and IOM's. At the IOM level, connectivity redundancy is present on all bus interfaces, see FIG. 28. The redundancy shown can be modified by reconfiguration. The modularity of the input/output module 10 can be seen to be a factor in the enhanced redundancy.

TABLE 8

| Bit | I/O FAIL REGISTER BITS Function | |
|---|---|---|
| 00 - EXC: | Exception Bit — This bit indicates that a "1" exists in the Fail Register. | |
| 01 - Not Used. | | |
| 02 - SNM: | Scan Mode | |
| 03 - RWM: | Ring Walk Mode | |
| 04 - TM: | Terminate Mode | Indicates the translator mode of operation when error occurred. |
| 05 - SM: | Start Mode | |
| 06 - HM: | Home Address Mode | |
| 07 - SNE: | When set bits 9–14 represent scan errors. | |
| 08 - TLK: | Table locked — Translator timed-out trying to fetch a locked unit table or status queue header. | |
| 09 - SBE: | Scan Bus Error — Indicates a parity error on the Scan Bus. SNE (Bit 07) will also be set. | |
| 10 - TOE: | Time Out Error — When SNE (bit 07) is set, TOE represents a Scan Bus Time Out Error. When SNE is reset. TOE represents a Data Service Time Out Error. | |
| 11 (if SNE=0) - IBE | Initiate Busy Channel error. An attempt was made to start a non-exchange channel that was either busy or in the process of being terminated. | |
| 11 (if SNE=1) - DAE | Disk Address Error | |
| 12 (if SNE=0) - HAE: | Home Address Illegal Command | |
| 12 (if SNE=1) - QSE: | DFO Stack Parity Error | |
| 13 (if SNE=0) - BE: | Buffer Register Parity Error. | |
| 13 (if SNE=1) - SUNA: | Storage Unit Not Available. | |
| 14 (if SNE=0) - RSE: | Residue Error (Memory Address) the address in error shall be inserted into bits 28–47. | |
| 14 (if SNE=1) - NAQE: | No Access to DFO Exchange. | |
| 15 - ACE: | Active Channel Stack Error. The address (channel no.) of the word in the stack that caused the parity error shall be placed into bit 28–32. | |
| 16 - ME: | Memory Error — The memory error or MIU detected error is found by decoding bits 25, 26, 27 of the Fail Register. | |

TABLE 8-Continued

I/O FAIL REGISTER BITS

| Bit | Function |
|---|---|
| Bits 17-24 - Unit Designate: | A Unit Designate of all one's (255) signifies a Fail Register Result Descriptor. |
| Bits 25-27 - Memory Error Code | This field is valid only when bit 16 (ME) is set. (See section 6.0.) |
| Bits 28-32 - Channel No. | This field contains a channel number only when bit 15 (ACE) is set. |
| Bits 28-47 - Memory Address | This field contains the location in memory that was last accessed at the time of the error. This field is not valid if bit 15 (ACE) is set. |

MEMORY SUBSYSTEM

Turning now to the memory subsystem of the preferred embodiment of the instant invention. The memory subsystem 88 provides the main storage for the information processing system. The memory subsystem 88 stores or supplies words of information as directed by either of two types of requestors, namely the central processor module 20 or an input/output processor 10. In the preferred embodiment, the memory subsystem 88 is a modular configuration of one to eight memory modules 30a coupled through a memory requestor switch/interlock network 90 to a maximum of eight memory requestors, see FIG. 29. The memory subsystem 88 can service each requestor in the same manner so that any operation performed for one requestor may also be performed for any other requestor.

A memory module 30a is comprised of a memory control module (MCM) 92 cabinet which controls either one or two memory storage cabinets (MCS) 94. The memory control module 92 controlling one memory storage cabinet 94 is identified as a 2-MSU memory module 93. The memory control module 92 controlling the 2-MSU's 94 is identified as a 4-MSU memory module 95. Each memory storage cabinet (MSC) 94 includes two independently addressable two-wire core memory storage units (MSU) 96. In the preferred embodiment, each MSU 96, comprises a memory storage module (MSM) 98 with a storage capacity of 65,536 words (393, 216 bytes); a memory logic module (MLM) 100 for interfacing the TTL circuits of the MSU 96 with the circuits of the MSU 96 with the CTL circuits in the MCM 92; and an independent memory power supply unit module (MPU) 102 for each memory storage unit (MSU) 96.

In the preferred embodiment, the maximum memory size is 1,048,576 words (6,291,456 bytes) which may be packaged as eight 2-MSU modules 93 and four 4-MSU modules 95, which equals 1,048,576 words. A complete fail soft system requires a minimum of three memory modules 30a.

There are three memory module configurations recognized in the memory subsystem 88. These three configurations are (a) one memory control module (MCM) 92 and four memory storage units (MSU) 96, (b) one memory control module MCM 92 and two memory storage units MSU 96, (c) two memory control module (MCM) 92 and two memory storage units (MSU) 96, or (d) in case of a failure, one memory control module (MCM) 92 and one memory storage unit (MSU) 96.

The memory subsystem 88 is designed with high reliability to minimize the appearance of failure. Extensive error detection and reporting logic permits early capture of failures. Automatic correction of single-bit parity errors minimize interruptions to the system. The modular design, separate power supplies, and redundant bussing concepts permits soft reconfiguration. In case of the failure of a memory storage unit (MSU) 96, the system programmatically reconfigures the MSU's available to the memory control module (MCM) 92 in the following manner. The 4-MSU memory module 95 will be reconfigured to operate with only two MSU's 96 available to the MCM 92 as the cabinet containing the failed MSU 96 becomes unavailable to MCM 92, or a 2-MSU memory module 93 will be reconfigured to operate with only MSU 96 available to the MCM 92. Privileged modes of operation allow the software to control the system during error recovery. The programmatic halt load reinstates multi-level operating system without operator intervention. User programs not affected by the failure are restarted at the point of interruption using the available resources. System degradation is minimized by soft reconfiguration, rapid fault isolation repair, and verification.

In the preferred embodiment, there is no specific assignment order within the system for particular configurations of a memory control module (MCM) 92. Memory module address range assignments are based on system requirements and are assigned through the use of the memory limits word. For example, module zero (0) may be an MCM with two MSU's 96; module one (1) may be an MCM with four MSU's 96, etc.

With regard to subsystem allocation, the memory capacity may be programmatically allocated into subsystems by the multi-level operating system of the instant invention with respect to designated requestors, e.g., MCM's 0, 1, 2, 3 may be dedicated to requestors 0, 1, 2,, while MCM's 4, 5, and 6 may be dedicated to requestors 3, 4, and 5.

In the preferred embodiment, the memory subsystem 88 operates at a clock rate of 8 megaHertz. Access time is 1.0 micro seconds. The system read access time for the first word is 1.750 micro seconds. Effective system read access time for two or more consecutive words is reduced by interlacing alternate MSU's 96 and a memory module 30a. This allows the second MSU 96 to begin preparing for a memory cycle while the first MSU 96 is completing transfer of its word. Thus, memory cycle overhead time due to the second, third, or fourth word is masked.

In a multi-word transfer (known as phasing) words are transferred in bursts up to four; one word is transferred at each clock cycle. The maximum number of words which may be phased is set by the number of words that may be transmitted consecutively and is limited to the number (N) of MSU's 96 being controlled by the MCM 92; N = two for a 2-MSU module 93 and N= four for a 4-MSU module 95. If the requestors word length exceeds the limit for a particular MSM 92, the MSM 92 will request only the number of words from the requestor allowable from its limit (in the case of storing information), or send only the number of words to the requestor allowable from its limit (fetching data). The limit in the MCM 92 is established in the following manner. The limit is equal to single-word operation whenever the starting address for the requestor is within seven words from the end of the memory available to the MCM 92, secondly, whenever the starting address is greater than seven words from the end of the memory available to the MCM 92, the limit is equal to the number of MSU's 96 available to the MCM 92. However, the limit of the MCM 2 does not have to be taken into consideration when generating a control word. For example, if a requestor desires a six-word operation, a control word with a word length field equal to six is generated.

The actual number of words transferred will be determined as prescribed previously, the requestor must retain a record of the number of transfers remaining in order to determine if additional requests to the memory control module (MCM) 92 are necessary to complete the operation.

In the preferred embodiment, all words used by programs or software (requestor words) are 48 bits in length. Three additional bits, called tag bits, identify the word as to whether it is used for code, data, or control. The tag bits allow hardware protection against incorrect usage of memory and are used by the hardware as the means for controlling many of the processing functions of the system. When information is passed from a requestor to a memory control module (MCM) 92, the requestor adds a parity bit which produces odd parity on the resultant 52-bit word being transferred. The memory control module 92 checks the word it receives for odd parity to verify that an error was not made during transmission.

A word stored in a memory storage unit (MSU) 96 (memory words) consists of sixty-bits. When a memory control module 92 receives a 52-bit word from a requestor, the memory control module 92 adds seven special parity bits called check bits, and adds another bit for maintaining odd parity on the overall 60-bit word. The MCM 92 then sends the 60-bit word to the MSU 96, see FIG. 30. If a word should accidently be altered while residing in an MSU 96, the seven check bits in conjunction with the overall parity bit allow for the detection of the error and provide a means for the automatic correction of errors in which a single bit has been altered.

The signals used to transfer code control words and data between the requestor and the memory control module 92 and the memory storage unit 96 are shown in FIG. 31. Any requestor module can address up to 1,048,576 continuous words of memory. These 1,948,576 words may or may not reside in consecutive memory modules 30*a*. Whether or not a particular requestor module is allowed to access a particular memory module 30*a* depends on the setting of a bit in a requestor inhibit register 104, see FIG. 32. The requestor inhibit register 104 contains eight bits, one bit for each of the eight possible requestors (IOM's and CPM's). Thus, a particular memory module 30*a* can be shared by all requestors, some requestors, or can be the exclusive resource of only one requestor. By setting the requestor inhibit register 104 of the particular groups of memory modules 30*a* to allow access by only selected requestors, it is possible to logically divide the system into several separate processing subsystems, each perhaps with its own master control program and each perhaps dedicated to a specific part of the total processing load. The hardware unit numbers for the requestor modules are 0 through 7. The bit position of the requestor inhibit register 104 corresponds to the requestor unit number, with 0 as the least significant bit. If a requestor bit is ON in the requestor inhibit registor 104, the unit corresponding to the bit is denied access to the memory module 30*a*. The requestor inhibit register 104 is set by a load requestor inhibit register instruction. This instruction may be executed only by the multi-level operating system of the instant invention. The multi-level operating system is therefore able to alter the configuration of the system according to changing requirements.

In the preferred embodiment, the amount of usable memory within a memory module 30*a* may vary from 65,536 words, with only one MSU 96 operational, to 262,144 words with four MSU's operational. Addressing within a memory module 30*a* is controlled by two memory limit registers 106, 108 respectively, which specify the lowest and highest address available. The highest address available is always 16,383 addresses higher than the address indicated in the upper limit register 108. Each memory limit register 106, 108 is six bits in length. The memory control module (MCM) 92 "sees" the memory contained in a memory storage unit (MSU) 96 as a number of 16,384-word segments.

In the preferred embodiment, a memory address consists of twenty bits, the first six of which designate a 16,384-word memory segment within the 1,048,576 words which any one requestor can address. The other fourteen bits are used to address the word within the designated segment. The most significant six bits of a memory address are compared against the six bits of each of the two memory limit registers 106, 108 to determine whether the specific address exists within the MSU's assigned to MCM 92.

In the preferred embodiment, a memory address consists of 20 bits, the first six of which designate a 16,384-word memory segment within the 1,048,576 words which any one requestor can address. The other fourteen bits are used to address the word within the designated-segment. The most significant six bits of a memory address are compared against the six bits of each of the two memory limit registers 106, 108 to determine whether the specific address exists within the MSU's assigned to MCM 92.

The memory limit registers 106, 108 are set by a load memory limits instruction. This instruction may be executed only by the multi-level operating system of the instant invention. The multi-level operating system determines the amount of memory assigned to an MCM 92 during system initialization by accessing memory within successively higher 16,384-word segments. If an MSU 96 or an MCM 92 fails, the multi-level operating system is informed of the failure. The multi-level operating system can change the memory limit registers 106, 108 to avoid using a faulty MSU 96, or can set the requestor inhibit register 104 to avoid accessing the memory module 30*a* altogether.

By setting register inhibit registers 104 and memory limit registers 106, 108 groups of memory modules 30*a* can be masked to form separate memory systems, some perhaps with the same span of addresses. In this way, critical data or program code can be duplicated to provide additional protection against system failures. The following paragraphs will be directed towards a general description of the memory control module (MCM) 92. The MCM 92 links all requestors, e.g., input/output modules (IOM) 10 and central processor modules (CPM) 20, with the MSU's 96 which the MCM 92 controls. As previously discussed, the maximum number of MCM's per system is eight. The logic functions of the MCM 92 are: priority resolution, data transfer and control, and error detection.

Priority-resolution logic, see FIG. 32, controls communications between each requestor and the MCM 92. Only those requestors selected by the state of the requestor-inhibit register 104 are allowed to be serviced by the MCM 92. The exception to this rule is that through the use of the special-request signal, CPM's 20 are able to override the state of the requestor inhibit register 104. The order of servicing these requestors (priority) is determined for maximum efficiency of the information processing system. Higher user priorities (i.e., higher numbers) are assigned to central processor modules 20. For example, in a system with two CPM's and two IOM's, the CPM's would be assigned priority six and seven and IOM's would be assigned priority zero and one. A requestor is eliminated from servicing if the requestors interface has failed so that other requestors are locked out. The highest priority requestor is prevented from obtaining consecutive services if a lower priority requestor is waiting to be serviced.

The data transfer and control logic provides the sequential control signals required to route the data between the requestor and the MSU 96. This logic provides the capability of time-phasing words between the requestor and the memory at the clock rate. Error detection logic 110 is provided to detect errors in requestor and the inputs to the MSU 96; reports errors in a fail register 112 of the memory control module (MCM) 92 and notifies the requestor that the error occurred; and corrects one-bit errors that occur in the memory storage unit (MSU) 96 during a fetch operation.

With regard to communications of MCM 92, all communications between the MCM 92 and the requestors are applied through 78 separate bidirectional lines to identical switching interlock receiver/driver circuits 114 located in each requestor module, see FIG. 31. A set of 52 lines is provided for both the control word and a data word. During operation, the control word always precedes the data word, and consequently, both words are never on the line at the same time. When a a requestor desires access to an MCM 92, a request signal is sent to the MCM 92. The priority resolver circuits 116 determine if the MCM 92 is busy with another requestor or if that the requestor is inhibited from accessing this particular MCM 92. If access is permitted, a request strobe in coincidence with a control word is sent to the MCM 92 to initiate the timing and to instruct the MCM 92 of either a read, write or a read memory write operation is to be performed. The control word is stored in both the control word register 118 and an input register 120 of the memory control module 92. General controls 122 of the memory control module 92 generate gating and timing pulses to transfer the control word from the input register 120 to the error detection circuits 110 to check for correct parity.

If a parity error is detected, the control word is transferred to the fail register 112, and a requestor operation-complete signal and a fail-interrupt signal are generated by the MCM 92, and sent to the requestor. Also, if instructed by the requestor, the contents of the fail register 112 are transferred to the requestor via a memory buffer register 124 and an output register 126 of the memory control module (MCM) 92. The parity bit for the fail word is generated in the error correction and detection circuits 110 and applied to the fail word in the output register 126.

Assuming the control word contained no errors and is not in a special request, the following events occur in the control and logic circuits of the memory control module (MCM) 92. In the general control circuits 122, the necessary control pulses for the operation to be performed are generated. Controls for writing into and reading from the MSU 96 are generated in a MSU control 128. The MSU control also determines which MSU's are to be used as well as identify the operation to be performed by the MSU 96 (either read or write, or read-modify write). A parity bit for the two-bit MSU operation plus the 16-bit address from the original control word before transfer to the MSU 96 is produced by a parity generator 130 of the memory control unit (MCM) 92. If the control word contained a write operation, the next input into the MCM 92 is the data word (or group of data words as determined by the word length of the control word) from the requestor. The data word is placed in the input register 120 which is a source of information for the error detection circuits 110. The error detection circuits 110 check incoming parity the 52-bit word as received from the requestor and then generates seven check bits and overall parity for the entire 60-bit word. The 52-bit data word is transferred to the memory buffer register (MBR) 124 with the seven check bits and the overall parity bit are added to the data word. The 60-bit data word is then sent to the MSU 96 for storage. This cycle is repeated for each data word written into memory.

If the control word contains a read operation, the 60-bit data word (or group of data words as determined by the word length in the control word) read from the address location or locations in the MSU 96 is temporarily stored in the memory buffer register (MBR) 124. The data word is transferred to the error detection and correction circuits 110 for comparison with the word as previously stored in the address location. The error-detection correction circuits 110 checks for errors as the least significant 52-bits of the data word are transferred to the register. If one of the bits was incorrect the specific bit is corrected by complementing it in the output register. The correct data word is sent to the register together with a fail-2-interrupt signal (which will be described later) which allows the requestor to record the error and also to continue processing with the correct data. If a 2-bit error occurs, the MCM 92 sends a fail-1-interrupt signal (which will also be described later) to the requestor and loads the MCM fail register 112 with the fail data.

If the control word is a special-request type (i.e., either "load request inhibit register" or "load memory limits register"), the general control circuits 122 of the MCM 92 prepare for the transfer of the next data word directly from the input register 120 (after parity check) to either the requestor-inhibit register 104 or to the memory-limits register 106, 108 and an MSU-available register located in the MSU controls 128. If the control word contains a "load requestor inhibit register" operation, the requestor inhibit register 104 is loaded with new data to indicate which requestors now have access to the MCM 92. If the control word contains a "load memory limits register" operation, the MCM and MSU configuration is changed to reflect the number of MSU's available to the MCM 92 as well as the upper and lower limits.

The function details of the MCM 92 are briefly presented in the following paragraphs and will make reference to the detailed block diagrams shown in FIG. 33. A requestor interface 132 includes the receiver/driver interlock logic 114 which is used for all communications between the MCM 92 and all requestors. The signals for control and data which flow between these modules are shown in FIG. 3. Each requestor being serviced by an MCM 92 includes these signals and data lines. The 52 information lines are used to translate control signals between the modules. Each of the 78 driver/receiver lines is a bidirectional driver/receiver but only 52 of these lines actually use this capability. In the preferred embodiment, the driver/receiver circuits are identical in all requestors and MCM's so that the receiver/driver circuit boards are interchangeable among the various modules. The receiver/driver logic for each of the 26 control lines is identical with data lines; however, the signals to enable the buffers are always present whenever power is up in the requestor and MCM 92.

The control and data flow between the MCM 92 and the requestor illustrated in FIG. 34 is described in the following paragraphs.

Data and parity are transferred between a requestor and an MCM 92 via a unique set of 52-bidirectional data lines 134. These lines 134 are also used for the transmission of the control word. Odd parity is generated and all words transferred and the parity bit is transmitted in coincidence with the data.

A special-request signal (RQSN) is used by a CPM 20 to gain access to a memory control module 92 (regardless of the state of the requestor-inhibit register 104) in order to load requestor inhibit(s) or memory limits. The RQSN signal goes "true" in coincidence with a request signal (REQ) and remains "true" until the receipt of an acknowledge signal (ACK) over an acknowledge line 136 from the MCM 92. The RQSN signal is transmitted from the requestor to the MCM 92 over a special request line 138 while the request signal (REQ) is transmitted from the requestor to the MCM 92 over a request line 140.

A request signal (REQ) is sent by a requestor to select a specific MCM 92. The REQ signal goes "true" one clock period prior to a request strobe (RSTB) and remains "true" until the receipt of an acknowledge signal (ACK) from the MCM over the acknowledge line 136. The request strobe signal is transmitted from the requestor to the MCM 92 over a request strobe line 142.

A data-strobe signal (DSTB) is sent via a data strobe line 146 to inform the MCM 92 that data is to be transmitted over the data lines. The data strobe signal precedes the data word by one clock and its width indicates the number of data words following it.

A request-strobe signal (RSTB) is sent over the request strobe line 142 to inform the MCM 92 that a control word is being transferred over the data lines 134. It is "true" initially one clock period following the start of the request signal (REQ). The control word is transmitted in coincidence with the request strobe signal.

A data-available signal (DAV) is transmitted via a data available line 148 to the requestor from the MCM 92 to indicate that data is available and may be transmitted in the following clock period. This signal goes "true" no earlier than one clock period before the data transfer and remains "true" no longer than the requestor-operation-complete (ROC) time. An acknowledge signal (ACK) of one clock period duration is sent to the requestor over the acknowledge line 136 to signify that the MCM 92 has accepted the control word. This signal indicates to the requestor that he must terminate the transmission of the request signal (REQ) and the request strobe signal (RSTB). It does not necessarily mean that the requested memory operation will be performed.

A send-data (SND) signal is sent to the requestor during a N-length override and may be sent during an N-word protected write. The send-data signal indicates the number of data words that must be transmitted to the MCM 92. The number of words to be transmitted is equal to the number of clock periods the send-data signal is "true." It should be noted, that the send-data signal will not be transmitted if an attempt is made to write into a protected area during an N-word write operation. Also, the number of data words requested by the memory control module (MCM) 92 must be transferred before a requestor ends his operation.

A data present signal (DAPB) is sent via a data present line 152 to the requestor to indicate that a valid word (or words) is being transmitted from the MCM 92. The DAPB is transmitted in coincidence with the data word. A word is transmitted each clock period that the DAPB is "true." The number of consecutive words being transmitted determines the width of the DAPB signal.

The MCM 92 sends via a request operation complete line 154 a one-clock-period signal (ROQC) to signify the end of the requestors part of the memory operation.

The address upper limit communication in between an MCM 92 and a requestor is the most significant six bits of the highest 20-bit memory access available to the MCM 92 (the least significant fourteen bits are assumed to be "one's"). The address lower limit communication is the most significant six bits of the lowest 20-bit memory address available to the MCM 92 (the least significant 14 bits are assumed to be "one's"). The six bits of the address upper limit are sent by the MCM 92 via transmission lines 156 to the requestor while the six bits for the address lower limit are transmitted by the MCM 92 via transmission lines 158 to the requestor.

The MCM 92 sends a signal to the requestor via a requestor enable line 160 and enable signal which is used to enable or disable communications between the MCM 92 and the appropriate requestor. This signal is a steady-state signal which will disable communications whenever the MCM 92 is power cycling up or down or whenever the appropriate requestor inhibit flip-flop is set. The requestor sends the MCM 92 an enable signal via a MCM enable line 162 which is used to enable or disable communications between the requestor and the MCM 92. This signal is also a steady-state signal which disables communications whenever the requestor is power cycling up or down.

The MCM 92 transmits a one-clock period FAIL-1 interrupt signal (FAL1) to the requestor if any of the following errors occur: (1) control word parity; (2) illegal operation code; (3) wrong MCM; (4) data strobe error; (5) 2-bit error; and (6) internal error. The MCM fail register 112 will then be loaded with information to facilitate error analysis. The MCM transmits a FAIL-1 interrupt to the requestor via a communications line 164.

The MCM 92 transmits a one-clock period FAIL-2 interrupt (FAL2) via a communications line 166 to the requestor if a 1-bit error occurs. The MCM fail register 112 will then be loaded with information to facilitate error analysis.

A 1-clock-period software error interrupt signal (FALS) is transmitted to the requestor via a communication line 168 from the MCM 92 during a single-word or N-word protected write operation if the memory word being examined contains a "one" in bit 48. The FAIL-1 and FAIL-2 interrupt signals never occur later in time than a requestor-operation-complete signal (RQOS) which is transmitted from the MCM 92 via the communication line 154 to the appropriate requestor.

Returning to the functional description of the MCM 92, the function of the priority resolver 116 in the MCM 92 is to select the requesting channel to be serviced by the MCM 92. The order of servicing requestors (i.e., priority) is designed for maximum efficiency in the preferred embodiment. Priority selection is based upon the lowest number requestor channel having the highest priority during simultaneous requests from a number of requestors. Priorities are hardwired so that in a system with two central processor modules 20 and two input/output modules 10, the input/output modules 10 would be assigned priorities zero and one, and the central processor modules 20 would be assigned priorites six and seven. The priority resolver 116 guarantees that a single high-priority requestor will not access main memory 30 with consecutive memory requests if a lower priority requestor has requested the memory. The priority resolver 116 or the MCM 92 will enable/disable communications with the respective requestors as directed by the requestor inhibits except for central processor modules 20 using special requests. The special request by-passes the inhibit register check to provide either a load the requestor inhibit register 104 operation, load the memory limit register 106, 108 operation, or fetch the contents of the fail register 112 operation. The priority resolver 116 of the MCM 92 will eliminate those requestors from being serviced that have failed and could lock out other requestors.

In the preferred embodiment, the input register 120 of the MCM 92 is a 52-bit register that is used by the MCM 92 to temporarily buffer both the control words and data words received from the requestor. It is a source of data for the memory buffer register (MBR) 124, which will be described in detail later, for checking the parity of a data word, and for the generation of the check-bits. During the initiation of an operation, a copy of the control word is loaded into the input register 120 for parity checking. The input from the requestor (either data word or control word) is transferred to the input register 120 via a receiver- to-input register (IR) transfer signal (which is generated in the MCM 92) and a load-the-IR enabling signal (which is generated in the MCM 92 for loading the data word(s) and control word into the input register 120).

Depending on the transfer signals present at the output of the input register 120, the IR bits are transferred to the memory buffer register (MBR) 124, the check bit generator 130 and parity check circuits, the memory limit register 106, 108, and the requestor inhibit register 104. If the information in the input register 120 is either a control word, memory limits register data, or a requestor inhibit register data, only a parity check is performed by the checker-generator circuits. If the information in the input register 120 is a data word to be stored, the checker-generator circuit performs a parity check and then also generates the eight check bits to make up the 60-bit data word for storage.

If the information in the input register 120 is memory limit to register data, only the first 16 bits (bits 0 through 15) are transferred via an IR-to-memory-limits transfer signal. Bits 0 through 11 are transferred to the memory limit register (bits 4 through 9 as the upper limit of memory addresses, bits 10 through 15 as the lower limit of memory addresses, and bits 0 through 3 to the memories available register which is formed as part of the MSU controls 128 and shown as 1AV through 4AV). This data establishes the memory limits (within the total memory) that is available for use by a particular requestor.

If the information in the IR is requestor inhibit register data, only the first eight bits (bits 0 through 7) of the input register are transferred via an IR-to-requestor inhibit transfer signal to establish which of the requestors is allowed to access a particular MCM 92. On the other hand, if the information in the input register 120 is a 52-bit data word to be written into memory, the data is transferred to the memory buffer register 124 during a write instruction and the data is sent simultaneously to the checker-generator circuits 130 for parity check and check bit generation.

For an N-word protected-write operation an output is also sent to the control word register 118 during local testing via control switch provided on the panel of an MCM 92. After all the locations have been checked for a protected bit (bit 48 set), the original control word located in the input register 120 is transferred to the control word register 118 to start write operation. This is necessary since the control word initially in the control word register 118, was incremented during the check for the presence of a protected bit.

The control word register 118 is a 52-bit register in the MCM 92 which is used to store the control word transmitted by the requestor. The control word is transmitted from the requestor, one clock cycle after the transmission of the request signal, and is coincident with the request strobe.

The requestor-inhibit register 104 is an 8-bit register that is used by the MCM 92 to hold the presently valid requestor inhibit. The output of this register is examined by the priority-resolution logic 116 to determine which requestor or requestors are to be inhibited from gaining access to the MCM 92. Each output of the requestor inhibit register 104 is handwired to one requestor so that, if his inhibit flip-flop is reset, the requestor who receives the enabling-level-present signal is allowed access to the MCM 92. The outputs of this register are also transmitted to the requestors to enable/disable communications with them. A very important consideration is that this register is loaded programmatically by any central processor 20. The requestor inhibit register 104 is set by inputs from a requestor via the input register 120 or by inputs from the MCM 92 control panel or from the operator's console. The memory address limits register is a 16-bit register comprising 6 bits to indicate the lower address limit, 6 bits to indicate the upper address limit, and 4 bits to indicate the MSU availability. The lower address limit is the most significant 6 bit of the lowest 20-bit memory address available to this MCM (the least significant 14 bits are assumed to be "0's." The upper address limit is the most significant 6 bits of th highest 20-bit memory address available to this MCM (the least significant 14 bits are assumed to be "1's". 4 bits to indicate MSU availability.

The address upper and lower limits define the addressing capability of this MCM within the total memory system 30. The MSU availability defines the MSU's available to this MCM which determines the maximum number of words of an N-length operation. These limits may be either programmatically loaded or loaded via the MCM control panel and operator's console switches. The memory limits register data is established during initialization and is not changed unless reconfiguration of memory is necessary.

The 12-bits of lower and upper limits are cabled to all requestor's memory interface comprators. This information enables the requestor to relate the proper address with the proper MCM channel. The outputs of the 12 address bits (lower and upper limits) are compared with the six-most-significant bits of the requestor control-word address. If the control-word address is not within the lower and upper limits, a wrong address signal is sent to the fail word register which in turn sends a FAIL 1 interrupt to the requestor. The outputs of the 6-bit lower limit and the 6-bit upper limit are hardwired to each requestor for comparison with pre-established memory limits for each requestor. If the requestor's memory operation address is within an MCM limit, the requestor initiates the request signal to access that MCM if the associated requestor inhibit register bit is not set.

The output bits (1AV through 4AV) are transferred to the memory controls to establish which MSU's are available to this MCM. As with all flip-flops, in the instant invention, the maintenance diagnostic unit (MDU) and MCM panel have the capability of controlling and sensing the memory limit registers 106, 108.

The memory buffer register (MBR) 124 is a 60-bit register that is used by the MCM as a temporary buffer register for data words transferred to or from MSU's. The input sources the the MBR 124 (for data transfers to an MSU) are: (a) the input register 120 for the least significant 52 bits (bits 00 through 51), (b) the error-code check bits (bits 52 through 58), and (c) the overall parity bit (bit 59). The input source to the MBR 124 for data transfers from the MSU's is from the MSU interface receiver-drivers previously discussed. The MBR 124 is the source of data for the error-code checking logic to determine if bit correction is necessary for words transferred from an MSU 96 to the MCM 92.

During a write operation 52 bits (00 through 51) are transferred from the input register 120 to the MBR 124 via an IR-to-MBR transfer signal which is present throughout a write operation. These same 52 bits had been sent to the checker-generator logic 130 for check bit generation (bits 52 through 59) one clock time earlier. These check bits are transferred to the MBR 124 via a generator-to-MBR transfer signal which also is present throughout the write operation. The enabling signal for loading the MBR 124 is present when the write enable flip-flop and the data transfer control flip-fllp signals are set. These 60 bits are then transferred to memory via the receiver-drivers for storage.

During a fetch operation, 60 bits are transferred from memory to the MBR 124 via the receiver/drivers by the transfer signal which is present throughout the fetch cycle. The enable signal is available when the data transfer control flip-flop is set and when the word count is greater than zero. The first 52 bits (00 through 51) are transferred to the output register 126 while the check bits (52 through 59) are transferred to the error check logic 110 to determine if an error exists in the memory data word. If the check bits indicate no errors, the data word in the output register 126 is sent to the requestor, however, if a one-bit error is found, the error check logic generates a correction signal to complement the erroneous bit in the word before the word is transferred from the output register 126 to the requestor.

During a fetch the fail-register operation, the fail register information, except bit 51, is transferred to the MBR 124 before being placed in the output register 126.

The error controls, detection, and correction logic 110 use three failure interrupt signals: FAIL 1, FAIL 2, and FAIL S. The FAIL 1 interrupt or FAL1 signal is generated and sent to the requestor when an irrecoverable error has occurred even though the requestor memory operation may not be completed. The fail register 112 is loaded with the following information to facilitate failure analysis: (a) R/W Bit, (b) MSU availability, (c) MCM number, (d) Requestor channel Number, (e) Error type, and (f) Error address. Requestor operations will always be completed when the following errors are detected: (a) Two-bit error (fetch only), (b) Checker/generator Error, (c) Address failure, and (d) Data word parity error. Requestor operations will never be completed when the following errors are detected: (a) Control word parity error, (b) Illegal operation, (c) Wrong address, (d) MSU parity error, (e) Read available failure, (f) Two-bit error (protected write), (g) Data strobe error, and (h) MSU unavailable. Requestor operations may or may not be completed when the following errors are detected within the MCM: (a) Parity generator (MSU control) failure, (b) Data timer failure, (c) Data transfer control failure, and (d) MSU availability error. Note, the FAIL 1 interrupt signal (FAL1) is transmitted to the next requestor for any internal error detected during or after requestor-operation complete time. A checker/generator error is an exception in that the FAIL 1 signal is sent to the original requestor. Within the fail register 112 the R/W bit and requestor channel number belong to the first requestor, and bit 48 of the fail register 118 is set to indicate that this was a delayed-interrupt situation.

The FAIL 2 interrupt signal (FAL2) is generated if a one-bit error has occurred. When a FAIL 2 signal is sent to the requestor the following information is loaded into the fail register 118.

In the preferred embodiment the fail register 118 is a 52-bit (51 -00) register used to store all pertinent information necessary to identify and define a failure. The fail information remains in the fail register 118 until a fetch-the-fail-register operation request is made by the requestor or a clear operation is performed.

During a fetch-the-fail-register operation the information is returned to the requestor through the memory buffer register (MBR) 124 and output register 126. Word parity for the fail word is generated in the parity generation logic 130 and added to the fail word in the output register 126 before transfer to the requestor. The format, bits, and fields of the MCM fail word are defined in Table 9.

In the preferred embodiment, the MCM 92 uses the memory buffer register (MBR) 124 as the source of data for the error-code checking logic which determines if bit correction is necessary for words transferred from an MSU 96 to the MCM 92. The MBR 124 and logic cards are located in the MCM. The functional logic of error detection and correction is illustrated in FIG. 35 and briefly described in the following paragraphs.

TABLE 9

| Field | Bits | Description |
|---|---|---|
| TAG | 50:3 | If the delayed-interrupt bit (bit 48) is set it indicates that the MCM has detected an internal error during or after the requestor-operation complete (ROC) flip-flop has been set. The interrupt signal is saved until the next requestor's operation for delayed interrupt reporting. |
| R/W | 47:1 | The R/W bit indicates when the error is detected whether the operation being executed was a read operation or a write operation. |
| MSU AV | 46:2 | The MSU AV field indicates which MSU(s) is available to this MCM. The field interpretation is: |

| Bit 46 | Bit 45 | |
|---|---|---|
| 0 | 0 | No MSU is available |
| 0 | 1 | One MSU is available |
| 1 | 0 | Two MSU's are available |
| 1 | 1 | Four MSU's are available |

| Field | Bits | Description |
|---|---|---|
| MCM NO. | 44:4 | The MCM number is a preassigned number (from 0 thru 15) that is placed in the MCM-number field of the fail word to identify the specific MCM with the error condition. |
| REQ CHNL No. | 40:3 | The requestor-channel-number field contains the number of the requestor who was communicating with the MCM when the fail register was loaded (except when a one-bit error detection and correction occurs, in which case, the field contains the number of the requestor who is fetching the fail register). |
| 1B | 5:1 | A 1-bit (1B) error indicates that a single bit was found in error during error checking of a data word as it was read out of memory. |
| INT | 4:1 | The internal-error (INT) bit indicates that a logic failure occurred within the MCM or MSU. Bits 0 thru 3 in the fail word register must be examined to determine the type of error. |
| INT ER TYPE | 3:4 | If the internal-error bit is a "1", these bits will contain a code indicating the nature of the failure. The codes listed define the errors. |

| Fail Word Register Bits 3 | 2 | 1 | 0 | Indicated Error Type |
|---|---|---|---|---|
| 0 | 0 | 0 | 0 | MSU Unavailable |
| 0 | 0 | 0 | 1 | Read Available Error |
| 0 | 0 | 1 | 0 | Checker/Generator Error |
| 0 | 0 | 1 | 1 | Address Counter Failure |
| 0 | 1 | 0 | 0 | MSU Address Error |
| 0 | 1 | 0 | 1 | Parity Generator (MSU Control) Failure |
| 0 | 1 | 1 | 0 | Data Timer Failure |
| 0 | 1 | 1 | 1 | Data Transfer Control (DTC) Failure |
| 1 | 0 | 0 | 0 | MSU Availability Error |

| Field | Bits | Description |
|---|---|---|
| ER BIT NO. | 37:6 | If a one-bit error occurs, the binary number of the bit that failed is placed in the error-bit-number field. |
| ER ADDRS | 31:20 | The error-address field contains the address of the location that was being accessed if a one-bit or two-bit error occurred. The address is related to one-bit errors as follows: |

| Error Indication 2-Bit | 1-Bit | Error Address Belongs to: |
|---|---|---|
| 0 | 1 | 1-Bit Error |
| 1 | 0 | 2-Bit Error |
| 1 | 1 | 1-Bit Error |

| Field | Bits | Description |
|---|---|---|
| CWP | 11:1 | When the CWP bit is a "1", incorrect control-word parity is indicated. |
| IOP | 10:1 | When the IOP bit is a "1", the operation specified by the control word that caused the error was an illegal-operation code. (Refer to Table V-2-2) or one of the following errors is indicated: |

TABLE 9-Continued

| Field | Bits | Description |
|---|---|---|
| | | (1) Word length = 0<br>(2) For single-word operations word length ≠ 1<br>(3) For requestor-inhibit load or memory-limits load the special-request strobe is absent. |
| WRA | 9:1 | When WRA (wrong address) bit is set, it indicates that the six most-significant bits of the address in the control word did not fall within the address limits assigned to this MCM. |
| DWP | 8:1 | A data-word parity (DWP) error indicates a data word containing even parity was received from the requestor during a write operation. |
| STB | 7:1 | A data-strobe (STB) error indicates that either too many or too few data strobes were received by the MCM during an N-length overwrite or an N-length protected-write operation. |
| 2B | 6:1 | A 2-bit (2B) error indicates that two bits were found in error during error checking of a data word as it was read out of memory. |

The horizontal row of numbers shown in FIG. 35 indicates the bit positions within the 60-bit stack word. The format of a word transferred between an MCM 92 and a requestor is: bit 00 through bit 47 are data bits (providing for six EBCDIC characters, or eight BCL characters, or 12 digits, etc.), bits 48 through 50 are tag bits (for word control), and bit 51 is a parity bit (odd parity is correct parity) for bits 00 through 51. Bits 52 through 59 are not transmitted from an MCM to a requestor. Bits 52 through 58 are called check bits and bit 59 is an overall parity bit (the correct parity is odd parity) for the 60-bit stack word.

Each horizontal row of X's represents a mask used in generating the check bits. The bit positions which are used in generating a check bit for a particular mask are indicated by the X's. Altogether, there are seven different masks. Using each of the seven masks, the bit indicated by the X in the check-bit field is set or reset so as to generate even parity, for that set of bits. For example, using the group 1 mask if bit 01 was set and bit 02 through bit 51 and bit 00 were reset, then bit 1 in the check-bit field would be set to give even parity for the bits considered.

It should also be pointed out that the overall-parity bit (bit 59) is set or reset to give odd parity for all bits in the 60-bit word, including the check bits. As each word is retrieved from the MSU 96, the MCM 92 checks the overall-word parity and again applies the seven masks to determine if one or more bits have been altered. The MCM detects two basic types of errors.

The first type is one-bit errors. In the preferred embodiment, a single bit error, whether a drop-out or pick-up, is detected and corrected. One-bit errors are detected by an indication of bad overall parity and the presence of one or more group errors. The bit with erroneous parity is isolated and corrected in the MCM output register 126. The second type is two bit errors. Two bit errors are detected by an indication of good overall parity and presence of one or more group errors. There is no automatic correction for two parity bit errors.

A single bit error in the 59-bit word is detected by the parity check on the overall word. The check bits generated by again applying the error detection masks give the position of the bit in error. The multi-level operating system would be notified that an error had occured, but the corrected word would be available for use. The multi-level operating system would log the error for maintenance purposes and allow processing to continue.

If two bits of the 60-bit word are in error, the overall-word parity check will not indicate an error. In this case, the checking operation will indicate the presence of one or more group errors which information cannot locate the position of the error but is used to indicate the existence of an error. More than two bits in error may appear as either a single-bit error which cannot be corrected, or as a two-bit error, or as no error.

In summary, 1-bit errors are detected and corrected 100 percent of the time. Error correction of 1-bit errors requires 3 MCM clock pulses, i.e., 375 nanoseconds. Two-bit errors are detected and multiple even-bit errors may be detected, but neither are corrected. When multiple odd-bit errors are detected, one bit is corrected and the data is transferred to the requestor (a parity check may show that an error still exists).

A failure which indicates both odd and even parity errors while checking or generating the parity of the respective groups is identified as a hardware failure of the check/generator logic itself.

The output register 126 is a 52-bit register used to buffer data words (include fail data) that are being transmitted to a requestor during a fetch operation. The output register 126 also includes the bit-correction logic required to correct one-bit errors detected by the error-correction logic. The basic input for the output register 126 is from the memory buffer register 124 which stores data transferred from memory storage. Bit correction for one-bit errors is accomplished after the output register 126 is loaded from the MBR 124. The output of the output register 126 is transferred to the requestor via the switching interlock driver/receivers.

The MCM-MSU interface 135 contains the receiver and driver line buffers which provide interconnection logic levels for control and data flow as shown in FIG. 36. These controls and data lines are divided among five cables to each stack, four for data and one for controls.

The following is an explanation of the data flow between an MCM 92 and MSU 96 and each of the MCM-MSU control signals.

Sixty data-in line 402 are used to transfer from the MCM 92 to the MSU 96 information that is to be inserted into an addressed memory location. Similarly, 60 data-out lines 404 are used to transfer to the MCM 92 information that was read out of an addressed MSU location. A read available signal is provided by the MSU 96 and is a leading signal that informs the MCM 92 that data from the addressed location in the MSU 96 will be placed on the data lines 404 to the MCM 92 within a predefined length of time. The read available signal is transmitted on line 406.

An MSU parity error signal is provided by the MSU and indicates to the MCM 92 that the MSU 96 detected a parity error in the address or control signals that were sent to the MSU by the MCM. If a parity error exists on these lines, the MSU unconditionally does a read/restore of the addressed location to save the stored data. The MSU parity error signal is transmitted between a MSU 96 and an MCM 92 over a transmission line 408.

An MSU availability signal, when "true," indicates to the MCM 92 that power is up in the MSU 96. This signal is communicated over a line 410. An address parity line 412 is the output of a parity generator that examines the address and operational control (R/W and type of operation) lines going over to the MSU. The overall parity generated is odd. A read/write mode signal is provided by the MCM 92, which when "true," indicates to the MSU 96 that a write operation is to be performed; when "false" the MSU performs a read/restore operation. The read/write mode signal is transmitted over a communication line.

A read/modify/write signal, when used in conjunction with the read/write mode signal, indicates which write variation is to be performed. This signal is transmitted between an MCM 92 and MSU 96 over a transmission line 46. If the read/write mode line 414 is "true" and the read/modify/write line 440 is "false" the MSU 96 will execute a clear/write operation. If the read/write mode line 414 is "true" and the read/modify-write line is "true" the MSU 96 will execute a read/modify-write operation. An initiate-memory-cycle signal is sent to the MSU 96 over a line 418 to start one of the three previously defined operations: read/restore, clear/write, or read/modify/write. An initiate-memory-cycle signal is actually used twice during a read/-modify/write operation: to provide the initial start, and to initiate the write portion of the operation. A write strobe signal is used during a write operation to strobe data from the MCM into the MSU's write register. This signal is transmitted over a line 420. A memory select write signal is used during the read/modify/-write operation to select the source of data for the re-write into memory. When the data select signal is "true," new data that was loaded into the MSU's write register from the MCM is selected; if "false" (word is protected), the MSU's read register containing the original data read out at the beginning of the operation is selected. This signal is transmitted over a line 422. A control clear signal is used to clear all control flip-flops and registers in the MSU's. This signal originates from the Operator's Console system clear switch and is transmitted to the MSU 96 from a MCM 92 over a line 424.

Lastly, a remove power ON/OFF signal is provided allows power-up sequencing to be controlled by the MCM 92.

Returning to a function description of the MCM 92, the MSU control 128 is used for routing control signals and addresses to the correct MSU; read or write (including all variations) timing; and address conversion required for the various MSU configurations.

In the preferred embodiment, the MCM 92 can be operated on-line during system operation or system tests and off-line during module testing maintenance. All data transfers are word oriented. A word transferred between the MCM 92 and a requestor includes the 48 bits of data, three tag bits, and one parity (odd) bit.

In the following paragraphs the memory storage unit will be described in detail. The memory storage unit (MSU) 96 stores information in a core memory stack that has the capability of presenting this information on request. All inputs and outputs to a memory storage unit 96 are controlled by an MCM 92 assigned to that particular MDU 96 (maximum of four MSU's per MCM 92). Therefore, all requestor operations requiring a memory module 30*a* first pass through the MCM 92 before being initiated by the MSU 96. The MSU 96 includes the necessary storage elements, driving and sensing circuitry, address and data registers (read and write), control timing and decoding, power and interface logic necessary to perform the required operations.

In the preferred embodiment, and MSU 96 has 65,536 address locations, each with 60-bits of storage available. Of these 60 bits, 48 are data bits, three are tag bits, one is a parity bit for the requestors's word, seven bits are for error detection, and one bit is for overall parity for the word while it is in a memory module 30*a*. The seven error detecting bits and the overall parity bit are sufficient to detect one-bit failure throughout the 60-bit field. Whenever information is stored in memory 30, these error code bits and the overall parity bit are set according to the new information about the stack word. Only the 48 data bits, three tag bits, and one parity bit are transferred to a requestor.

There are three operational modes provided by the MSU 96 in the preferred embodiment: read/restore (R/R), clear/write (C/W), and read/modify-write (R/M/W). For a read/restore (R/R) operation the memory storage unit 96 reads out data from the memory address defined by the MCM 92 and places the data on the bus to the MSU 96. The MSU 96 rewrites the information back into memory at the defined address. The following MCM operations use this MSU operation: (a) single-word fetch, and (b) N-length word fetch.

For a clear/write (C/W) operational mode, the MSU 96 reads out data from the memory location addressed by the MCM 92 and places the data on the bus to the MCM. The MSU 96 accepts information from the MCM 92 and stores it into the addressed location. The following MCM operations use this MSU operation: (a) single-word overwrite, with or without flashback, (b) N-length overwrite, and (c) single-word protected write. For a read/modify/write (R/M/W) operational mode, the MSU 96 reads out data from the memory location addressed by the MCM 92 and places the information on the bus to the MCM. The MSU 96 on command from the MCM 92 stores into the same address either the original information read from memory or information transmitted from the MCM 96. The N-word protected write uses this MSU operation.

In the preferred embodiment, there are three registers associated with a MSU 96, namely, a memory address register (MAR) 170, a memory write register (MWR) 172, and a memory read register (MRR) 174. Also associated with the memory storage unit (MSU)

96 is a core stack which consists of 65,536 words of 60-bits each. Of these 60 bits, 48 are data bits, 3 are tag bits, and 1 is a parity bit for the requestor's word, seven bits are for error detection and 1 bit is for overall parity for the word while its in a memory module 30*a*. The error-check bits and the overall parity bit are sufficient to detect one-bit failures throughout the 60-bit field. whenever information is stored in memory, these error check bits and the overall parity bit are set according to the new information within the stack word. Only the 48 bits, 3 tag bits and 1 parity bit are transferred to a requestor.

The memory address register (MAR) 170, in the preferred embodiment, is a 16-bit register that is used by the MSU 96 to identify the core stack location into which or from which the information (60 bits) is to be stored or fetched. The memory write register (MWR) 172, in a 60-bit register, that is used by the MSU 96 to buffer information from the MCM 92 that is to be written into a stack location. The memory read register (MRR) 174 is also a sixty bit register that is used to buffer information to be transferred to the MCM 92 from a stack location. The MRR 174 is also used as a source of write data during the N-length protected write if the word is protected.

With regard to memory interlacing and phasing, the large percentage of memory operations consist of transferring several words to or from consecutive memory locations. If consecutive memory locations within a memory storage unit (MSU) 96 are accessed, the transfer rate is restricted by the cycle time of the memory storage unit 96. This results in reduced efficiency of the requesting module which may be forced to wait for transfer of information from memory. This restriction is alleviated in the preferred embodiment, by assigning memory addresses in such a manner that consecutive addresses fall in different memory storage units (MSU) 96, see FIG. 37. This allows a second MSU 96 to prepare for a memory cycle while the first MSU 96 is transferring a word, and the second MSU 96 to transfer a word while the first MSU 96 is completing its cycle. This procedure is known as interlacing. For instance, a 4-MSU module 95 may be interlaced in such a way that four consecutive addresses fall in four different memory storage units (MSU) 96. The effect is that multiple-word transfers (phasing) occur in bursts of four words each, one at each successive clock. A 2-MSU memory module 93 may be interlaced so that bursts of two words may be obtained.

The memory storage unit (MSU) 96 is divided into two functional areas: the memory logic module (MLM) 176 and a memory storage module (MSM) 178, see FIG. 38. The function of the memory logic module (MLM) 176 is parity checking, timing, and control, and to provide those conversion logic circuits required to interface between the memory control module (MCM) 92 and the memory storage module (MSM) 178. A basic function of the memory logic module 176 is to make the memory control module logic levels compatible with the memory storage module logic levels. Since the memory control module (MCM) 92 is designed with CTL logic circuits in the preferred embodiment, and the MSM 178 is designed with the TTL logic circuits, the logic circuit signal levels must be converted from CTL to TTL (MCM to MSM) and from TTL to CTL (MSM to MCM) via buffer stages contained in the MLM 176.

The memory storage module (MSM) 178 includes the 65,536 60-bit word core memory; the memory read register 174, associated address decoding logic; read and write drivers; and timing and control logic. Functional flow descriptions of the read/restore (RR), clear/write (C/W) and read/modify/write (RMW), operations are presented in the following paragraphs in conjunction with FIG. 38 and the timing diagrams shown in FIGS. 9 and 40.

With regard to a read operation, before a memory operation can be initiated a signal indicating that a memory storage unit 96 is available (the MAV signal) must be present at the MCM 92. The MCM 92 then generates and sends to the MSU 96 an initiate memory cycle signal (IMC) which must be used by the MLM 176 to generate a start memory cycle (SMC) signal for the MSM 178. However, as illustrated in FIG. 38, the MLM 176 includes a time delay to allow the 16-bit address (ANN) to be decoded in the memory storage module (MSM) 178 and then to be returned (identified as signal BXX) to the parity checking circuits before the read data is available. Parity checking of address bits, after they have been stored in the memory address register 174, of the MSM 178, ensures that the address being executed is the actual address undergoing parity checking. The parity check is next made on the combined two bits that are used for operation control (read/write/ mode RWM) of read/modify/write (RMW); on the sixteen-bit address (BXX); and on the partiy (PAR) bit. If odd parity is detected, the address and control word bits are probably correct, however, if even parity is detected, an error is present and a memory parity error (MPE) signal is generated by the MLM 176 and communicated to the MCM 92. The MPE signal is gated by an address parity strobe (APS), which is generated in the MSM control section, to the MCM 92 where a failure interrupt is generated and sent to the requestor. Also, the memory logic module 176 initiates a read/restore operation via a word data select not ($\overline{WDS}$) signal which causes the original data (now contained in the MSM read register 174) to be written back into the addressed location.

Continuing with the description of a read operation, assume that the MAV signal (MSU available) is present, that a read operation is to be performed, and that the address control bit has successfully passed the parity check. The IMC (initiate memory cycle) signal which has been delayed within the memory logic module (MLM) 176 allows the MLM to generate the SMC (start memory cycle) signal for the MSM 178 to start the read cycle. At the same time the IMC cycle is present, the read/write mode (RWM) signal is low and indicates that only a read/restore operation is to be performed. When the RWM signal is low, the WDS (write data select) signal remains low and indicates new write data is not required. The read cycle begins by: setting the MSM memory busy control which generates an MPA (memory available) signal and inhibits the starting of any new operation until the EOC (end-of-cycle) signal is present, clearing the memory address register 170 of the memory storage module 178, and then strobing the new address into memory. Also, the memory-delay timing is started in the MSM 178 which allows the read-timing pulses to be generated and allows access to the selected cores. In the preferred embodiment, at approximately 500 nanoseconds, the read available out (MAO) signal is generated in the MSM 178 and in turn develops a read available signal (RXA) which is to be transferred to the MCM 92 to inform the MCM that data will be ready for transfer (RXXM) in a predefined time period. A sense amplifier (S.A.) is strobed at approximately 750 nanoseconds, to read out the data into the memory read register 174. At approximately 800 nanoseconds, the read register data (RXXX) is restored to its original address location as shown in FIG. 40. The read register contents (RXXX) are now sent to the memory buffer register 128 of the MCM 92 via receiver/driver circuits. The end-of-cycle (EOC) signal is generated at approximately 1.5 microseconds to conclude the operation. The EOC signal performs a clearing of all control and timing flip-flops so that another operation can be started.

With regard to a description of a clear/write operation, the clear/write operation is started in the same manner as the read operation except that the read/write operation is basically a read operation without the restoring of the original data. A 60-bit write data signal (WNN), a write strobe signal (WST), and the read/write mode signal (RWM) are simultaneously present at the MLM-MCM interface. The WNN data is loaded into the memory write register 172 and awaits the write-data-select (WDS) signal for writing into the MSM stack. The write-data select (WDS) signal is present (at approximately 750 nanoseconds) to write the WNN data into the stack location. The end-of-cycle (EOC) signal is generated as explained previously for the read operation.

Turning now to a description of a read/modify/write operation, which is used during an N-word protect operation, combines a read operation and a clear/write operation with the additional controls required to affect the operation. To start a read/modify/write operation, the IMC signal (initiate memory cycle) is present at the MLM/MCM) interface (as described in the read operation). Both control signals, read/modify/write (RMW) and clear/write (CW) are also present (shown as high on the timing diagram), to establish the conditions required to (1) read out the data RXX from all locations and to check for a 1 bit in position 48 (which indicates whether the word is protected); (2) if one of the words is protected, all the original words are written back into the address location via a read/restore operation; and (3) if none of the words are protected, new data is written into the addressed locations.

During a read cycle, the RXX data is transferred to the memory buffer register 128 located in the MCM 92 to be checked for the presence of the protect bit. During this time the MSM read register 174 retains the RXX data. After aproximately one microsecond, the parity information strobe signal (PAR) is generated in the MSM timing logic 186 and the PAR signal produces a data parity strobe signal (DPS) which is used in the memory logic module 176 to allow the second MCM generated IMC pulse (required for the RMW operation) to be accepted. The IMC signal again produces the start-memory-cycle signal (SMC) for the memory storage module 178; however, the memory storage module timing now starts with the write portion of the operation. At approximately the same time the IMC signal is present, the write data (WNN) is locked to the MLM write register 172 by a write strobe signal (WST). If one of the words was protected, a memory-select-word (MSW) signal is not generated by the MCM 92 nor is a subsequent write-select-data signal (WSD) generated for the MSM 178. The WSD signal causes the contents of the read register 180 to be returned to memory and the operation is terminated by an EOC signal. If an MSW signal (indicating no-protected-words) is generated by the MCM 92, the WSD signal allows the new write data (WNN) to be strobed into memory and the operation terminated by an EOC signal (generated in the MSM timing logic 186).

Referring now to the disk file subsystem of the instant invention. An extremely high-speed, modular, random-access extension of main memory 30 is provided by the disk file subsystem, and may include both head-pertrack disk file memory modules and disk pack memory modules interfaced with an input/output module 10 by the use of controls and exchanges. Under the control of the disk file optimizer (DFO) 40, head-per-track disk file modules can be combined to form optimized-access memory banks capable of storing from 450 million to 8 billion eight-bit bytes of information per input/output module 10.

As the name suggests, the disk file optimizer 40 is used in optimizing the rate of transfer of data (through the input/output modules 10 and disk file controls 81 and exchanges) between main memory 30 and disk file modules, see FIG. 2. For the transmission of control information, the optimizer 40 is joined with input/output module by means of a scan bus and with disk file modules either directly or through another disk file optimizer, indirectly.

Without the disk file optimizer, head-per-track disk file modules can be combined into random-access memory banks with a storage capacity of from 15 million to 16 billion eight-bit bytes per input/output module 10. Disk pack memory modules can be combined into random-access memory banks with a capacity of from 121 million to 15.5 billion eight-bit bytes of storage per input/output module 10.

With regard to a disk file subsystem where the disk jobs are not optimized, the service of multiple job requests for disk units on a common exchange involves an inherent delay between service of each job request. This delay is partially due to the manner in which the jobs must be linked under the queue of IOCB's for each Disk File Electronics Unit (EU) 171, that is, without regard to the relationship of the disk starting address specified by each job request and the current disk position (relative to the head), since the current disk position is unknown.

In a disk file subsystem of the present invention where Disk File Optimizers 40 are used, the inherent delay between the service of multiple job requests is reduced. The job requests are linked under the queues of IOCB's for the DFO's 40, rather than under the queues of IOCB's for the EU's 171 as in a non-optimized system. Upon receipt of a Start I/O HA command, the UT word is fetched. If the DFO bit is set, the job requests are automatically scanned out to the DFO job stack when possible. The DFO's constantly monitor the disk addresses specified by the job requests in the stack and compare them with the current disk position relative to the head. This information is used to maintain a job-stack pointer which indicates the current optimum job request relative to disk/head position. This current optimum job request is referred to as a queued control word.

The DFO's communicate with an IOM 10 via a common scan bus and individual status lines. The status lines transfer information regarding the capability of the individual DFO's to receive job requests from the IOM over the scan bus. In addition, the status lines transfer levels which indicate the availability of queued control words which require service. The SCI section 76 of the IOM 10 scans these status lines to determine whether queued control words are available from any DFO 40. If the status liner of any DFO 40 indicates the availability of queued control words, the SCI section 76 of the IOM 10 determines whether a disk channel is available on the exchange to which the DFO is connected. If so, a scan address word is formatted by the Translator 72 and SCI section 76 of the IOM 10 and is then sent over the scan bus to all DFO's 40. The contents of the scan address word sent over the scan bus identify the exchange which has indicated availability of queued control words. The scan address word on the scan bus is recognised only by the identified DFO, and therefore is, in essence, an acknowledge to that DFO.

In response to the scan address word received, the identified DFO 40 transfer a scan information word over the scan bus to the IOM 10. This word contains a complete memory link address, which is used by the IOM 10 to further access the IOM job map for the identified DFO 40. The map access performed provides information which identifies the EU 171 which is to control the disk job, whether that EU 171 is available, and whether the previously available disk channel is still available. If all conditions are met, the job is initiated and data is transferred between the DFI section 82 of the IOM 10 and the specified EU 171. Upon completion of the data transfer, the disk job is terminated in the normal manner. If the identified EU 171 is not available or if the disk channel is not available, the disk job is relinked under the queue of IOCB's for the DFO 40. It is then later transferred again to that DFO 40 for reoptimizing and another attempt at job initialization.

If a DFO or an IOM 10 fails, queuing responsibility for the disk file subsystem is assumed by the remaining DFO's and IOM's/. The following conditions will prevail: (a) access to any disk file system is still possible by way of the remaining On-line DFO and IOM (DFO and IOM failure), (b) the remaining DFO 40 is able to queue control words involving any of the disk systems (DFO failure), and (c) the remaining IOM 10 continues to transfer control words to and from either DFO (IOM failure).

In the preferred embodiment, the capabilities of remote computing, remote inquiry, and on-line programming are provided by a data communications subsystem. This subsystem is made up of networks comprising a data communications processor 36, adapter clusters, line adapters, and remote drivers of virtually every kind. The heart of the data communications network is the data communications processor 36. The data communications processor 36 is a small, programmable, special-purpose computer devoted solely to sending and receiving data over a multitude of data communications lines.

Relative to a central processor module 20, the data communications processor 36 operates asynchronously; once started, it operates independently of the central processor. Through the DCP-memory memory interface 78 of an input/output module 10, the data communications processor is exercised through the scan bus interface 76 of the input/output module 10. Characteristically, the data communications processor is capable of performing the following code translation: (a) EBCDIC to USASCII, (b) EBCDIC to BCL, (c) USASCII or EBCDIC, (d) USASCII to Internal, (e) BCL to EBCDIC, (f) Internal to USASCII, and (g) Internal to BCL.

In the preferred embodiment the master clock for the system is housed in the MCM cabinet designated MCM-O. Although all MCM's are so configured that they could house the master clock kit, only one master clock is used per system. A block diagram of the clock system is shown in FIG. 41.

As shown, the master clock 173 comprises three circuit cards: the crystal-controlled master clock 175, a 2MHz countdown 177, and a crystal-controlled 5MHz clock 179. The crystal-controlled master clock 175 provides three outputs consisting of the following: a 16 MHz signal which is supplied to the CPM's 20 as the clock signal for the program control unit 56, storage unit 66, and execution unit 62; an 8MHz phase-1 signal which is supplied to the communications unit 68, IOM's 10, and MDU's 26 as the basic clock signal for internal and interface timing, an 8MHz phase-2 signal which is supplied to all MCM's 92 as the basic clock signal for internal and interface timing. The 2 MHz countdown circuit card 177 steps down the 8 MHz phase-1 signal to provide a 2 MHz clock signal for the disk file optimizer (DFO 90). (The DFO does not contain an internal clock generator). The 5 MHz crystal-controlled oscillator 179 provides the clock signal for the data communications processor 36.

In the preferred embodiment, the master clock system obtains its dc input power from special power supplies that are isolated from the normal power supplies in each module. Therefore, if the MCM 92 containing the master clock is shut down, the master clock will continue to drive the other MCM's and system modules. Distribution of clock signals to other modules (as shown in FIG. 41) is accomplished via 100-ohm coax lines.

As shown in the lower portion of FIG. 41 the master clock is buffered at the input of each module. The module buffer is the basic clock control within each module since inputs to the buffer are provided by the master clock, single pulse circuit, and the Maintenance Diagnostic Unit (MDU) 26 via the single pulse circuit. Whether the single pulse or master clock input is used is controlled by a switch provided for each module. The module buffer controls the pulse width and amplitude of the selected input.

Referring now to the fail-soft and maintenance features of the instant invention. The system of the instant invention embodies two principles of fail-soft design: first, each module of the system is very reliable and, second, the system as a whole can continue to function despite failures in individual modules. To this end, the basic objectives of fail-soft design have not only to provide for the immediate detection and isolation of any failure but also to make each function of the system available by means of more than one system resource. In other words, the primary goal is to keep the system running 100 percent of the time. Related closely to this goal are two others: (1) to minimize system degradation and (2) to provide the user with tools for performing his own data recovery. Together, the three goals are achieved by a combination of hardware and software facilities throughout the system.

The first goal - to keep running - is accomplished as follows: by the high reliability of system hardware, by the incorporation of error detection circuits throughout the system; by single-bit error correction of errors in memory; by recording errors for software analysis, by modular design, by use of separate power supplies and redundant regulators for each module, and by use of redundant busses; and by the ability of the multi-level operating system to automatically reconfigure the modules of the system to temporarily exclude a faulty one.

Although the capability to reconfigure the system upon the isolation of a defective module is primarily a function of the multi-level operating system, there are features built into the hardware that aid the software. For example, mask logic allows the operating system to delay recognition of an interrupt, and four interrupt management levels, or machine modes of operation, are used to provide three complete changes of environment in instances of repeated interrupts. These features allow the multi-level operating system to seek a failure-free environment in which recovery tasks (logging of the failure, isolation of jobs affected by the detected error, system reconfiguration, and restarting of users' jobs not affected by the failure) can be carried on.

In short, the detection and reporting of errors is accomplished by hardware, analysis of errors is accomplished by software, and the reconfiguration of the system is accomplished dynamically by software. Because of the modularity of the system and the redundancy of interconnecting buses, a failure of a single module or of a single connection will not totally disable the system. Moreover, because of the modularity of power supplies and the use of redundant regulated supplies for critical voltages, the impact of a malfunctioning dc supply is minimized and does not result in a catastrophic failure.

The second goal - to minimize system degradation - is achieved by providing diagnostic programs and equipment for rapidly identifying and repairing faults and for reestablishing confidence in a repaired module before it is returned to the user's system. The diagnostic programs identify a faulty module on line. By the off-line use of the maintenance diagnostic unit 26 a fault in any main-frame module or in a disk file optimizer 40 is narrowed to a single clock period and to a flip-flop and its associated logical circuits. Finally, by the use of the card tester on the maintenance diagnostic unit 26 the faulty integrated circuit chip is identified.

The third goal - to provide the user with tools for performing his own data recovery - is achieved by the use of such features as installation allocated disk, protected disk files, duplicated disk files, and fault statements in the high-level programming languages used on the system.

Extensive error checking facilities allow for the immediate detection of a failure - a basic premise of fail-soft design. This feature is combined with the reporting of errors in the fail registers of the central components of the system and with the correction of single-bit errors in memory.

With regard to the use of residue checking in all arithmetic operations and of parity checking and continuity checking in data transfers greatly facilitates the detection of errors within the central processor module 20, a processor internal interrupt is produced and the cause of the failure is denoted by the contents of the fail register 70 of the processor.

Within the execution unit 62 of the central processor module 20, parity is used to detect errors in the execution unit local storage and in data received from other units. Control mode 3 residue checking is used to detect errors anywhere in the execution unit 62 data paths and data registers, particularly in the adder and in the barrel register, but not in the execution unit local storage or control registers. Also, residue checks are made on addresses sent to the execution unit from the address unit, and residue is supplied for addresses sent by the execution unit to the address unit 60 or storage unit 66. In addition, residue checking is the primary means of detecting an error caused by an extra data transfer signal. Continuity checking, the use of a validity bit that indicates whether or not the current contents of a register are valid, is used to detect missing and sometimes extra data transfer signals for the most commonly used execution unit data paths.

With regard to detection and reporting of errors in the IOM 10, there are facilities for detecting errors that may occur in any operation in which data is transferred into or out of the system. Among the error detecting features of the input/output module 10 are parity checking of all data transfers, residue checking of all arithmetic operations, parity checking of all local memory operations, timeout on memory transfers and scan bus operations, memory bounds checking, detection of illegal commands and conditions, and parity checking of register-to-register transfers.

Particular care is taken in addressing main memory 30: residue checks are made in the calculation of memory addresses, and bounds checks are made each time an attempt is made to gain access to main memory.

When a failure occurs in the input/output subsystem, it is reported in a result descriptor (RD) that pinpoints the fault. If the fault is not related to a specific request or device, it is also reported in the fail register of the input/output module 10 and an IOM error interrupt signal is produced. An error that is related to an input/output request or to a peripheral device (for example, a parity error on a magnetic tape unit), is reported only in a result descriptor. Further, servicing of the device on which the error occured is prevented, and a channel interrupt is triggered if requested by software.

All single bit memory errors are detected and corrected; the fail register 112 of the memory control module (MCM) 92 is loaded with information about the failure, and the requestor (central processor module 20 or input/output module 10) is notified of the failure ( a fail 2 interrupt is generated) and of the type error that occured. The ability of the memory control module 92 to perform single-bit error correction not only greatly increases availability but, more important, also eliminates a source of transient errors which persist until a pattern has been established. In the system of the instant invention the transient errors are corrected, and the log of fail register contents provides the information for establishing the failure pattern.

Detection and reporting of two-bit errors in memory are detected and reported but not corrected. Again, the fail register 112 of the memory control module 92 is loaded with information about the failure, and the requestor is notified of the failure (a fail 1 interrupt is generated) and of the type of error that occured. (A fail 1 interrupt is always generated when an irrecoverable memory error occurs.).

To effectively make use of the error detection capabilities just discussed, isolation of errors is necessary. Achieving this isolation of errors involves not only the logical organization of system modules and interfaces but also the logical organization of system modules and interfaces but also the physical redundance of modules and cables and the isolation of modules. Logical features, such as redundant module address selection for intermodule communication, are useless if a single connection failure can disable all intermodule traffic. Hence, in the preferred embodiment, the intermodule cabling and the power distribution are designed to preserve module independence. The independence of main-frame modules is accomplished by use of a distributed switching interlock and by a distributed fail-soft power subsystem. The distributed switching interlock interconnects all main frame modules. The switching interlock does not exist as a single entity but is distributed among the main frame components and thus does not rely on any one component for its operation. The central processor and input/output modules are treated as requestors and each module has a unique path to each of the memory modules 30*a*. Priority resolution logic 116 in each of the memory control modules 92 ensures that each requestor is served. There is, in addition, a software-settable access mask in each memory control module 92, which may be set by software. This feature enables the system to be divided into several systems, but, more important, it provides the ability to lockout suspect or faulty requestors (central processor and input/output modules) from memory modules 30*a* containing operational programs and data base.

The interface problems between main frame components are readily solved, because all main frame components are interconnected. Communication between processors is easily maintained by the use of interrupts and shared memory. When processors are operated in a load-sharing mode, a failed processor would be detected by its failure to update a status table in memory. Another processor would then carry the entire load, lock out the failed processor from memory, initiate recovery procedures for the task being performed by the failed processor, and inform the system operator of the failure. Since all information is available to all processors, processor may initiate input/output requests and respond to the termination of an input/output operation.

The true test of a modulator fail-soft system is whether it is possible to perform maintenance on a module without interfering with other modules. Hence, in the system of the instant invention, power supplies are distributed so that power sequencing in one module does not interfere with another module. Not only do the central components of the system have separate power supplies and regulators, but critical power supplies are duplicated within each module.

The rapid identification and repair of faults is accomplished by use of confidence and diagnostic programs and by the use of the module and card testing facilities of the maintenance diagnostic unit 26. Both on-line and stand-alone confidence and diagnostic programs for both the central components of the system and peripheral devices are provided as software of the system. In addition, test tapes used with the maintenance diagnostic unit 26 are provided for the off-line testing of the central processor module 20, the input/output module 10, the memory control module 92, and the disk file optimizer 40.

In the preferred embodiment the maintenance diagnostic unit 26 is a console that in conjunction with a dedicated magnetic tape unit 35 is used in off-line testing of the central processor module 20, the input/output module 10, the memory control module 92 and the disk file optimizer 40, and in testing the cards of these components of the system. When by the use of on-line confidence and diagnostic programs a faulty module has been identified, the cause of the trouble is further traced first to the card level and finally to the circuit level by the use of module testing and card testing facilities of the maintenance diagnostic unit.

The maintenance diagnostic unit 26 is permanently connected by dedicated cables to all modules that can be tested. Tests are initiated from the dedicated magnetic tape unit 35 or manually from the panels of the maintenance diagnostic unit 26. Selectable test options provide for stopping on an error or cycling. Because the modules that are tested have logical circuits dedicated to maintenance, the maintenance diagnostic unit 26 is capable of controlling (setting and resetting) and sampling all of the flip-flops of these modules. The maintenance diagnostic unit 26 controls the clock of the module under test; single clock pulses and trains of clock pulses can be used.

The strategy of testing modules on the maintenance diagnostic unit 26 is to exercise a faulty module clock period for clock period to compare the states of its flip-flops with a prerecorded norm. In this way a trouble is traced to a clock period and to a flip-flop and its associated logical circuits. Similarly, the testing of faulty cards on the card tester of the maintenance diagnostic unit 26 is carried out by providing input patterns to a card, sampling its outputs and comparing them with predetermined norms.

Installation allocated disk allows the user to specify the physical allocation of his critical disk files in order to facilitate the maintenance and reconstruction of these files. Protected disk files allow a user to gain access to the last portion of valid data written in a file before an unexpected system halt. The use of duplicated disk files is to avoid the problem of fatal disk file errors. The multi-level operating system maintains more than one copy of each disk file row, and, if access cannot be gained to a record, an attempt is made to gain access to a copy of the record. By the use of fault statements, the user can stipulate the actions to be taken by his programs in case errors occur.

Having now discussed the various components of the information processing system of the instant invention, the following is directed toward a discussion of the multi-level operating system of the preferred embodiment.

The system of the instant invention represents a true synthesis of both hardware and software. The software of the instant invention is not an afterthought. On the one hand, many functions conventionally handled by software are built into the hardware, and, on the other hand, the control and the balanced use of hardware resources of the system depend upon the software. Two notable features about the software of the instant invention are: (1) that is is all written in higher-level compiler language to the exclusion of assembly languages and machine language, and (2) with no recompilation, it is possible to process all application programs, compilers and utility programs. The first feature eliminates the difficulties of man's communicating with the computer by providing languages that both he and the machine can understand, while the second feature provides machine-code compatibility of software.

The multi-level operating system of the instant invention is comprised of a kernel 200, and one or more control programs 202, see FIG. 42. The kernel 200 which is the nucleus of the operating system, provides direct interface with the hardware, and provides the operating environment for the control program 202.

There are two main reasons for adopting a multi-level approach to the software control of a data processing system. First, it is possible under control of the multi-level operating system to execute concurrently several control programs, each tailored to support a particular type of application, or job, be it batch work, testing of hardware modules, or time sharing. Each control program makes use of the strategies for resource allocation and scheduling most appropriate to a special kind of job and need not include irrelevant strategies. Thus, several control programs under the control of the multi-level operating system may share a hardware system, and each job running under the control of a control program will benefit from the specialized facilities of the control programs that controls it. Moreover, this arrangement permits the isolation of a user's production environment from, for example, an environment in which experimental system software is being debugged.

Second, by making the multi-level operating system more modular, it becomes more understandable and more manageable, and thus, easier to write, maintain, and to extend. In fact, a user may write his own special control programs and still retain the use of the basic functions provided by the multi-level operating system and the standard conventional control programs. Some of the functions of the kernel 200 include: (a) hardware resource allocation, including partitioning and physical CPM scheduling; (b) physical I/O initiation and termination; (c) interrupt handling; (d) programmatic halt/load and other system error recovery functions. On the other hand, a control program 202 in the instant invention provides the operating environment for user programs 206. Responsibilities of the control program 202 include: (a) sub-allocation of its assigned resources among its processes; (b) file handling and logical I/O functions, up to the point of defining specific physical I/O requests; (c) handling of interrupts which are returned by the kernel 200; and (d) user program error recovery functions.

Structurally, the multi-level operating system of the instant invention may be viewed as comprising the kernel 200 as the base level of the system, while control programs 202 are the next level, and user programs 206 are the third level of the system operation. In general, a process at each level is responsible for processes it creates at the next higher level and for no others.

As is evident from the previous discussion directed toward the components of the information processing system of the instant invention, special emphasis is placed on reliability, error detection, error reporting, and error recovery. Examples of this emphasis are the individual power supplies for each component cabinet to insure that the failure of one does not affect other; the unique data paths, which also insure that the failure of one does not affect other; the parity, residue and continuity checking in the central processor module 2- to insure the accuracy of data; the fail registers, which include the possible causes of a failure; the single bit error correcting memories, which can automatically correct single-bit errors and detect 2-bit errors; the maintenance diagnostic unit 26 which is used to diagnose a problem, possibly to the chip level; and the multi-level interrupt system which simplifies error recovery. The design of the multi-level operating systems of the instant invention also reflects a concern for system reliability. Some of the features which will be discussed in detail in the following paragraphs include the isolation of the environments of individual control programs 202 to minimize the effect the failure of one has on another; the constant monitoring by the kernel 200 to detect the failure of a processor (CPM 20) not otherwise reported; the analysis of error conditions reported through interrupts and fail registers of the portion of the system involved in the error without affecting other portions of the system; software implementation of the multi-level interrupts system to allow recovery of errors that would otherwise halt the entire system; and a programmatic halt/load feature, which permits reinitializing those portions of the system that experienced failure without affecting other portions.

In the preferred embodiment, each control program is normally allocated its own memory, peripherals and disk. The ability to have multiple control programs running at the same time permits each control program 202 to be optimized for a specific application and environment. This gives the user of capability of creating its own control program for a specific application and of simultaneously utilizing a generalized control program for other processing. In addition each control program operates in its own environment so that a failure of one control program will not affect other control programs. This allows a user to operate production and testing environments at the same time under separate control programs so that production runs can continue unaffected by program debugging.

The reliability of the system is thus, in part, achieved through the isolation of the control programs environments. The kernel acts as the interface between a control program 202 and the system hardware 204. The kernel thus bears the ultimate responsibility for the detection and confinement of error conditions.

One of the basic functions of the kernel 200 is the direct control of the hardware and allocation of that hardware to control programs 202. In the preferred embodiment, the resource allocations again employed by the kernel 200 is based upon physical resources, the motivation being (1) greater control over the resources that control program 202 can specify; (2) greater control over usage of these resources; and (3) assuring that module failures (CPM, IOM, MCM) affects only one control program 202. The memory, peripheral, and disk resources representing a control program storage environment are passed as parameters to a control program 202 at initiation. This resource allocation should be somewhat static from initiation to initiation, especially to the instance of save disk requirements. Provisions are made, however, for the operator to modify the allocation, for control program 202 to request a resource or return a resource to the kernel 200 (from or to a pool of available system resources), and for the kernel 200 to pass additional resources into the control program 202. In order to place the multi-level operating system on the master control program (MCP) as it will sometimes be referred to hereinafter, in control of the system, the MCP code file must be loaded onto a disk, starting at disk address 0 of a load disk unit. In addition, the MPC information table and disk directory must be present on disk. When these initial conditions have been satisfied, a Halt-Load operation is used to read the first 8192 words of the MCP into main memory 30 (main memory 30 is allocated to control programs logical segments of 16,374 words) begins to execute the MCP.

The functions of loading the MCP code file to disk from magnetic tape and of creating or revising the MCP information table and the disk directory are accomplished by a System Loader program. This program is in the form of a card deck containing the machine code instructions, followed by data cards that specify parameters for the initialization. Items that may be specified include the types and number of peripherals available and their configuration in the I/O subsystem, the size of disk areas to be used for the disk directory and for overlay, the disk units to be used for backup or reconstruction, the tables to be displayed on particular supervisory consoles, the tape from which the MCP is to be loaded, and various run-time system options.

In the preferred enbodiment a processor hardware interrupt system is the primary interface between the MCP and the system hardware. Hardware interrupts are generated automatically and under certain conditions by the system and are handled by the MCP interrupt procedure. An interrupt is a means of diverting a processor from the job which it is doing if certain predetermined conditions occur. When a hardware interrupt has been processed by the MCP, the MCP will (if conditions then permit) reactivate the interrupted process.

When a processor is executing the interrupt handling procedure of the MCP, it is in control state, one of the two operating states of a processor. A central processor 20 can operate in either of two states; control state used in executing the MCP, or normal state, used in executing user programs and certain MCP functions. In a multi-processor system each processor handles its own interrupts; that is, all processors may be in control state at the same time.

Entry into control state occurs when the processor is started and as a result of certain interrupt conditions. In control state the processor can execute priviliged instructions not available in normal state, and various classes of interrupts can be inhibited or allowed programmatically. Exit from control state into normal state occurs whenever the MCP initiates a normal state program or exits back to a normal state program following an interrupt. In the latter case, user program return may not be to the program in process when the interrupt occurred.

Normal state excludes use of privileged instructions required by the MCP, permits hardware detection of invalid operators, and enforces memory protect and security facilities. Exit from normal state occurs as a result of an interrupt condition or by a call to a control state program, for example, to execute I/O. Many MCP functions can be run in normal state. Interrupts to a normal state MCP function can be enabled.

Hardware interrupts may be classified as internal and external interrupts. For internal (syllable dependent and syllable independent) interrupts, each processor in the system is provided with a private, internal interrupt network. Internal interrupts associated with a processor are fed directly into this network and are stacked local to the processor. External interrupts on the other hand, may be serviced by any processor in the system. Syllable dependent interrupts are detected by the processor operator logic. These include arithmetic error, presence bit, memory protect, and invalid operand interrupts. Except for arithmetic errors interrupts, for which programmatic control may be supplied, and presence bit interrupts, interrupts of this group generally result in program termination. Syllable independent (alarm) interrupt conditions are not normally anticipated by the processor operation logic. They serve to inform the processor of some detrimental change in environment and can result from hardware failure as well as programming errors. These interrupts include those for a faulty read from memory, an invalid address, and an invalid program instruction word, all result in termination of the process involved. External interrupts conditions are similar to the alarm interrupts, in that they are not anticipated by the operator logic. However, they do not normally require immediate action and do not necessarily result in termination of the program. These include interchannel and internal timer interrupts. Normally, system reconfiguration to eliminate a hardware module that has failed or must be shut down for maintenance is handled automatically by the MCP. The basic criterion for being able to shut down or disconnect a unit is whether it is currently in use by some process. If, for example, a memory module 30*a* is shut down, an attempt to access data would almost certainly lead to an invalid address. However, if a unit which is not currently in use, such as a magnetic tape drive, is shut down, the system continues to function as if nothing has happened. It is possible to issue a command to the MCP indicating that a particular unit is to be shut down and that the MCP is to respond by rearranging the system to avoid the use of the unit.

When a hardware interrupt condition occurs, the interrupted processor enters the control state, marks the stack, and inserts three words in the top of the stack. The first entry is an indirect reference word which points to a register that contains a program control word (PCW) which points to the MCP hardware interrupt procedure. The first entry is followed by two interrupt parameters, P1 and P2, which contain information indicating the nature of the interrupt condition. When the processor enters the MCP hardware interrupt procedure, it remains in control state in order to disable external interrupts. The processor execution state (control or normal) is determined by the control bit of the PCW. When the control bit is "on" the processor will execute a procedure in control state. Otherwise, it will execute in normal state.

Upon entry to the hardware interrupt procedure the parameter P1 is analyzed to determine the type of interrupt which occurred. For some interrupts such as presence bit interrupts, P2 contains additional information to be used by the interrupt procedure. Then the appropriate action is initiated.

The MCP maintains records of storage availability through the use of memory links which are assigned within the areas they describe. Each type of memory link is linked to form a list which contains sufficient information for a single hardware operator to find the next memory link and all succeeding memory. Memory areas are classified as in-use or available according to their current state.

Specifically, in-use memory links include the stack number of the requesting process, the length of the in-use area, an availability bit set in the "off" position, a code indicating the usage of the area, links to the last previously allocated and next in-use areas, and so on. Available memory links include the length of the area, an availability bit set in the "on" position, links to the next and last available areas, and so forth.

The MCP performs dynamic storage allocation by use of an environment control routine for all system storage media; main memory 30, magnetic disk, and system library magnetic tape. As a result of considering the different system storage media as a hierarchy of memory, the MCP controls allocation and deallocation of all system memory.

Memory protection is provided for by a combination of hardware and software devices. One of the hardware features is automatic detection of an attempt by a program to index beyond its designated data area. Another is the use of one of the control bits in each word as a memory protect bit to prevent user programs from writing into words of memory which have the protect bit set. (The project bit is set by the software). Any attempt to perform such a write operation is inhibited, and an interrupt is generated, which results in termination of the program. Thus a user program cannot change program segments, data descriptors, or any program words or MCP tables during execution.

In the preferred embodiment, the MCP maintains control of jobs by the use of stacks, descriptors, and tables of system and process status. One stack is associated with each job in the system. As previously discussed, the stack, a contiguous area of memory, is assigned to a job to provide storage for basic program and data references. It also provides for temporary storage of data and job history. When a job is activated on a central processor 20, the high-speed top-of-stack processor locations are linked to the job's stack memory area. This linkage is established by the stack-pointer register (S Register 63) which contains the address of the last word placed in the stack. In addition, the top portion of the stack memory area is placed in the stack buffer 50 of a CPM 20, an area of processor local IC memory, to provide quick access for stack manipulation by execution unit 62 of the central processor module 20.

Data are brought into and out of the stack through the top-of-stack locations according to the last-in, first-out principle. Total capacity of the top-of-stack locations is two operands. Loading a third operand into the top-of-stack locations causes the first operand to be pushed from the top-of-stack registers into the stack. The stack-pointer register (S 63) is incremented by one as each word is withdrawn from the stack and placed in the top-of-stack registers. As a result, the S register 63 continually points to the last word placed into the job's stack.

As previously discussed, a job's stack is bound, for memory protection by two registers, the base-of-stack register (BOSR) 65 and the limit-of-stack register (LOSR) 67. The contents of the BOSR define the base of the stack, and the LOSR 67 defines the upper limit of the stack. The job is interrupted if the S register 63 is set to the value contained in either LOSR 67 or BOSR 65.

Descriptors are words used to locate data and program areas in memory and to describe these areas for control purposes. Descriptors are the only words containing absolute addresses which can be used by a user's program, however, the user's program cannot alter them. In the preferred embodiment descriptors are divided into three categories, data, string and segment. Data descriptors are used for referring to data areas, including input/output buffer areas. The data descriptor defines an area of memory starting at the base address contained in the descriptor. The size of the memory area in number of words is contained in the length field of the descriptor. Data descriptors may directly reference any memory word address. String descriptors refer to data areas organized as 4, 6 or 8-bit characters. The descriptor defines an area of memory starting at the base address contained in the descriptor. The size of the memory area is defined by the length field. Segment descriptors are used to locate program segments. These descriptors contain either the main memory 30 or disk file address of a particular segment. All programs are entered and exited through the segment descriptors common in the segment dictionary stack; all references to those descriptors are relative. Entrance to or removal of any given program segment from memory is achieved by changing the presence bit in that segment descriptor. No stack search of any kind is required.

The MCP also maintains tables that summarize system and process status. A mix table includes the priority status (scheduled, active or suspended), and mix index of each job that has been entered in the system. A peripheral unit table has an entry for each peripheral unit in the system. Each entry includes the status of the corresponding unit and the file associated with that unit.

The sequence of jobs to be run and the optimal program mix considering the priority ratings and system requirements of each object program and considering the present system configuration and determined by the scheduling routine of the MCP. The MCP incorporates a dynamic scheduling algorithm, that is, one which reschedules the job sequence whenever a higher priority job is introduced into the system. Job priority may be programmer-defined by use of the priority statement. If no priority is specified by the programmer, a default value of one-half the maximum allowable priority is assigned by the MCP. The calculation of the priorities is performed in a well-isolated section of the MCP. Thus, the user may easily tailor priority algorithms to his specific requirements.

As each job is read from the system input unit (card reader or pseudo card reader, i.e., magnetic tape or disk), the CONTROL CARD interpreting procedure, makes an entry into the sheet queue to schedule each batch-mode process. The sheet queue is a linked list of processes which wait execution. Each entry in the sheet queue is a partially built process stack. The information contained in this stack includes the estimated amount of main memory 30 required by the process, priority, time of entry into the schedule, size and location of code segments, working storage stack size, and size and location of the process stack information. After CONTROL CARD completes its tasks, and if sufficient resources are free, the entry is moved from the sheet queue to a queue called the ready queue. When sufficient system resources exist to allow another job into the mix, an independent runner process called RUN is started. RUN makes the segment dictionary for the job present in main memory 30 and transfers control to the job.

Real-time and time-sharing applications entering the system by way of the data communication facilities merely become additions to the multiprogramming mix. As soon as control is transferred to a new job, an interrupt may occur because the outer block code segment is not present in main memory 30. This interrupt is handled by the PRESENCE BIT procedure of the MCP. PRESENCE BIT is entered and the following actions occur in order to bring the segment into memory: (1) PRESENCE BIT calls a GETSPACE function of the kernel 200 to allocate an area in main memory 30 for the code segment (the GETSPACE function attempts to allocate the amount of space that satisfies the request); after an area is allocated, PRESENCE BIT calls a DISKIO function, the disk input/output procedure, and waits for notification that the segment has been read in; and (3) DISKIO links the request into the I/O queue. Upon completion of the disk input/output procedure, PRESENCE BIT is notified that the segment is now available. PRESENCE BIT marks the segment descriptor present and exits back to the job at the point of interruption, and the job continues to run.

A program residing in memory occupies separately allocated areas; that is, each part of the program may reside anywhere in memory. The actual address is determined by the MCP. Also, the various parts are not necessarily assigned to contiguous memory areas. Registers within the processor and descriptors in the stack indicate the bases of the various areas during the execution of a program.

The separately allocated areas of a program are: (1) the program segments - sequences of instructions performed by the processor in executing the program; (2) the segment dictionary, a table containing one word for each program segment; this word tells whether the program segment is in main memory or on the disk, and gives its corresponding main memory 30, or disk address; (3) the stack, which contains all the variables associated with the program, including control words that indicate the dynamic status of the job as it is being executed; (4) data areas used by the program, which are referenced by data descriptors or string descriptors in the program's stack; and (5) the MCP stacks and segment dictionary, which contain variables pertinent to the MCP and the MCP segment dictionary entries.

As a job runs, additional segments of program code and data will be needed. The job stack contains storage locations for simple variables and array data descriptors, but program code segments and array rows are assigned their own areas of memory. This assignment of separate memory areas for code segments and array rows allows segments and data to be absent from main memory 30 until they are actually needed. Thus, a reference to data or code through a data descriptor or a segment descriptor causes the processor to check the PRESENCE BIT in the descriptor. If the PRESENCE BIT is off, an interrupt occurs which transfers control to PRESENCE BIT. The nonpresent descriptor is passed as a parameter. PRESENCE BIT reads the address field of the descriptor and calls the GETSPACE procedure to allocate an area in main memory 30 for the code segment. Parameters are supplied to GETSPACE so that an adequate sized contiguous area of memory may be reserved for a particular stack. After GETSPACE satisfies the request for core-space, it returns the memory address of the area it has allocated, and PRESENCE BIT causes the information to be read from disk into memory. When the disk read is finished, PRESENCE BIT stores the memory address of the information into the address field of the descriptor, turns the presence bit "on" and updates the descriptor in the process stack. PRESENCE BIT then returns control to the interrupted process, and the information is accessed again by the process. Now the information is present in memory; the information is obtained and the process execution continues in the normal manner.

The storage required for the reference data or code may be allocated at the front or rear of an adequate-sized area and marked as overlayable or nonoverlayable. When an in-use area is allocated, it is linked to the previously allocated in-use area by the left-off link and pointer fields in the memory links. These fields comprise the left-off list. A reference word pointing to the oldest entry in the left-off list allows the chronological history of in-use memory areas to be determined.

When there is sufficient available memory to satisfy particular request, the overlay mechanism is invoked. The left-off list is searched, starting at the overlayable area that has been allocated for the longest period of time. If this area, combined with adjacent available area, is adequate to satisfy the request, it is overlaid. Otherwise, allocated areas with lower starting addresses are considered.

If the request is satisfied and the area found is larger than the required size, the unused portion is made available by linking it to the available list. If the request is not satisfied, the next oldest overlayable area is obtained and the left-off list is searched as described above. This process is repeated until the left-off list has been exhausted. If the request cannot be satisfied, a no memory condition exists.

Software interrupts as opposed to hardware interrupts are programmatically defined for use by the MCP and object program processes. Software interrupts allow processes to communicate with each other and with the MCP. Software interrupts allow a process to stop running (thereby releasing the processor) until a specified event occurs, or continue running and be interrupted if the event does occur. A software interrupt occurs when a process is interrupted by the direct action of some other process. A process can be interrupted if it has an interrupt declaration (statement) within its scope.

A process may invoke the occurrence of an event by means of the CAUSE statement. The MCP scans the event interrupt queue to determine if the interrupt has been enabled. If the interrupt is not enabled and the event is caused, no action is taken by the MCP on that process, and it looks at the next process in the queue. If interrupts are enabled in the next stack, the MCP makes an entry in the software interrupt queue. This queue is ordered by stack number. If the stack is active, that is, if another processor is working with the stack, the MCP will interrupt that processor with an interchannel interrupt. Next, the MCP forces a transfer of control to the statement related to the interrupt declaration. Upon completion of this statement, the process will return to its previous point of control unless a transfer of control is specified in the interrupt statement. In this case the process will not return the point of control before the interrupt but will transfer control as specified in the interrupt statement.

As the MCP scans the event interrupt queue finding enabled interrupts in inactive stacks, it makes an entry in the software interrupt queue, doing nothing with that stack until it becomes active. Immediately after making the stack active, the MCP checks the software interrupt queue to see if there is an interrupt pointing to that stack. If an interrupt is found, the MCP forces a transfer of control to the statement referred to by the interrupt declaration. Upon completion of the statement, control is transferred as described above.

In the preferred embodiment when the execution of a job is terminated, the following actions occur: (1) any outstanding I/O requests are completed, if possible; and any open files are closed, the units released, and the buffer areas are returned to the available memory table; (2) all overlayable disk areas allocated to the job are returned to the available memory table; (3) all job object code and data array areas of main memory 30 are returned to the available memory table; (4) any end-of-job entry is made in the system log for the job, and (5) the job's stack is linked into the terminate queue.

With regard to input/output operations, all input/output operations on the system are performed by the MCP. The MCP automatically assigns peripheral units to symbolic files whenever possible in order to minimize the amount of operator attention needed by each job. Whenever an input file is requested by a job, the MCP searches its tables for the appropriate peripheral unit which contains the file requested. If the file name specified by the job is found on a particular unit, that unit is marked in use and assigned to the job. Output files requested by a job are automatically assigned by the MCP if a suitable unit exists for the file. In the case of disk files, a disk file directory entry is made and the needed disk space is allocated for the file.

In order for the MCP to associate peripheral units with symbolic files, the compilers that run on the system of the instant invention must furnish the following information about files to the MCP: the symbolic file name, (file title), the peripheral type (disk, magnetic tape, card, paper tape, etc.) the access type (serial or random), the file mode (alpha, binary, etc.) the buffer size, the number of buffers, and the logical record size. The actual file name is the file title which is associated with the unit that contains the file or the title in the disk file header. The actual file name will be identical with the symbolic file name unless otherwise specified by label equation control statements.

In order to allow dynamic specification of actual file names for a file, three tables are necessary: a process parameter block, a label equation block, and a file information block. A process parameter block is created by CONTROLCARD for all files in a job. It contains the symbolic file name and any compilations or execution time label equation information specified for this process. The label equation block and the file information block are created by the compiler and maintained by I/O functions for each file in a process. The label equation block contains the current label equation and other file attribute information for a particular file, including any programmatic specification of file attributes. The file information block contains frequently used information concerning the file, such as the type of access required, type of unit assigned, physical unit being used, and attributes which depend upon the type of unit assigned. Incorporation of the file attributes in the file information block and label equation block allows modification of file specifications such as buffer size and blocking factors, at program execution time, without recompilation of the program.

Object program I/O operations on the system involve the automatic transfer of logical records between a file and a job. A logical record consists of the information the job references with one Read or Write statement. The size of a logical record does not necessarily coincide with the size of the physical record or block accessed by the hardware I/O operations. When a physical record contains more than one logical record, the file is referred to as a blocked file. When a file is accessed by a job, a physical record is written from or read to a memory area known as a buffer area for the file. If the file is blocked, the MCP maintains a record pointer into the buffer. This pointer is used by the process to access the current logical record. If the next record is not already present in a buffer, then the MCP automatically performs the required I/O operation.

Multiple buffers may be used to effectively increase throughput for jobs that require groups of physical records at one time. Since the MCP performs all object program I/O action, a job with multiple buffers allocated for a file allows the MCP to perform I/O operations independent of the status of the job. The determination of the number of buffers required for efficient execution of a job depends on the type of files being used, the particular hardware configuration being used, the processing characteristics of the job, the memory requirements of the job and the mix of jobs which are typically multiprocessing. The MCP attempts to keep all input buffers full and all output buffers empty for each job, regardless of status, thereby minimizing the time that a process is suspended waiting for an I/O operation to be completed.

The MCP provides extensive data communication facilities, including time-sharing, remote computing, and remote inquiring. No terminal device interfaces directly with the control system. Instead, the necessary linkage is provided through a communications line, adapter devices, and the data communications processor 36.

Those aspects of the data communications system that are oriented toward applications are handled by the message control system (MCS) program. These aspects include remote file maintenance and job control. In addition, the message control system coordinates interprogram communications and provides message-switching capabilities. A single remote station may communicate with other remote stations or more than one object job.

Communication between the user of the system and the MCP is accomplished with a combination of display units, control units (display units with associated keyboards), control cards, and a comprehensive system log.

The status of the system and of the jobs in progress is presented on the display units. Specific questions requiring short answers may be entered by use of the keyboard. These questions and answers are displayed as they occur. Also, by entering the appropriate keyboard messages, various tables may be called for display. These tables include the job mix, peripheral unit, label and disk directory tables and job tables. The operator communicates directly with the MCP by use of input/output messages entered and received at the control units. The input messages include any control statement allowed on a control card, messages to enter jobs into the mix and to eliminate jobs from the mix and messages to reactivate jobs that have been suspended. Output messages pertain to various functional areas of the MCP, to user's programs, and to system hardware modules.

A user submits a job to the system as a set of control cards and a source language deck. Alternatively, the user may submit only a set of control cards or enter control statement at the input keyboard if he has previously stored on disk the programs that he wishes to run and has entered their names in the disk directory following an error-free compilation.

For a job requiring compilation, the first control card must be a compile statement which specifies the compiler to be used and the type of compile to be made. There are three forms: compile and execute, compile for the library, and compile for syntax check. The other types of control cards may be used for all jobs whether they do or do not require compilation. These include an execute statement, process time statement, priority statement, core requirement statement, I/O time statement, and I/O unit statements which associate file labels with particular I/O units.

The MCP maintains on disk a system log, which is a record of all activities on the system. Besides system error and maintenance statistics, the log makes available to the user such data as the processing time for each job, the time at which each job was started, its elapsed running time, and its actual processor time.

An important feature of any operating system is its continuous operation capability. It should be noted, that the multi-level operating system of the instant invention is not a panacea for the continuous operation problem. However, it does provide a sound framework on which to build a continuously operating system, since the distributive qualities of the design coincide with the distributive requirements of such a system. The continuously operating system is a completely cooperative one, in that responsibility for handling errors or failures must be distributed throughout all parts of the system: hardware, software, and user programs. Generally, the hardware minimizes the frequency of failures and the software minimizes the impact of a failure when one does occur. As previously discussed, in order to provide a reasonable continuous operating capability, the hardware configuration must include at least two central processor modules 20, at least two and normally three or more memory control modules 92, and at least two input/output modules 10. Also, a system disk must be on an exchange shared between the two IOMs, or there must be two copies of system disk, one for each IOM 10 or both shared. There must be at least two, and normally more, I/O display units, at least one on each IOM 10.

Thus the integrative action of the multi-level operating system is achieved by corrdinating the execution of memory programs, or jobs in the processors, by controlling both input and output so as to make optimal use of the relatively slow peripheral devices, and by taking executive action to meet virtually all processing conditions and to minimize the adverse effects of system degradation. The overall rate and efficiency at which jobs can be processed under control of the multi-level operating system is improved by increasing the speed of execution of individual user's programs (particularly through the utilization of reentrant code) by increasing the speed of data handling and by increasing the ease of operating the machine through simple English-like operator attention and error messages.

While principles of the invention have now been made clear in an illustrated embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

What is claimed is:

1. A multi-processing modular data processing system including a plurality of peripheral devices comprising:

a plurality of memory modules interconnected by a memory bus to provide a multi-accessable main memory for said system, each of said plurality of memory modules including a memory control unit and at least one memory storage unit, each of said memory control units being connected to said memory bus and including means for detecting errors in the transfer of information between said memory bus and said memory storage unit;

a plurality of central processing modules, each of said plurality of central processing modules including a program control section and a storage section, each of said storage sections being connected to said memory bus and including means for indicating malfunctions internal to said respective processing module and errors related to information transfer between said respective processing module and said main memory;

a plurality of input/output modules, each of said input/output modules including a memory interface unit and a translator unit, said memory interface unit of each of said plurality of input/output modules being connected to said memory bus, said translator unit of each of said plurality of input/output modules being connected to said program control section of each of said processing modules for receiving control information and including means for detecting and reporting malfunctions internal to said respective input/output module and errors related to information transfers between said respective input/output module and said plurality of peripheral devices;

a maintenance bus coupled to each of said memory control units of said plurality of memory modules and to each of said storage sections of said plurality of central processing modules and to each of said memory interface units of said plurality of input/output modules; and maintenance diagnostic means coupled to said maintenance bus for off-line testing of each of said plurality of said central processing modules, each of said plurality of input/output modules, and said memory control units of each of said plurality of memory modules;

2. The data processing system of claim 1 wherein said memory control unit further includes:

means for correcting all single-bit errors in information received from said at least one memory storage unit associated with said memory control unit before said transfer of information to said memory bus.

* * * * *